(12) United States Patent
Kim et al.

(10) Patent No.: US 8,914,747 B2
(45) Date of Patent: Dec. 16, 2014

(54) APPARATUS AND METHOD FOR DISPLAYING MENUS IN A PORTABLE TERMINAL

(75) Inventors: Hyun-Soo Kim, Daegu (KR); Eun-Chul Ra, Daegu (KR); In-Gu Bae, Daegu (KR); Jae-Hyoung Bae, Daegu (KR); Byoung-Ho Cho, Daegu (KR)

(73) Assignee: Samsung Electronics Co., Ltd., Suwon-si (KR)

(*) Notice: Subject to any disclaimer, the term of this patent is extended or adjusted under 35 U.S.C. 154(b) by 3114 days.

(21) Appl. No.: 11/100,635

(22) Filed: Apr. 7, 2005

(65) Prior Publication Data
US 2005/0257170 A1  Nov. 17, 2005

(30) Foreign Application Priority Data

Apr. 7, 2004 (KR) .................... 10-2004-0023807

(51) Int. Cl.
*G06F 3/048* (2013.01)
*G06F 3/0482* (2013.01)
*G06F 9/44* (2006.01)

(52) U.S. Cl.
CPC ............ *G06F 3/0482* (2013.01); *G06F 9/4443* (2013.01)
USPC .......................................... 715/825; 715/810

(58) Field of Classification Search
USPC ................................................. 715/825, 810
See application file for complete search history.

(56) References Cited

U.S. PATENT DOCUMENTS

| 5,929,857 A | 7/1999 | Dinallo et al. |
| 2003/0013483 A1 | 1/2003 | Ausems et al. |
| 2003/0112279 A1 | 6/2003 | Irimajiri |

FOREIGN PATENT DOCUMENTS

| CN | 1263425 A | 8/2000 | |
| CN | 1266233 A | 9/2000 | |
| CN | 1449219 A | 10/2003 | |
| CN | 1353556 A | 6/2006 | |
| EP | 1 396 985 A2 | 3/2004 | |
| JP | 2000347780 A | * 12/2000 | ................ G06F 3/00 |

* cited by examiner

*Primary Examiner* — William Bashore
*Assistant Examiner* — Henry Orr
(74) *Attorney, Agent, or Firm* — Roylance, Abrams, Berdo & Goodman, LLP

(57) ABSTRACT

A menu displaying apparatus and method in a portable terminal are provided. In the menu displaying apparatus, a select image buffer stores select images, and an unselect image buffer stores unselect images. A controller reads a select image for a selected menu from the select image buffer, displays the select image together with a title text of the selected menu at a predetermined position in a menu region, reads unselect menu images for unselected menus from the unselect image buffer, and displays the unselect menu images together with title texts of the unselected menus at predetermined positions in the menu region.

3 Claims, 67 Drawing Sheets

| title | POSITION | IMAGE |
|---|---|---|
| Calls | $x_1 y_1$ |  |
| Phonebook | $x_2 y_1$ |  |
| Camera | $x_3 y_1$ |  |
| U-MAX | $x_1 y_2$ |  |
| Message | $x_2 y_2$ |  |
| Voice Dialing | $x_3 y_2$ |  |
| Entertainment | $x_1 y_3$ |  |
| Schedule | $x_2 y_3$ |  |
| Setting | $x_3 y_3$ |  |

| title | POSITION | IMAGE |
|---|---|---|
| Calls | $x_1 y_1$ | |
| Phonebook | $x_2 y_1$ | |
| Camera | $x_3 y_1$ | |
| U-MAX | $x_1 y_2$ | |
| Message | $x_2 y_2$ | |
| Voice Dialing | $x_3 y_2$ | |
| Entertainment | $x_1 y_3$ | |
| Schedule | $x_2 y_3$ | |
| Setting | $x_3 y_3$ | |

- Select "Make menu theme", display notifies the user of available menu types are assumed herein to be the grid, scroll and page type.
- Select Grid type
- Set the number of grid menus to be displayed on the display.

| Menu theme manager |
|---|
| 1. Menu theme list |
| 2. Make menu theme |
| |
| |
| |
| Select |

811

| Create menu theme |
|---|
| Select menu type |
| 1. Grid type |
| 2. Scroll type |
| 3. Page type |
| |
| Select |

813

| Grid type |
|---|
| Select layout |
| 1. 2 × 2 |
| 2. 2 × 3 |
| 3. 3 × 3 |
| 4. 3 × 4 |
| Select |

815

APPARATUS AND METHOD FOR DISPLAYING MENUS IN A PORTABLE TERMINAL

PRIORITY

This application claims the benefit under 35 U.S.C. §119(a) of an application entitled "Apparatus and Method for Displaying Menus in a Portable Terminal" filed in the Korean Intellectual Property Office on Apr. 7, 2004 and assigned Serial No. 2004-23807, the contents of which are incorporated herein by reference.

BACKGROUND OF THE INVENTION

1. Field of the Invention

The present invention relates generally to an apparatus and method for displaying menus in a portable terminal. In particular, the present invention relates to an apparatus and method for setting and displaying menus in a portable terminal.

2. Description of the Related Art

A portable terminal typically provides additional services in addition to wireless communication. Specifically, besides the wireless communication functionality, multimedia functionality has become an option in the portable terminal. To process multimedia data, the portable terminal is provided with a variety of programs that enable the portable terminal to serve as a camera, a TV receiver, a satellite broadcasting receiver, and a game player. Therefore, the portable terminal must be able to display menus for performing these functions. At present, a page type, a scroll type, a grid type, and a ring type are available as menu types for the portable terminal.

In general, menus are preset for the portable terminal at the factory, and users are not allowed to change the menu data. In this context, methods of changing menus in portable terminals have been proposed. The menu changing methods are related primarily to replacing menu icons such as animation shots.

However, since the menu changing methods merely change menu icons or colors in preset menus, no modifications can be made to the whole structure of the menus.

SUMMARY OF THE INVENTION

An object of the present invention is to substantially solve at least the above problems and/or disadvantages and to provide at least the advantages below. Accordingly, an object of the present invention is to provide an apparatus and method for selecting a menu type, selecting menu images according to the selected menu type, and setting menus using the menu images in a portable terminal.

Another object of the present invention is to provide an apparatus and method for setting menus and displaying functions of a portable terminal by the menus in the portable terminal.

A further object of the present invention is to provide an apparatus and method for storing at least two user-set menu types and displaying menus according to a user-selected menu type in a portable terminal.

Still another object of the present invention is to provide an apparatus and method for setting different images for one menu for two cases of selection and non-selection and displaying a select image for a selected menu and unselect images for unselected menus in a portable terminal.

Yet another object of the present invention is to provide an apparatus and method for setting grid menus by a user and displaying terminal functions as the grid menus in a portable terminal.

Yet a further object of the present invention is to provide an apparatus and method for setting scroll menus by a user and displaying terminal functions as the scroll menus in a portable terminal.

Still a further object of the present invention is to provide an apparatus and method for setting page menus by a user and displaying terminal functions as the page menus in a portable terminal.

The above objects are achieved by providing a menu displaying apparatus and method in a portable terminal.

According to one aspect of the present invention, in a grid menu displaying method in a portable terminal having a select image buffer for storing select images and an unselect image buffer for storing unselect images, a selected menu is marked in a menu displaying mode, a select image for the selected menu is read from the select image buffer and displayed at a predetermined position in a menu region, and a title text of the selected menu is displayed in a title region. Unselect menu images for unselected menus are selected from the unselect image buffer and displayed at predetermined positions in the menu region.

According to another aspect of the present invention, in a scroll menu displaying method in a portable terminal having a select image buffer for storing select images and an unselect image buffer for storing unselect images, a selected menu is marked in a menu displaying mode, and a select image for the selected menu is read from the select image buffer, and displayed together with a title text of the selected menu at a predetermined position in a menu region. Unselect menu images for unselected menus are selected from the unselect image buffer and displayed together with title texts of the unselected menus at predetermined positions in the menu region.

According to a further aspect of the present invention, in a page menu displaying method in a portable terminal having a select image buffer for storing select images of a first size and an unselect image buffer for storing unselect images of a second size smaller than the first size, a selected menu is marked in a menu displaying mode, and a select image for the selected menu is read from the select image buffer and displayed together with a title text of the selected menu at a predetermined position in a menu region. Unselect images for unselected menus are read from the unselect image buffer and displayed together with title texts of the unselected menus at predetermined positions in the menu region.

According to still another aspect of the present invention, in a method of setting grid menus in a portable terminal, the number of menus to be displayed on a display is determined in a grid menu setting mode. A user is guided to setting a background image and an image selected during background image setting is registered as the background image. The user is guided to set a title image and an image selected during title image setting is registered as the title image. The user is guided to set select and unselect images, and an operation for registering a user-selected image as a select image at a focused menu position is repeated when a select image setting mode is selected. When an unselect image setting mode is selected, an operation for registering a user-selected image as an unselect image at a focused menu position.

According to yet another aspect of the present invention, in a method of setting scroll menus in a portable terminal, the number of menus to be displayed on a display is determined in a scroll menu setting mode. A user is guided to set a background image and an image selected during background image setting is registered as the background image. The user is guided to set select and unselect images. If a select image setting mode is selected, a font for a title text of a selected menu is set and an operation for registering a user-selected image as a select image at a focused menu position is repeated. If an unselect image setting mode is selected, a font for title texts of unselected menus is set and an operation for registering a user-selected image as an unselect image at a focused menu position is repeated.

According to yet further aspect of the present invention, in a method of setting page menus in a portable terminal, a user is guided to set a background image and an image selected during background image setting is registered as the background image. The user is guided to set select and unselect images. If a select image setting mode is selected, a font for a title text of a selected menu is set and an operation for registering a user-selected image as a select image at a focused menu position is repeated. If an unselect image setting mode is selected, a font for title texts of unselected menus is set and an operation for registering a user-selected image as an unselect image at a focused menu position is repeated.

According to still further aspect of the present invention, in a menu displaying apparatus in a portable terminal, a select image buffer stores select images, and an unselect image buffer stores unselect images. A controller reads a select image for a selected menu from the select image buffer, displays the select image together with a title text of the selected menu at a predetermined position in a menu region, reads unselect menu images for unselected menus from the unselect image buffer, and displays the unselect menu images together with title texts of the unselected menus at predetermined positions in the menu region.

BRIEF DESCRIPTION OF THE DRAWINGS

The above and other objects, features and advantages of the present invention will become more apparent from the following detailed description when taken in conjunction with the accompanying drawings in which:

FIGS. 2A to 2L illustrate the configurations of memories and a display for displaying menus according to an embodiment of the present invention;

FIGS. 14A to 14F illustrate a grid menu setting procedure in the mobile phone according to another embodiment of the present invention;

Throughout the drawings, the same element is designated by the same reference numeral or character.

DETAILED DESCRIPTION OF EXEMPLARY EMBODIMENTS

Embodiments of the present invention will be described herein below with reference to the accompanying drawings. In the following description, well-known functions or constructions are not described in detail for conciseness.

Specific details such as the number and size of menu images in each menu type are presented for more comprehensive understanding of the present invention and are exemplary. Thus, it should be understood that the present invention can easily be implemented without the details or with some modifications to the details.

In accordance with an embodiment of the present invention, a user sets menus in a desired menu type and invokes a function of a portable terminal by selecting such a menu. To that end, a menu type is selected and menus are set by selecting menu images according to the selected menu type in an embodiment of the present invention. While a grid type, a scroll type and a page type are taken as available menu types in the embodiment of the present invention, the present invention is not limited to these menu types and thus any other menu type such as a ring type is also available for menu setting.

Menus can be set using an external device like a computer, or in the portable terminal. In the former case, a computer, which has a menu setting program, sets menus, displaying stored menu images, and downloads the menus to the portable terminal. If the portable terminal has the function of menu setting like the computer, menus can be set by portable terminal itself. In accordance with an embodiment of the present invention, menus are set in the computer, downloaded to the portable terminal, and then set in the portable terminal.

The following description is made under the presumption that a portable terminal is a mobile phone. Yet, the portable terminal can be any wireless portable terminal capable of performing wireless communications.

Figure 1:
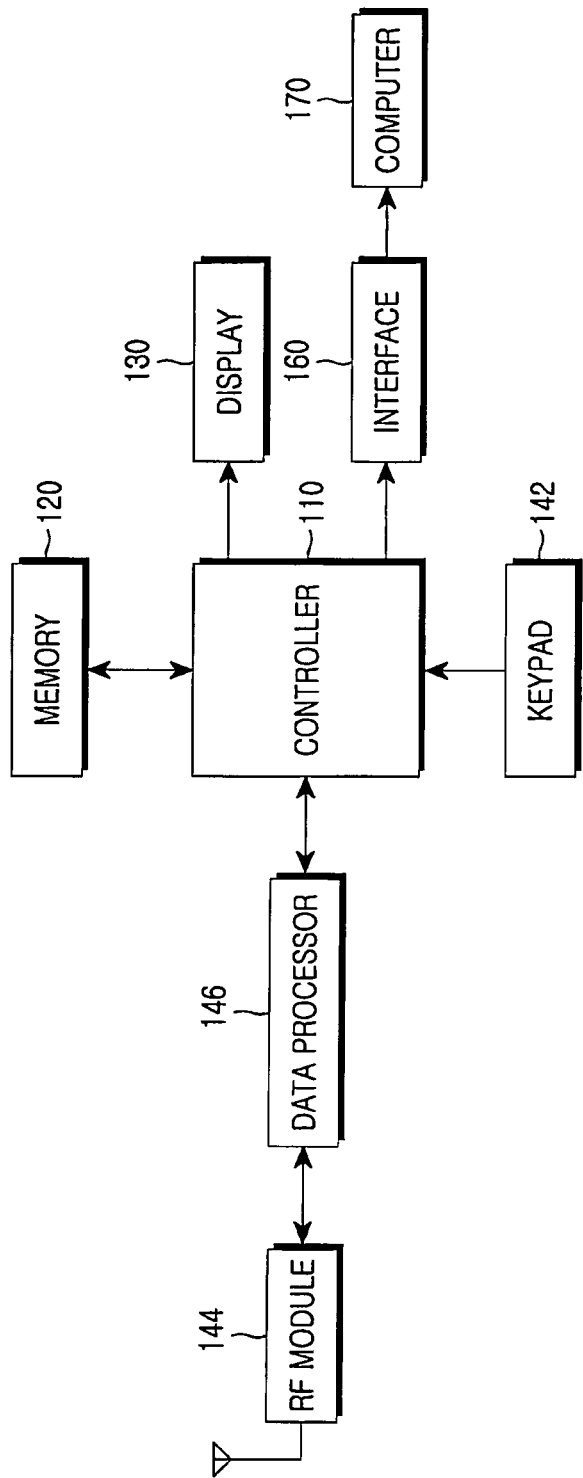
FIG. 1 is a block diagram of a mobile phone according to an embodiment of the present invention.

FIG. 1 is a block diagram of a mobile phone for setting menus and invoking functions using the menus according to an embodiment of the present invention.

Referring to FIG. 1, a Radio Frequency (RF) module 144 performs the wireless communication functionality of the mobile phone. The RF module 144 includes an RF transmitter (not shown) for upconverting the frequency of a transmission signal and amplifying the upconverted signal, and an RF receiver (not shown) for low-noise-amplifying a received RF signal and downconverting the RF signal. A data processor 146 is provided with a transmitter (not shown) for encoding and modulating the transmission signal and a receiver (not shown) for demodulating and decoding the received signal. Accordingly, the data processor 146 can be configured to include a MODEM and a CODEC. In addition, the data processor 146 may have an audio CODEC for processing an audio signal.

A keypad 142 has alphanumerical keys by which digits and characters are entered, and function keys by which functions are invoked. The keypad 142 further includes other function keys and directional keys for setting menus or selecting menus in accordance with an embodiment of the present invention.

A memory 120 includes a program memory (not shown) and a data memory (not shown). The program memory stores programs for setting menus and displaying the menus according to an embodiment of the present invention. The data memory may have a Non-Volatile Memory (NVM) for storing non-volatile data (such as bitmap, fonts, phone book, and so on) and a Random Access Memory (RAM) for temporarily storing data generated during the operation of the programs.

In accordance with an embodiment of the present invention, the data memory stores information about menus that have been set and information about menu images corresponding to the menus. The memory for storing the menu information in the data memory comprises a select memory for storing select images also known as images for selection, an unselect memory also known as images for unselection for storing unselect images, a guide memory for storing colors for a guide region, a title memory for colors for a title region, a back-scenery memory for storing colors for a background region, and a font memory for storing sizes, shapes and colors for title fonts. The menu images are stored in the same size as displayed on a display 130 in the select and unselect memories.

A controller 110 provides overall control to the mobile phone. The controller 110 may incorporate the data processor 146 therein. An audio signal can be processed in the data processor 146 or in the controller 110. Specifically, when the mobile phone uses a dedicated chip such as Mobile Station MODEM (MSM), the data processor 146 can be integrated into the controller 110, and an audio CODEC can also be included in the controller 110. On the other hand, if a chip for controlling only the operation of the mobile phone is used for the controller 110, the data processor 146 is separately configured as illustrated in FIG. 1. In this case, the audio CODEC can be incorporated into the data processor 146. It can be further contemplated that the mobile phone includes a mobile phone controller and a multimedia processor for processing multimedia data. Then, audio signals are processed in the mobile phone controller or the multimedia controller.

In accordance with an embodiment of the present invention, the controller 110 controls menu setting and displaying of menus selected during the operation of the mobile phone.

The display 130 displays menus that invoke functions of the mobile phone under the control of the controller 110. The display 130 is divided into a menu region for displaying the images of selected and unselected menus, a title region (in the case of a grid menu type) for displaying a title image and a font image, and a guide region for displaying guide images. In a scroll or page menu mode, title images are overlaid on select and unselect images displayed in the menu region. One or more Liquid Crystal Displays (LCDs) are used as the display 130. In the case where the mobile phone has a mobile phone controller and a multimedia controller, a displaying operation can be controlled by both the controllers.

FIGS. 2A to 2I illustrate the configurations of the memory 120 and the display 130 for each menu type according to an embodiment of the present invention. For notational simplicity, it is assumed that the select memory and the unselect memory each store nine menu images. Yet, it is to be appreciated that the number of the menus varies according to user setting.

Figure 2A:
Figure 2A:
Figure 2A:
Figure 2A:
Figure 2A:
Figure 2A:
Figure 2A:
Figure 2A:
Figure 2A:
Figure 2C:
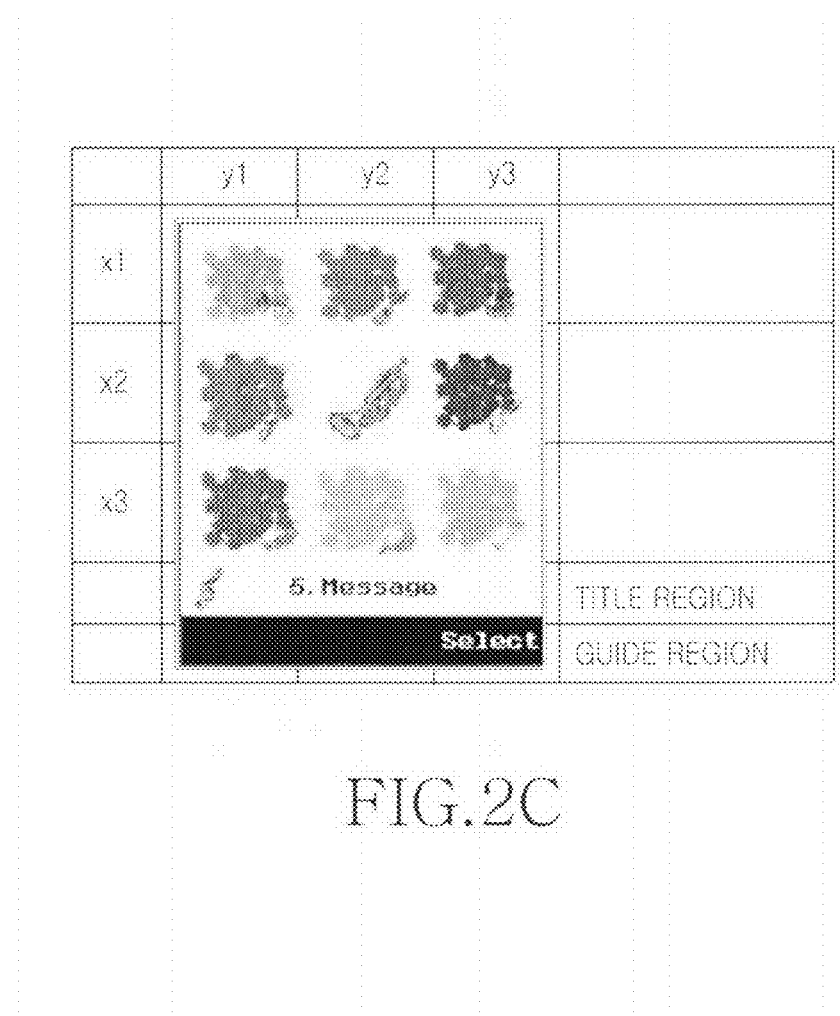

FIG. 2A illustrates the structure of the select memory for a grid menu type, FIG. 2B illustrates the structure of the unselect memory for the grid menu type, and FIG. 2C illustrates a view of grid menus on the display 130. For the grid menu type, menu images and their positions on the display 130 are stored in the select and unselect memories, as illustrated in FIGS. 2A and 2B. Upon selection of a menu at (x2, y2), a select image corresponding to the position stored in the select memory is highlighted on the display 130, while unselect images stored in the unselect memory are filled at the remaining positions. The coordinates of the menu images are fixed as illustrated in FIG. 2A, or can be changed. If the number of menus displayed on the display 130 is equal to or less than that of menu titles, their coordinates are fixed as illustrated in FIGS. 2A and 2B. In the illustrated case of FIGS. 2A and 2B, nine menu titles exist. Thus, nine menus are displayed on the display 130 as illustrated in FIG. 2C. On the contrary, if there are more than nine menu titles, the coordinates of the menu images can be variably set in conjunction with their previous and following menu titles. If the number of menus displayed on the display is larger than that of menu titles, the coordinates of the menu images are variably set when they are displayed.

Figure 2D:
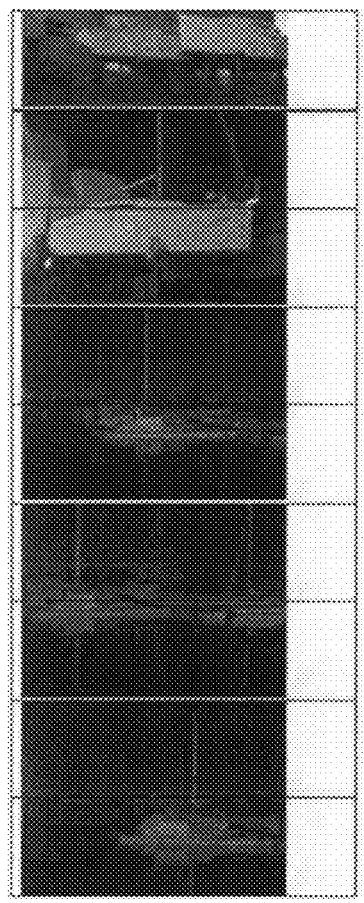
Figure 2E:
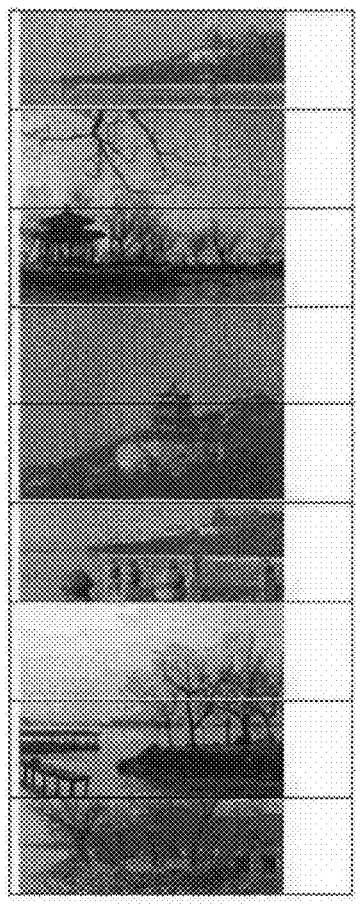
Figure 2F:
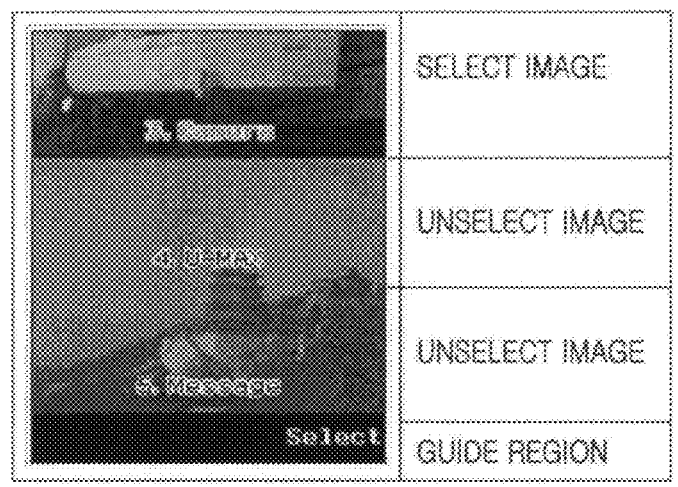

FIG. 2D illustrates the structure of the select memory for a scroll menu type, FIG. 2E illustrates the structure of the unselect memory for the scroll menu type, and FIG. 2C illustrates a view of grid menus on the display 130. For the scroll menu type, menu images are stored in the select and unselect memories, to be displayed in the menu region of the display 130, as illustrated in FIGS. 2D and 2E. As illustrated in FIG. 2F, upon selection of a third position, a select image at the third position in the select memory of FIG. 2D is highlighted, while unselect images stored in the unselect memory of FIG. 2E are filled at the other positions of the display 130. The menu images displayed on the display 130 in FIG. 2F are scrolled in a predetermined direction when a non-displayed menu image is selected.

Figure 2G:
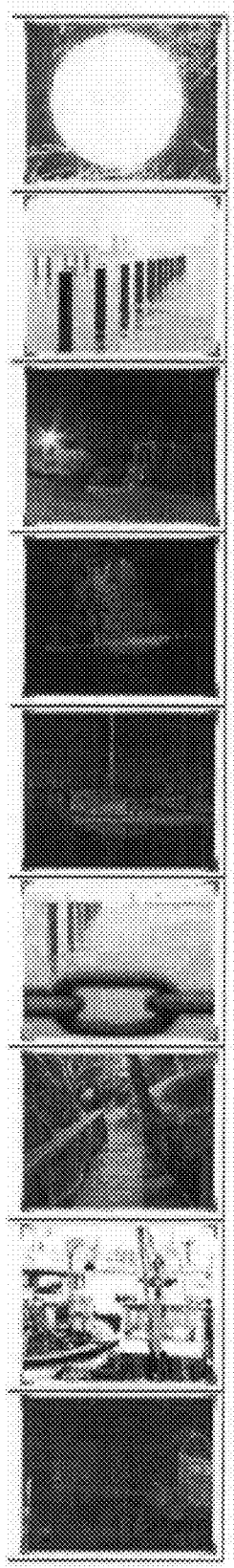
Figure 2H:
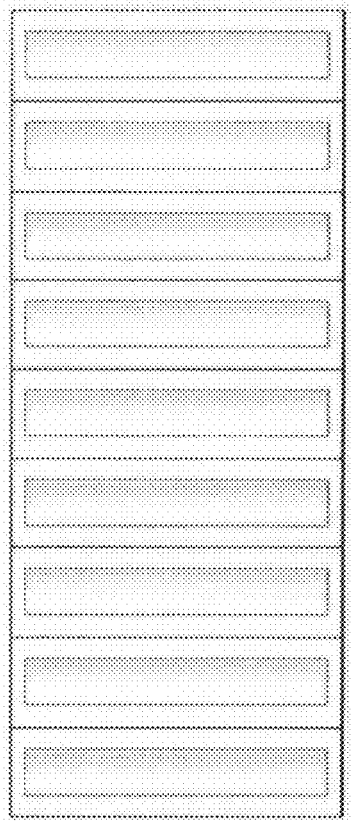
Figure 2I:
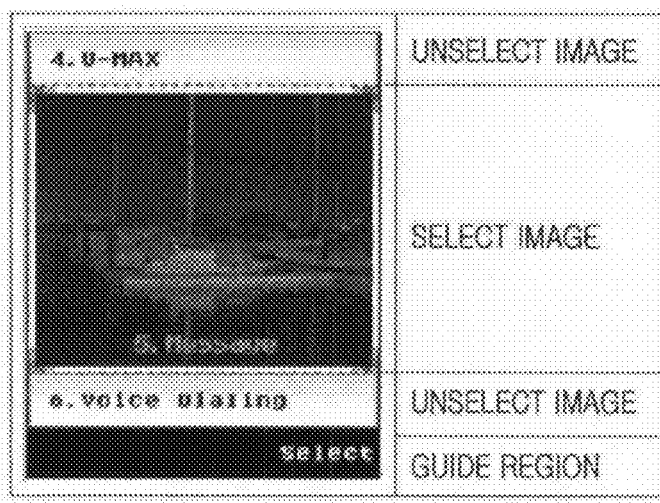

FIG. 2G illustrates the structure of the select memory for a page menu, FIG. 2H illustrates the structure of the unselect memory for the page menu, and FIG. 2I illustrates a view of page menus on the display 130. For the page menu type, menu images are stored in the select and unselect memories, to be displayed at a select menu area and at unselect menu areas before and after the select menu area on the display 130, as illustrated in FIGS. 2G and 2H. The menu images in the select memory are of the same size as the select menu area illustrated in FIG. 2I, and the menu images in the unselect memory are of the same size as the unselect menu areas illustrated in FIG. 2I. Upon selection of a fifth menu image illustrated in FIG. 2G, a fifth menu image of the select memory is displayed in the select menu area, while fourth and sixth menu images stored in the unselect memory are disposed at the unselect menu areas of the display 130.

The menu images of the select memory illustrated in FIGS. 2A, 2D and 2G and the menu images of the unselect memory illustrated in FIGS. 2B, 2E and 2H are character images or character animation shots like still images, moving pictures, or avatars. If moving pictures are stored in the select memory and still images are stored in the unselect memory, the display 130 displays a moving picture in the select menu area and still images in the remaining unselect menu areas. In the opposite case, the display 130 displays a still image in the select menu area and moving pictures in the remaining unselect menu areas. That is, if different types of images are stored in the select and unselect memories, the display 130 can display a select image and unselect images distinguishably.

Figure 2J:
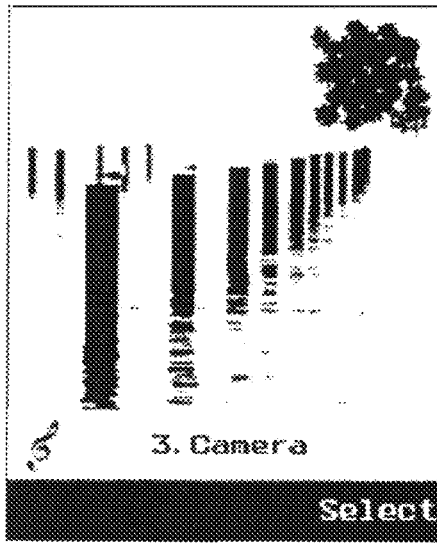

While it has been described above that both the select and unselect menu memories are used to display menu images, it can be further contemplated that menu images are displayed without the unselect memory. In this case, the menu images of the back-scenery memory and the select memory are used. FIG. 2J illustrates an example of displaying menus using a menu image from the back-scenery memory and a menu image from the select memory. The menu images of the back-scenery memory can be still images, animation shots, or moving pictures. As illustrated in FIG. 2J, a select image is displayed against a background image on the display 13.

Figure 2K:
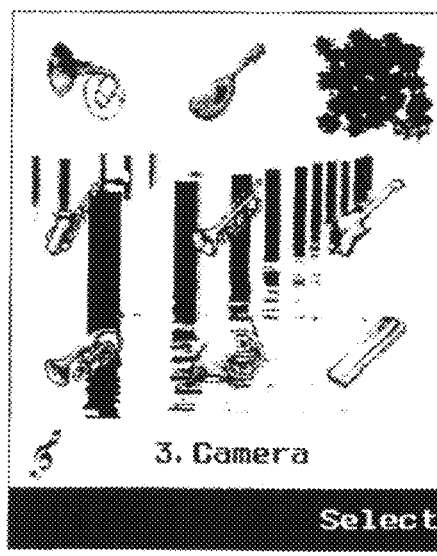
Figure 2L:
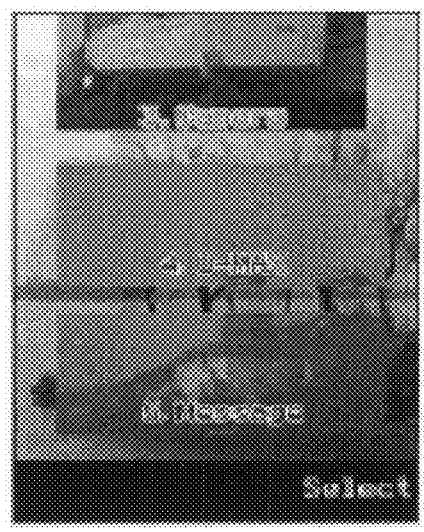

Also, all the select, unselect, and back-scenery memories can be used to display menu images. This menu display method is viable when the display 130 is not full of menu images retrieved from the select and unselect memories. FIGS. 2K and 2L illustrate examples of displaying menus on the display 130 using menu images from the select, unselect and back-scenery memories.

As illustrated in FIGS. 2C, 2F and 2I, the guide region displays guide information by which to select a menu image, and the title region indicates the title of a selected menu.

Figure 3A:
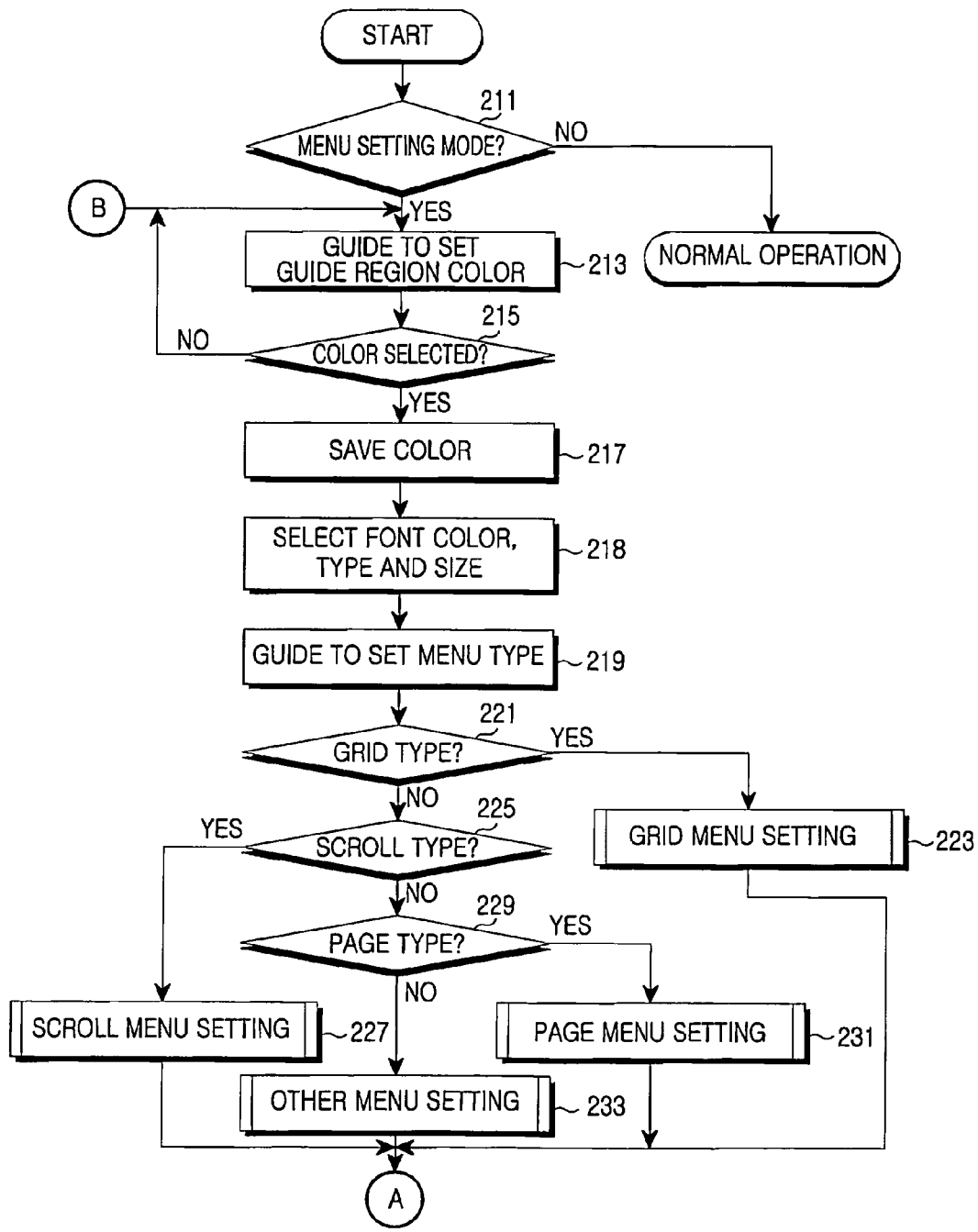
FIGS. 3A and 3B are flowcharts illustrating a menu setting procedure according to an embodiment of the present invention.
Figure 3B:
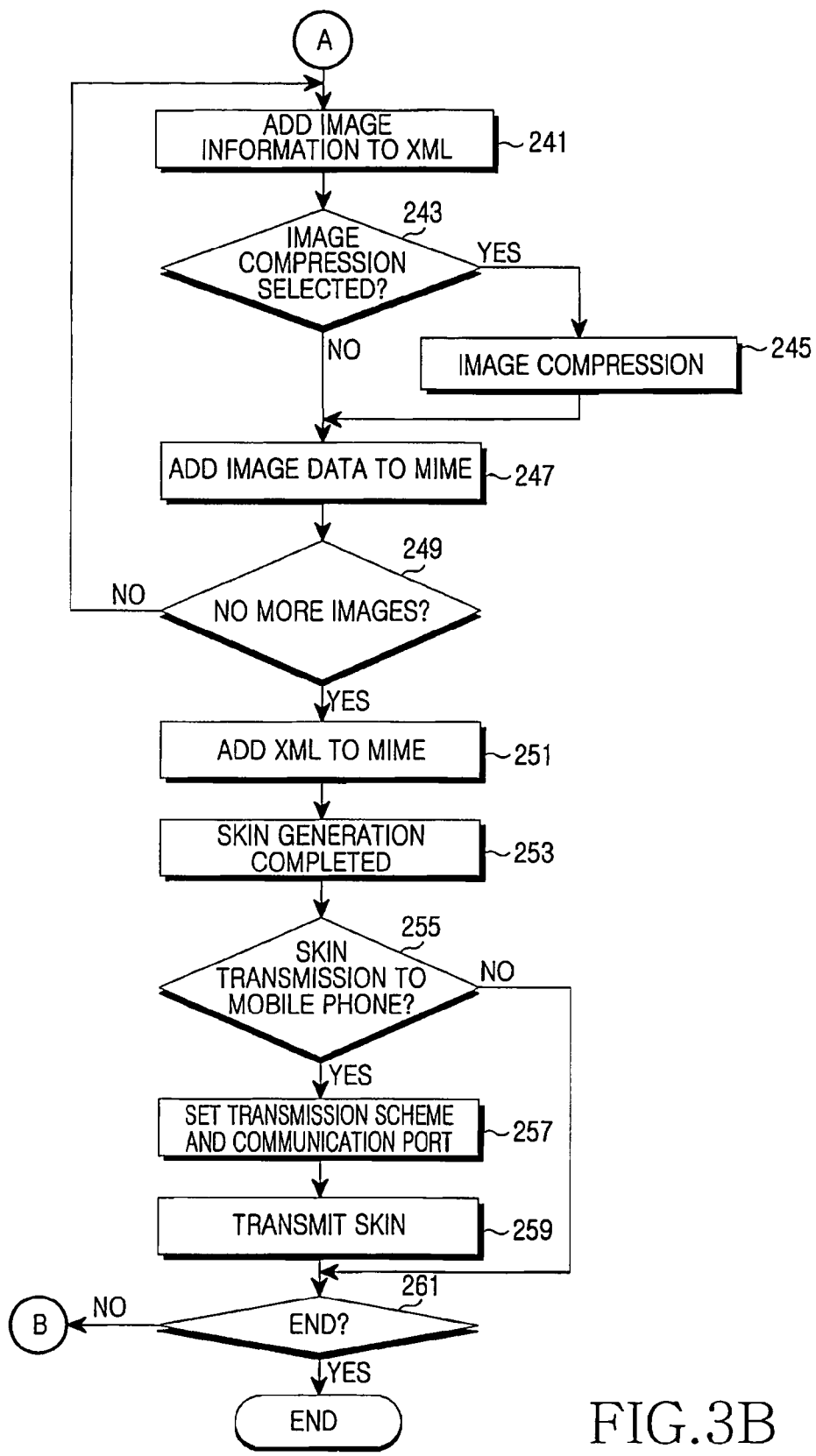

FIGS. 3A and 3B are flowcharts illustrating a menu setting procedure according to an embodiment of the present invention. In the menu setting procedure, menus are set in an external device and downloaded to a mobile phone. However, menu setting can be performed in the mobile phone. Specifically, the mobile phone stores basic colors and menu images for menu setting and guides the user to set colors for display regions by the procedure depicted in FIGS. 3A and 3B. Also, the mobile phone guides the user to select a desired menu type and displays menu images according to the selected menu type so that the user can select an intended menu. As the menu setting is done in the mobile phone, the download operation is not needed.

The following description is made with the appreciation that the menu setting takes place in an external computer. FIGS. 9A to 9I illustrate dialog boxes displayed during menu setting and the format of a menu message transmitted to the mobile phone.

Figure 9A:
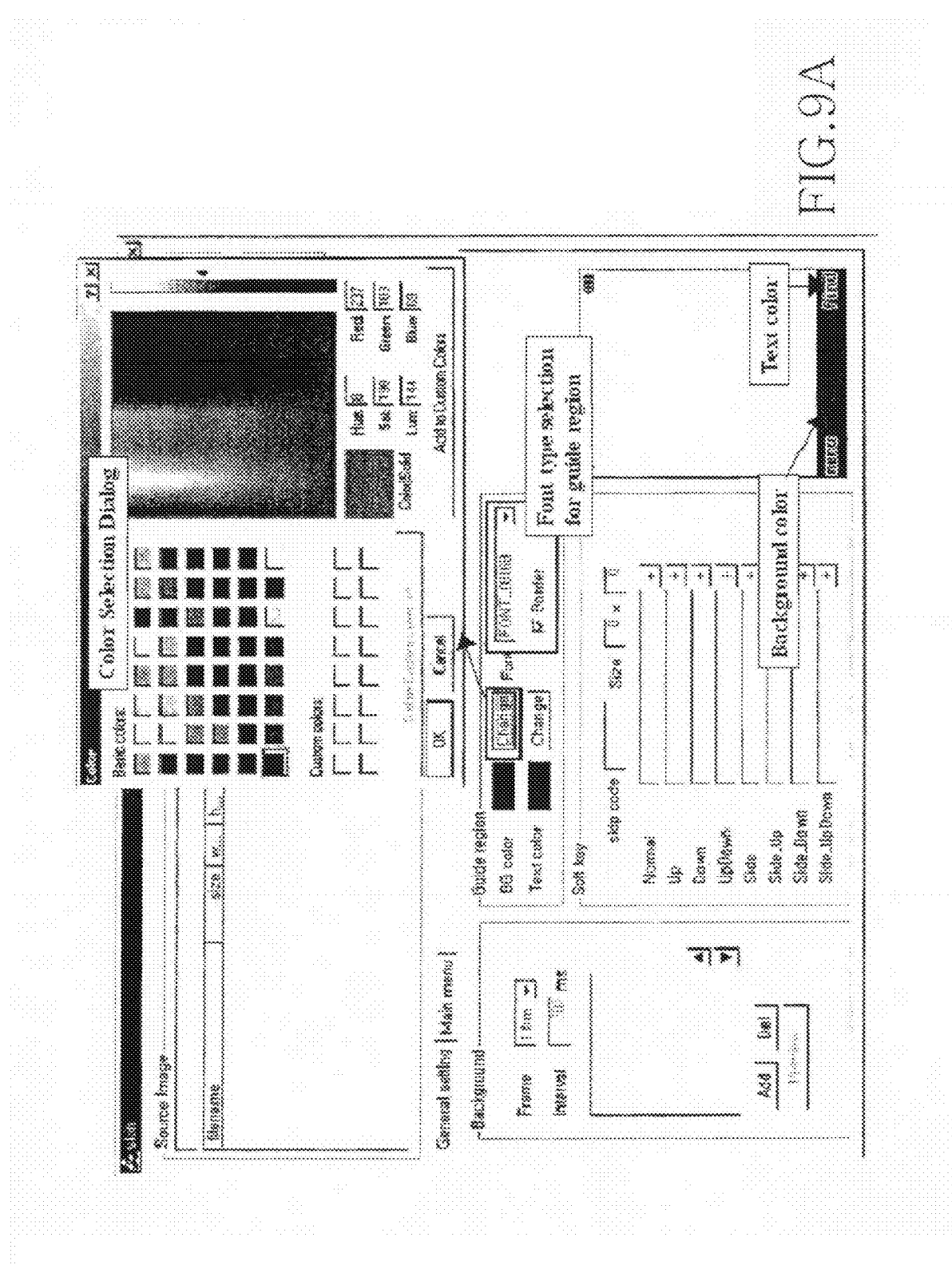
FIGS. 9A to 9I illustrate dialog boxes brought up for the menu setting procedure and the format of a menu message transmitted to the mobile phone according to an embodiment of the present invention.
Figure 9B:
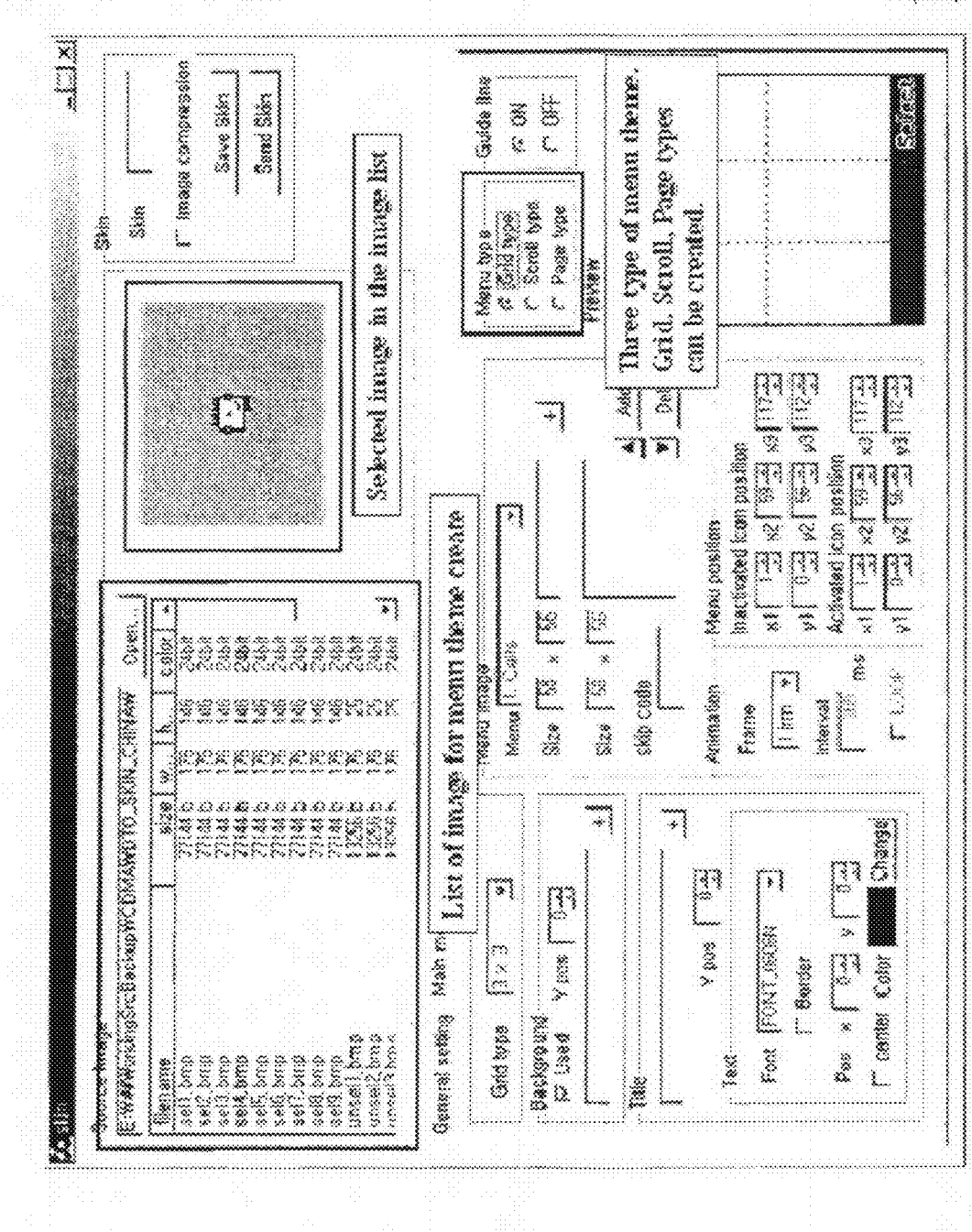

Referring to FIGS. 3A and 3B and FIGS. 9A to 9I, upon selection of a menu setting mode in step 211, a computer controller displays a dialog box illustrated in FIG. 9A to prompt the user to select colors for the guide region in step 213. The guide region is positioned at a lower portion of the display 130, for displaying guide information for use in menu setting. A background color and a font color can be set for the guide region. Upon selection of a background color and a font color in step 215, the computer controller saves the background color and font color for the guide region of the display 130 in step 217.

In step 218, the computer controller sets font attributes including font color, font type, and font size. The computer controller displays a menu type dialog box to prompt the user to select a menu type on a monitor in step 219. In the description of an embodiment of the present invention, three menu types (grid, scroll and page) are available, to which the present invention is not limited. Thus, it is to be understood that other menu types can be set in a similar manner.

Figure 4A:
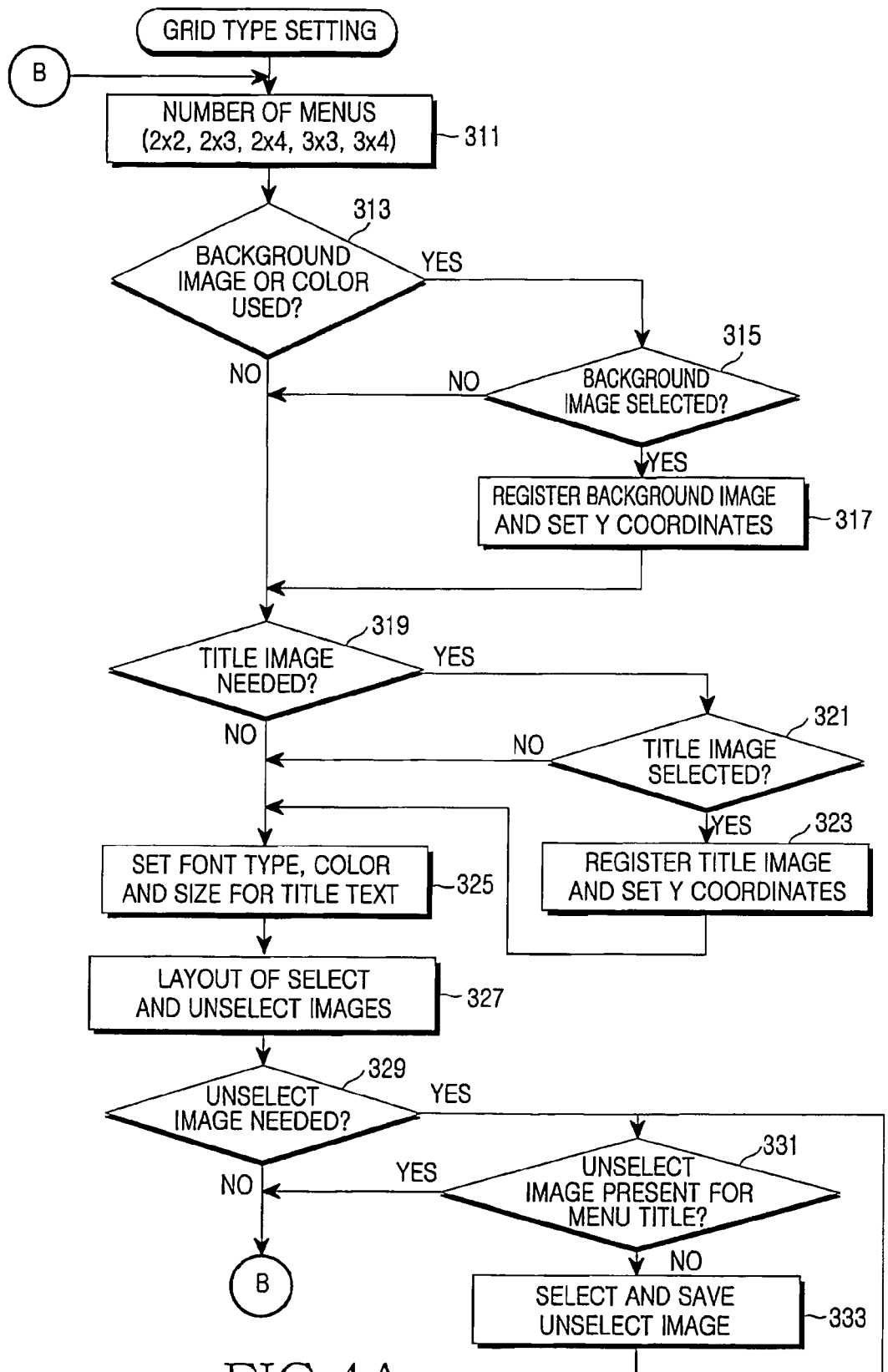
FIGS. 4A and 4B are flowcharts illustrating a grid menu generating procedure according to an embodiment of the present invention.
Figure 4B:
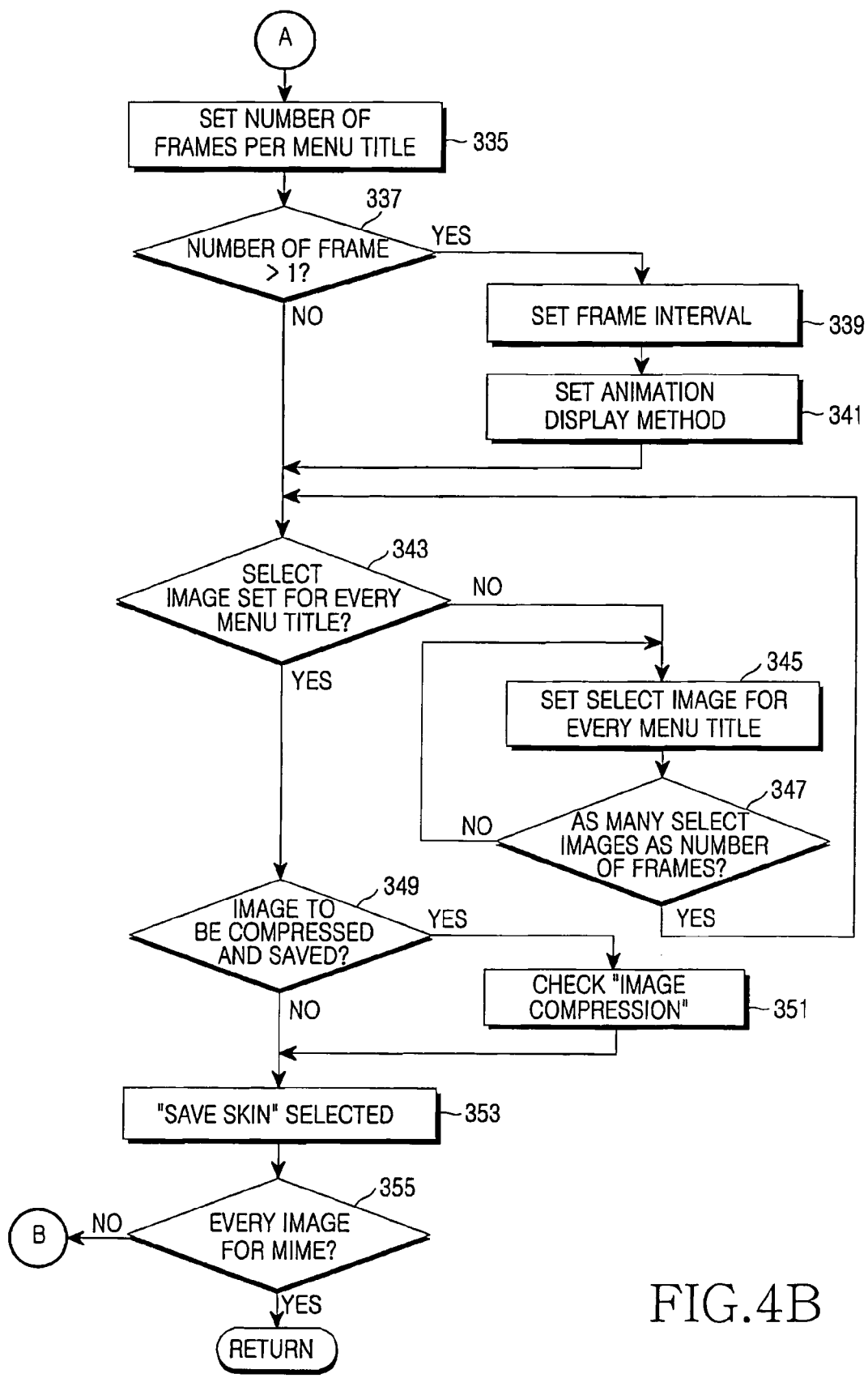
Figure 9C:
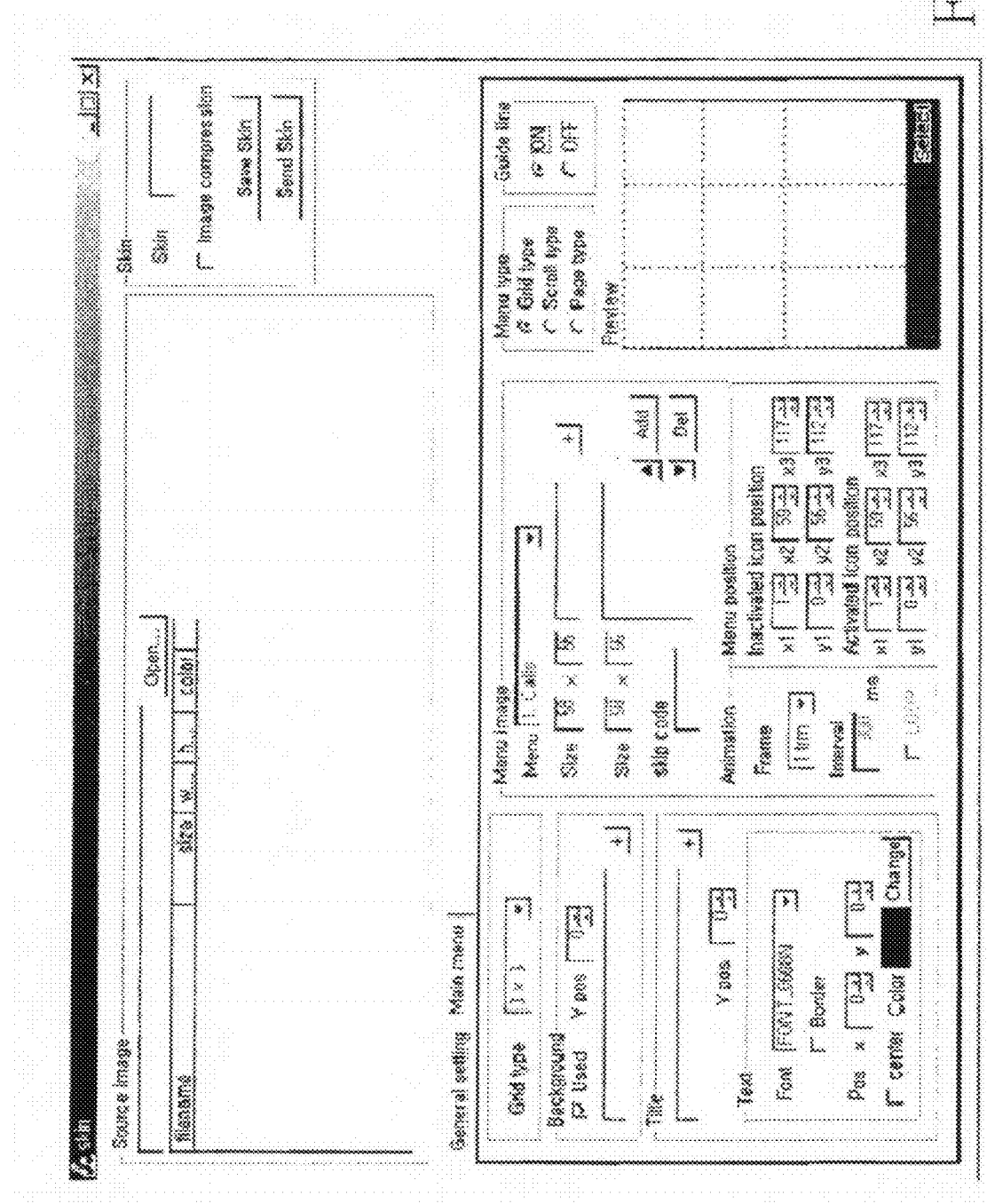

Upon selection of a grid menu type in step 221, the computer controller displays a dialog box illustrated in FIG. 9C in step 223 and performs a grid menu setting procedure illustrated in FIGS. 4A and 4B. Upon selection of a scroll menu type in step 225, the computer controller displays a dialog box illustrated in FIG. 9D in step 227 and performs a scroll menu setting procedure illustrated in FIGS. 5A and 5B. Upon selection of a page menu type in step 229, the computer controller displays a dialog box illustrated in FIG. 9E in step 231 and performs a scroll menu setting procedure illustrated in FIGS. 6A and 6B. If any other menu type such as a ring menu type is selected, a menu setting procedure for the selected menu type is performed in step 233, which will not be described herein.

After one of the menu types is selected, menus are set according to the selected menu type and Save Skin is clicked. The computer controller then starts to generate a skin, as illustrated in FIG. 9F. The computer controller checks whether every image and information needed for the current skin exists and if it does, the computer controller generates the skin.

In the skin generation procedure, upon selection of Save Skin, the computer controller adds menu image information to an XML in step 241. The menu image information includes information about a menu type, the coordinates of menu images, the width and length of the images, the capacity and size of each image, image compression, background and text colors for the guide region, background and text colors for the title region, and a text position. In step 243, the computer controller determines whether Image Compression has been selected. If it has, the computer controller compresses the menu images by, for example, the Lempel-Ziv algorithm in step 245. For details of the Lempel-Ziv algorithm, see "Compression of Individual Sequences via Variable-Rate Coding" (Jacob Ziv and Abraham Lempel, IEEE Transaction on Information Theory, Vol. 24, No. 5, September 1978) which is incorporated herein by reference. The menu images are then added to a Multipurpose Internet Mail Extensions (MIME). The MIME is formatted as illustrated in FIG. 9I. The standard MIME format is defined in WSP 230.

By repeating steps 241 through 247, the computer controller adds menu image information to the XML, compresses the added menu images, and adds the compressed menu images to the MIME. If no menu images remain to be processed in step 249, the computer controller adds the XML to the MIME in step 251 and notifies the user of the completed skin generation as illustrated in FIG. 9G in step 253. Now, the generated skin can be sent to the mobile phone. When a command for sending the MIME file is generated or Send Skin is selected while the dialog box illustrated in FIG. 9G is displayed in step 255, the computer controller sets a transmission scheme and a communication port in step 257 and transmits the skin as illustrated in FIG. 9H in step 259. Upon generation of an end command in step 261, the computer controller terminates the menu setting procedure, or returns to step 213 to perform menu setting for another menu type.

FIGS. 4A and 4B are flowcharts illustrating a grid menu setting procedure in step 223 of FIG. 3, and FIGS. 10A to 10D illustrate dialog boxes displayed on the computer monitor in the process of the grid menu setting.

Referring to FIGS. 4A and 4B and FIGS. 10A to 10D, upon selection of Grid type, the dialog box illustrated in FIG. 9C is displayed. The user selects Grid type as a menu type and the number of grid menus by entering N×M in a Grid type area. The number of grid menus can be 2×2, 2×3, 2×4, 3×3, 3×4, 4×4, 4×5, and so on. Thus, the computer controller sets the number of menus to be displayed according to the input value in step 311. It is assumed herein that the number of grid menus is 3×3 (=9).

If the user clicks on Use under Background Image in the dialog box, the computer controller displays a list of images in an image list displaying area in step 313. When an image is selected from the image list and its position is determined in step 315, the computer controller sets the selected background image and its position and saves them in step 317 via registration. The selected background image is displayed in a Preview window. The background image can be a moving picture, an image from a TV program, an image captured by a camera, or an ordinary image. However, no background image can also be used. Therefore, if the user does not click on Use under Background Image in step 315, a predetermined image is used for the background (e.g. a color of white series). The background image can be used as the background of the display regions on the display 130 illustrated in FIG. 2C. In the case where unselect menus are not selected, the selected background image can be displayed as the background.

When the user moves to Title in step 319, the computer controller awaits reception of information about a title image and a title image position. The title region is positioned between the grid menus and the guide region in FIG. 2C. The title of a selected grid menu is shown in the title region. Upon selection of a title image and its position by the user in step 321, the computer controller sets the selected title image and position and saves them in step 323.

In step 325, the computer controller sets a font type, a font color and a font size for the title text. The title is a menu text displayed together with the menu image. Therefore, the user can freely set the font type, font color and font size of an image to be displayed.

Subsequently, the computer performs a procedure for selecting images for grid menus to be displayed on the display 130 according to user inputs as illustrated in FIG. 2C. Select images are defined as images for the grid menus when the grid menus are selected, and unselect images are defined as images for the grid menus when the grid menus are not selected. In other words, unselect images are set for menu positions other than a menu position for a selected menu. For the purpose, the computer controller sets a layout of select and unselect images, the numbers of the select and unselect images each being equal to that of the grid menus to be displayed in step 327. The layout and size of the images are selected by the user. The sizes of the select images and the unselect images can be set to be equal or different.

Regarding a procedure for setting unselect images, the unselect images cannot be selected. In this case, the unselect image setting is not performed and the background image is filled at the positions that the unselect images might otherwise be located.

On the other hand, if it is determined that the unselect images are to be set in step 329, the computer controller selects images for unselect menus in steps 329 through 333. To select the unselect images, with the name of a title displayed, the user selects a desired image from an image list and the size and position of the selected image in a dialog box illustrated in FIG. 10C. The computer controller then displays the selected image of the selected size at the selected position for the title in the Preview window. As many unselect images as the number of menus are registered. Therefore, in the above example of 3×3 grid menus, nine unselect images are registered as illustrated in the Preview window of FIG. 10D. Accordingly, an image and the position and size of the image must be set sequentially for each title in steps 331 and 333.

Regarding a procedure for setting select images, the select image setting is mandatory. The select images can be moving pictures, animation shots, or ordinary images. To set the select images, the number of frames per select image is first set. In the case of a moving picture or an animation shot, at least two frames are required. In the case of an ordinary image (i.e. a single image like a still image), one frame is needed. Therefore, after setting the number of frames per select image for each menu title in step 335, the computer controller determines whether the number of frames per select image is larger than 1 in step 337. If the number of frames per select image is larger than 1, the computer controller sets a time interval between frames in step 339 and sets a displaying method in step 341. For an animation shot or a moving picture, it is repeatedly played or played once. In the latter case, when playing is completed, the animation shot or moving picture is shown as a still image.

In steps 343 through 347, the computer controller sets select images. Specifically, the computer controller sets a select image for a menu title in step 345 and determines whether as many images as the number of frames has been set in step 347. By repeating steps 345 and 347, as many images as the number of frames per select image are set. In the presence of remaining menu titles in step 343, the computer controller sets select images for the menu titles, repeating steps 345 and 347. Upon completion of setting a select image for each menu title in step 343, the computer controller terminates the select image setting procedure.

Figure 10A:
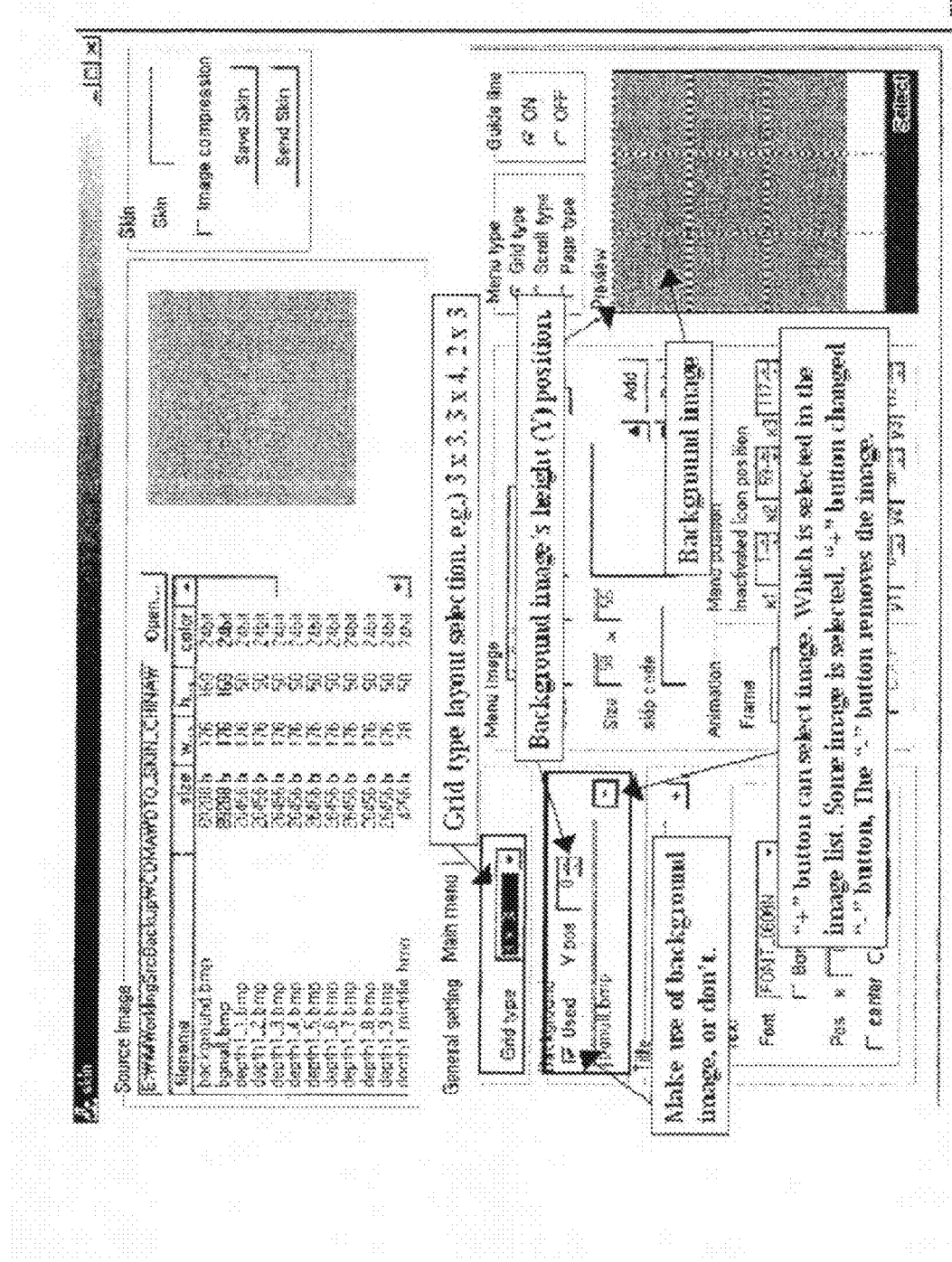
FIGS. 10A to 10D illustrate dialog boxes brought up for the grid menu generating procedure according to an embodiment of the present invention.
Figure 10B:
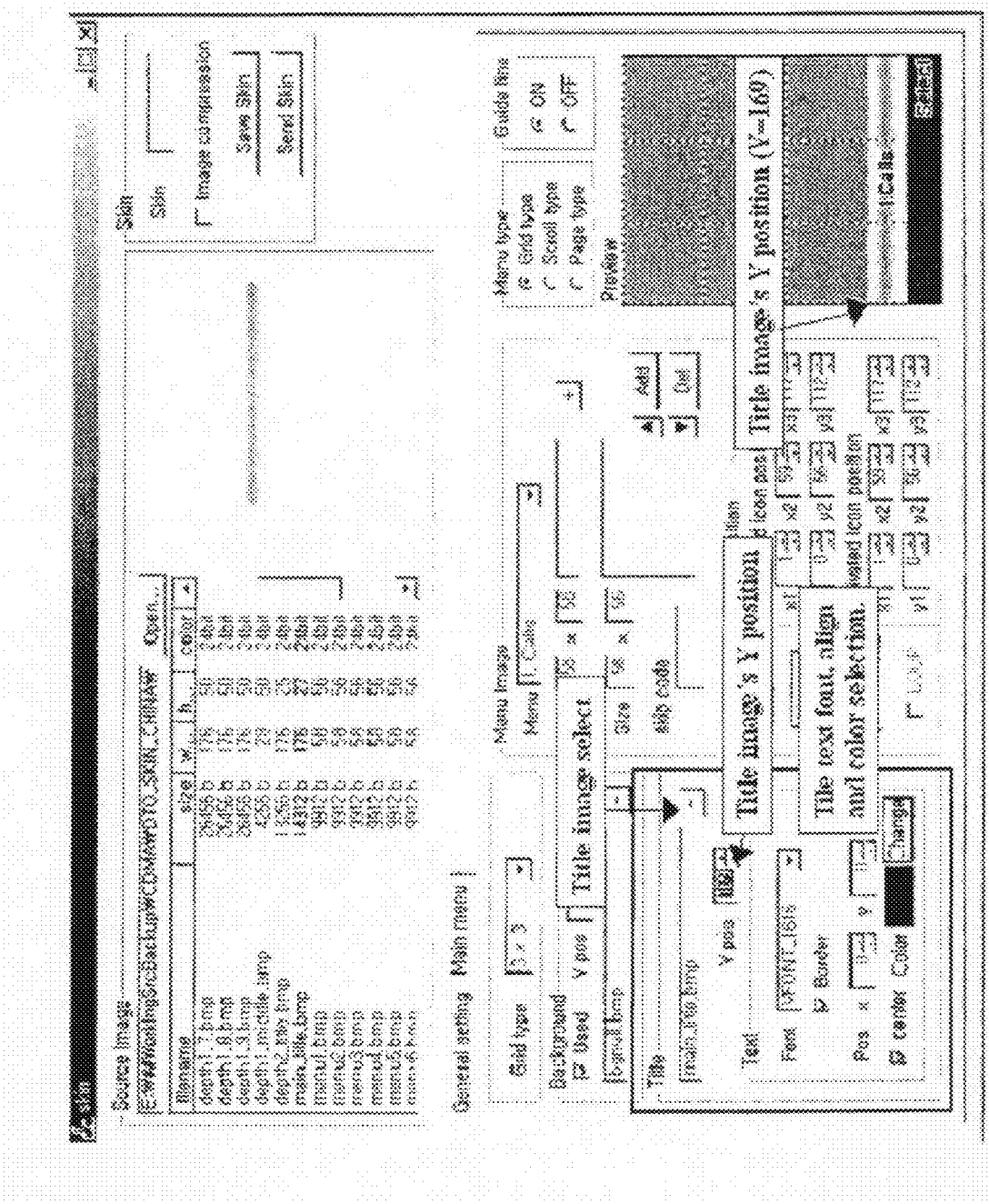
Figure 10C:
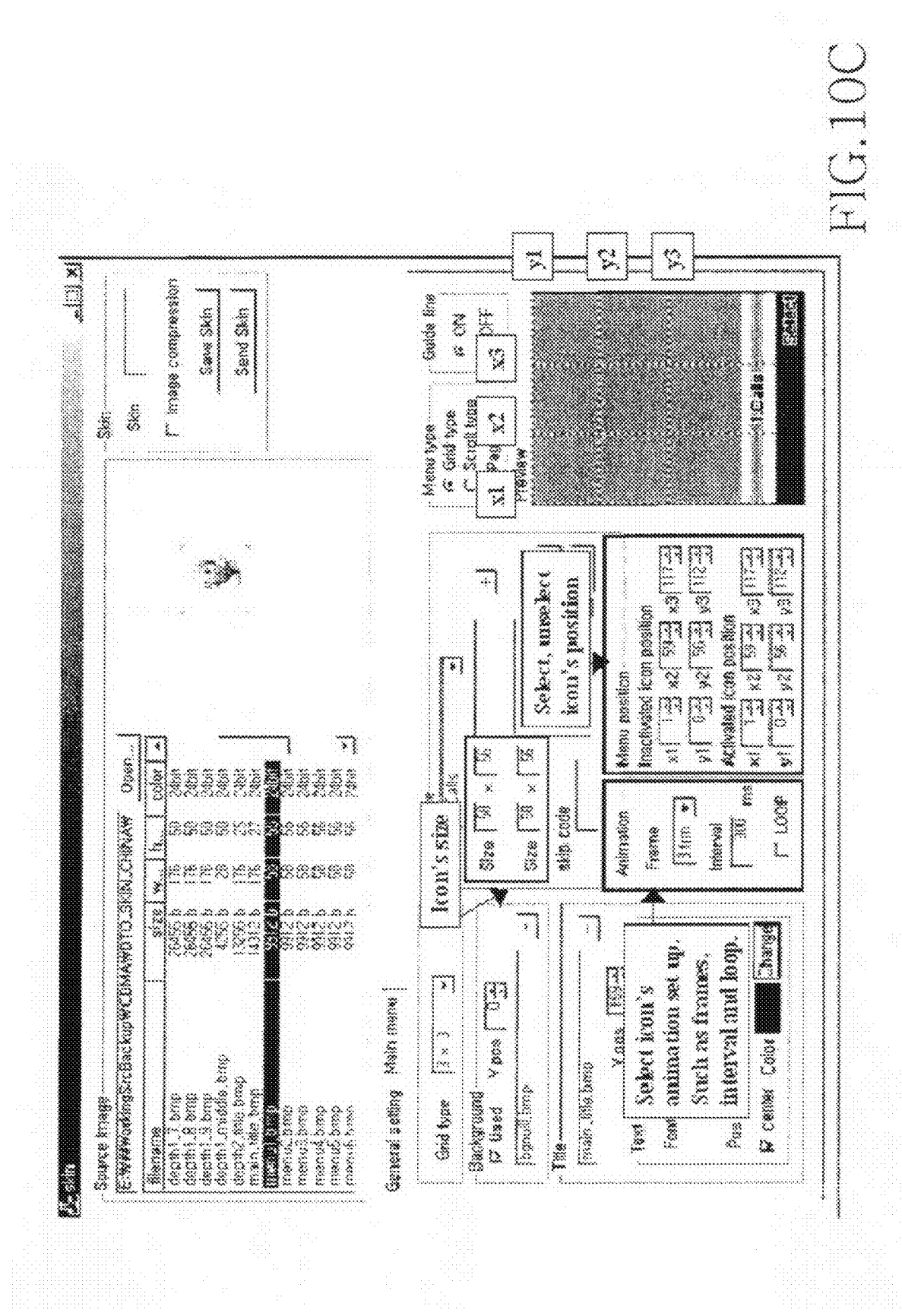
Figure 10D:
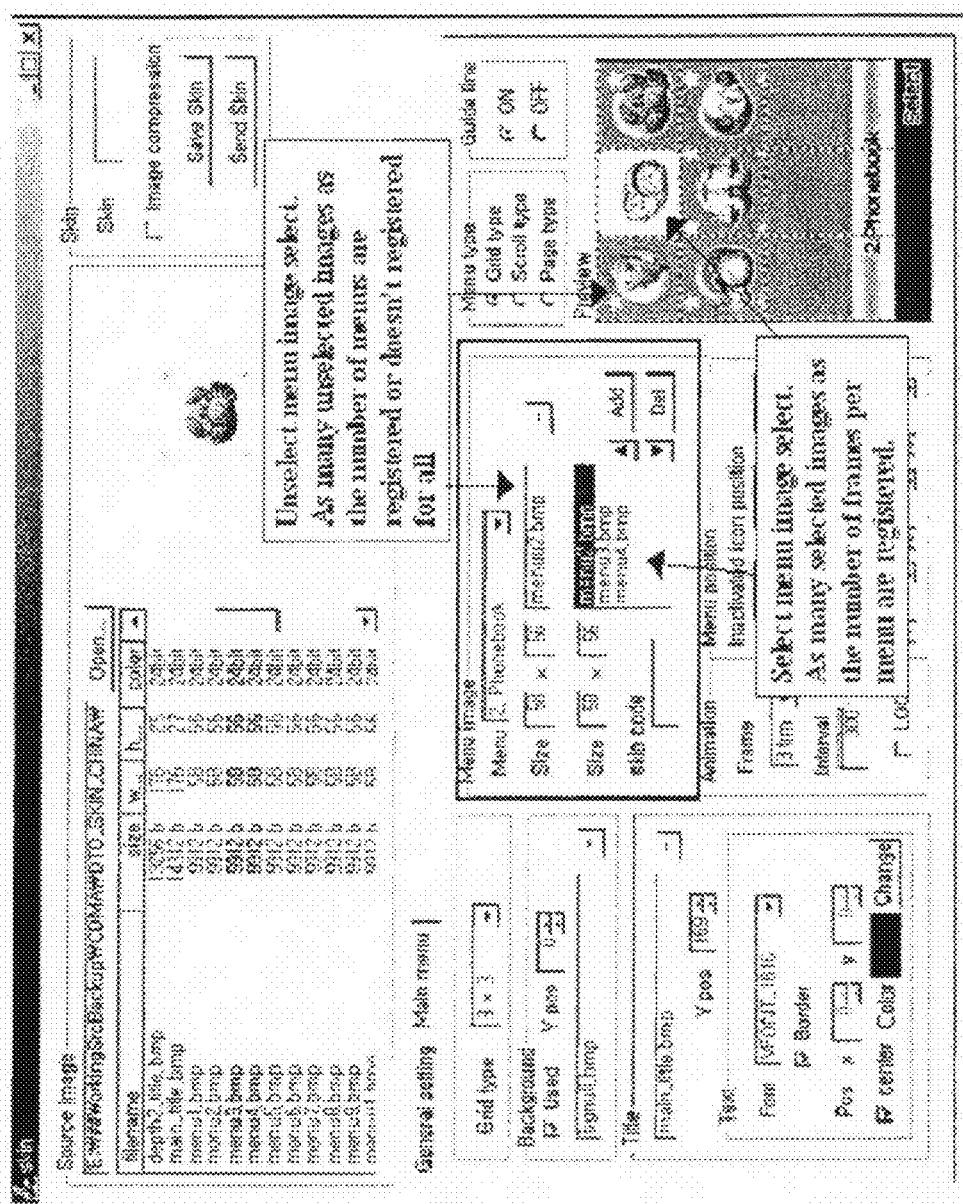

In the select image setting procedure, with the name of a title displayed, the user selects a desired image from an image list and the size and position of the selected image in the dialog box illustrated in FIG. 10C. The computer controller then displays the selected image of the selected size at the selected position for the title in the Preview window. As previously described, the select image may occupy one or more frames and comprise a still image, a moving picture, or multimedia data such as an animation shot.

As many select images as the number of menu titles are set. A select menu can comprise a main menu, submenus under the main menu, and sub-submenus under the submenus. When an image is selected for the select menu, the main menu is first selected and then submenus under the main menu are selected.

By compressing the select and unselect images, memory capacity taken for storing the menu images is saved considerably. Therefore, when the user clicks on Image Compression in step 349, the computer controller sets the image compression function in step 351. In this manner, the grid menus are set completely and thus a skin generation procedure follows, for transmission to the mobile phone. When the user clicks on Save Skin in step 353, the computer controller determines whether there exists every necessary image for menu generation in step 355. In case of a lack of images for the grid menus, the computer controller returns to step 311 and performs image setting. On the other hand, if every necessary image exists, the computer controller proceeds to step 241 of FIG. 3 for skin generation.

Figure 5A:
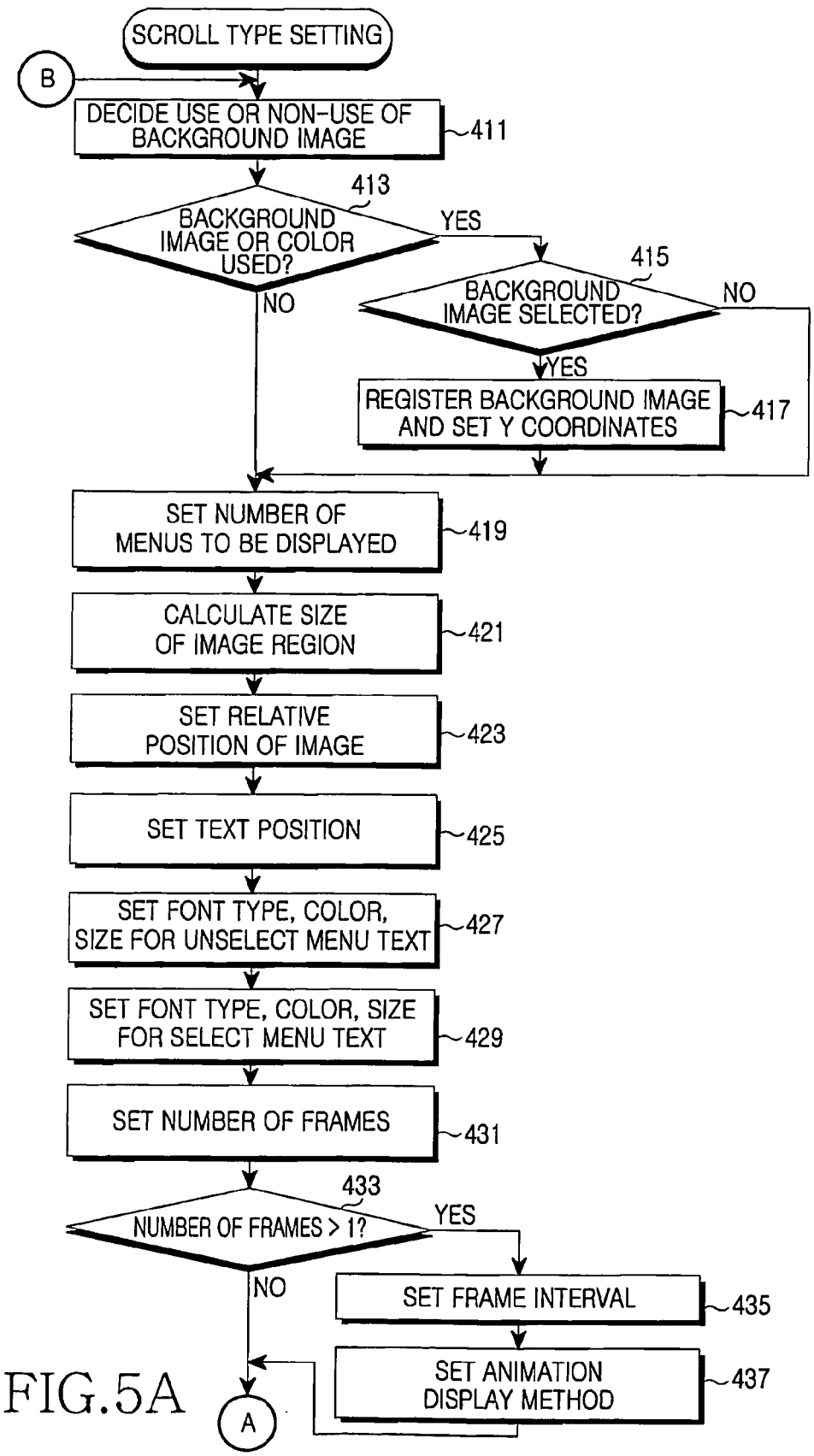
FIGS. 5A and 5B are flowcharts illustrating a scroll menu generating procedure according to an embodiment of the present invention.
Figure 5B:
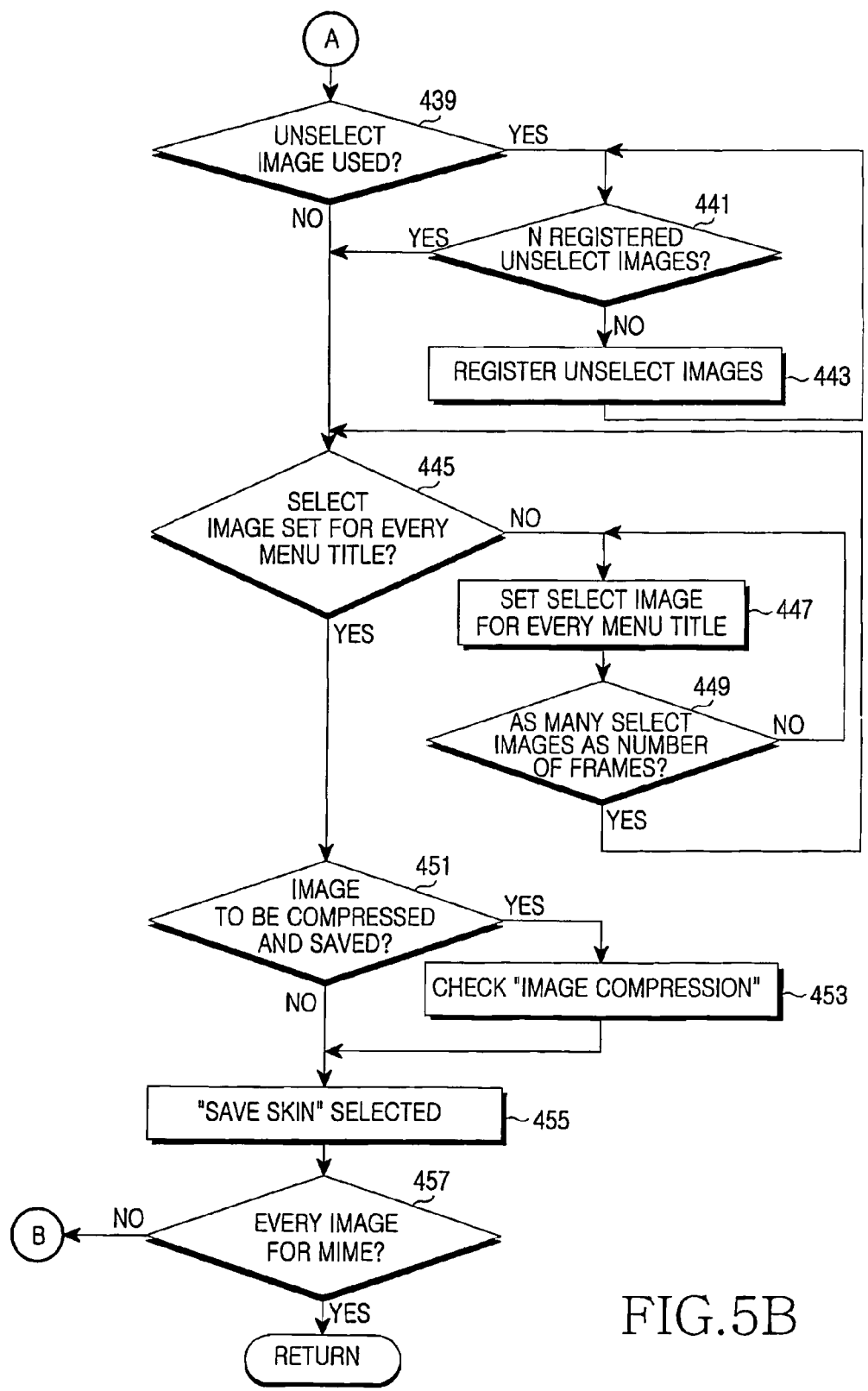

FIGS. 5A and 5B are flowcharts illustrating a scroll menu setting procedure in step 227 of FIG. 3, and FIGS. 11A, 11B and 11C illustrate dialog boxes displayed on the computer monitor in the process of the scroll menu setting.

Figure 9D:
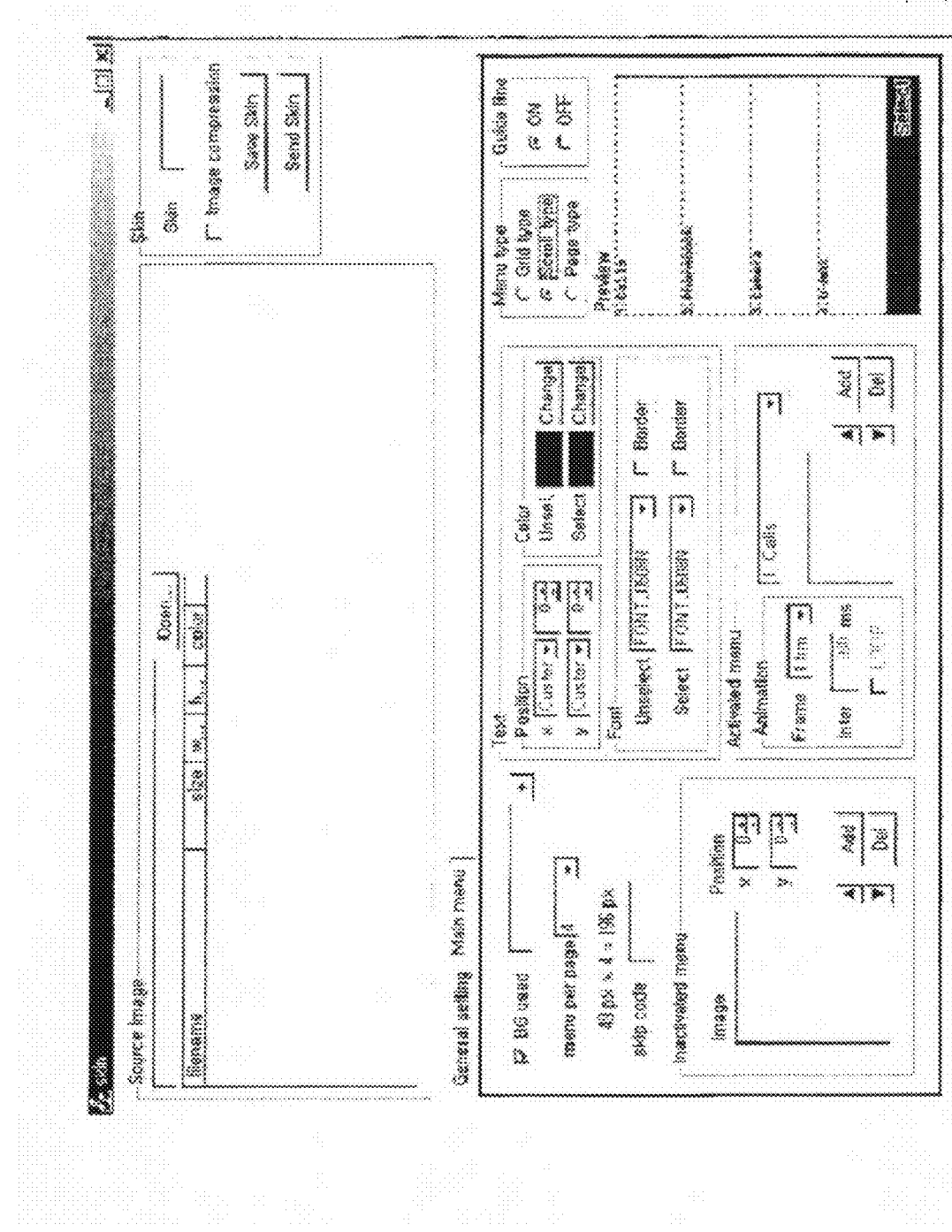
Figure 11A:
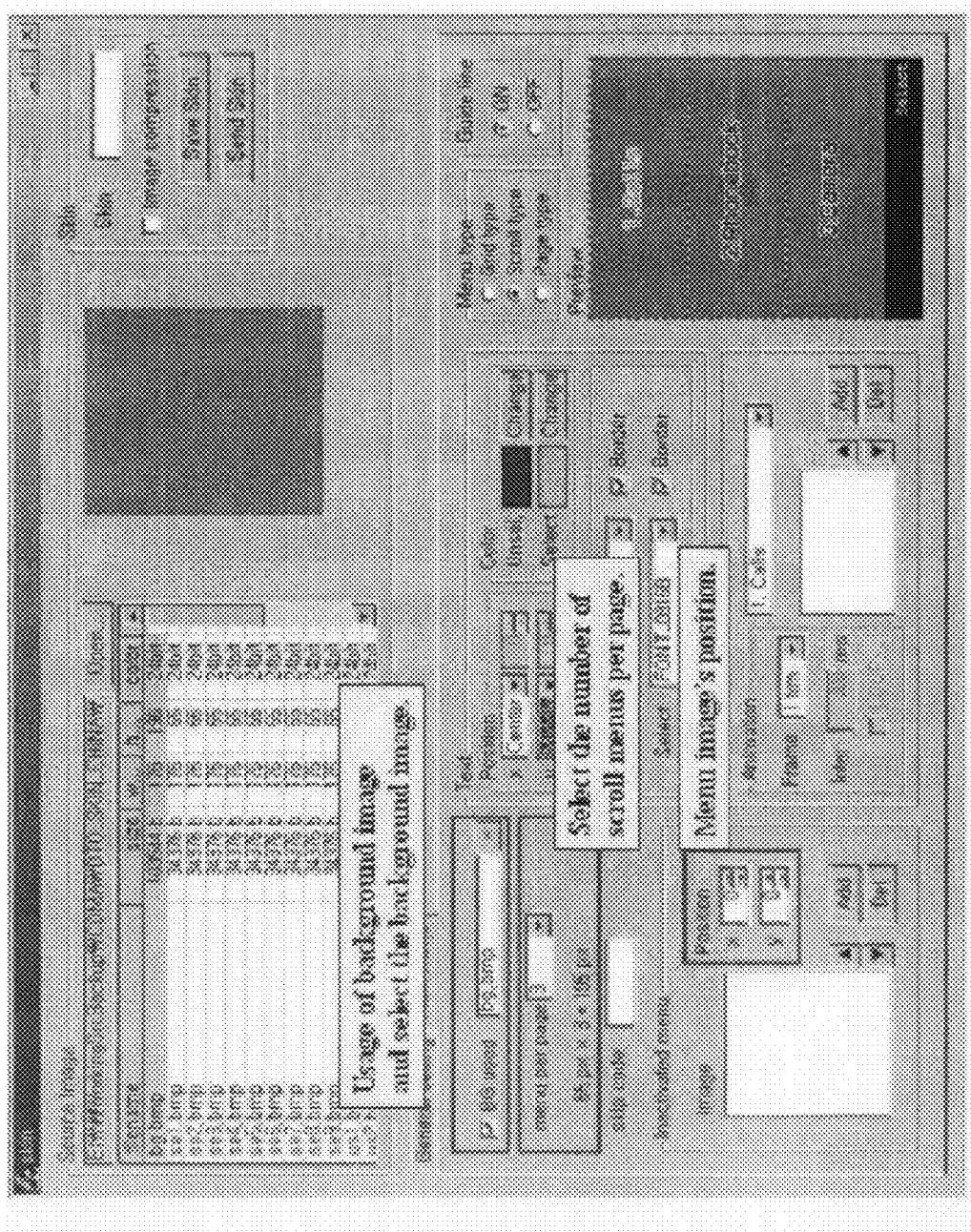
FIGS. 11A, 11B and 11C illustrate dialog boxes brought up for the scroll menu generating procedure according to an embodiment of the present invention.
Figure 11B:
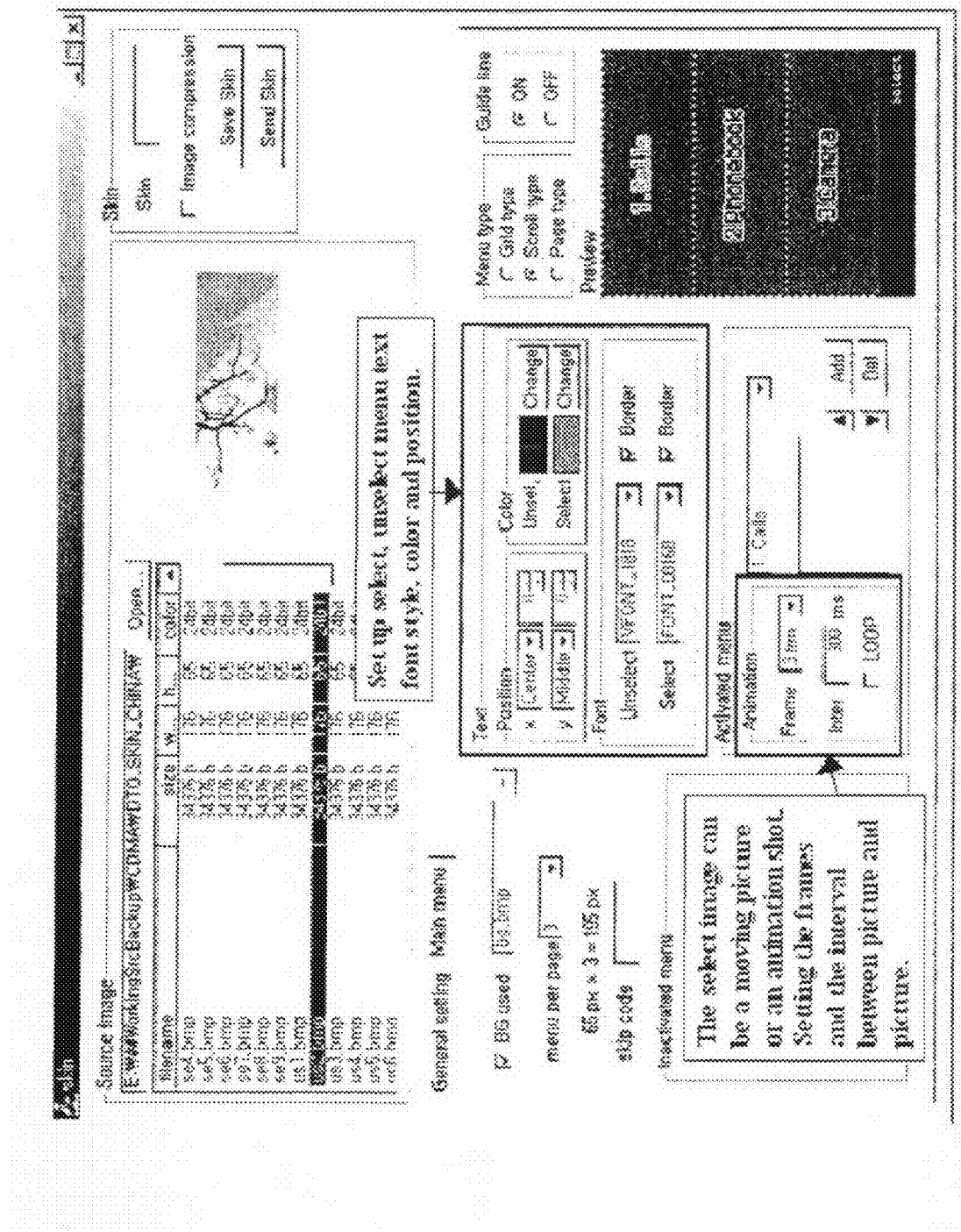

Referring to FIGS. 5A and 5B and FIGS. 11A to 11C, upon selection of Scroll type, the dialog box illustrated in FIG. 9D is displayed. If the user clicks on Background Use in the dialog box in step 411, the computer controller displays a list of background images in step 413, as illustrated in FIG. 11A. When an image is selected from the image list and its position is determined in step 415, the computer controller sets the selected background image and its position and save them in step 417. The selected background image is displayed in the Preview window.

The computer controller selects the number of scroll menus per page according to user selection in step 419. The number of scroll menus per page is N at maximum. Given 1 to 9 scroll menus per page, N is then 9. In the illustrated case of FIG. 11B, 3 scroll menu images are set in a page. In step 421, the computer controller calculates the size of scroll menu images according to the number of scroll menus per page. The computer controller sets relative positions of the image in the menu display region in step 423, and sets the position of text in the menu display region in step 425. In step 427, the computer controller sets the font types, font color and font size of text for the unselect menu titles. In step 429, the computer controller sets the font types, font color and font size of text for the select menu titles. In this manner, the positions of menu images and the positions of title texts on the display 130 can be set and a font type, size, and color can be set for texts of the select and unselect menus, independently. Through steps 419 to 429, the computer controller sets the number and size of scroll menu images to be displayed in the display region of the display 130, and the start positions and colors of title texts in the menu image region.

In step 431, the computer controller sets the number of frames per select image for each menu title. The select image can be a moving picture or an animation shot requiring a plurality of frames, or a single image requiring one frame such as a still image. If the number of frames is larger than 1 in step 433, the computer controller sets a time interval between frames and a frame displaying method in steps 435 and 437. The menu image is repeatedly played or played once.

The computer controller sets menu images for the scroll menus to be displayed on the display 130, as illustrated in FIG. 2L. The select image of a scroll menu is displayed when the scroll menu is selected, and the unselect image of the scroll menu is displayed at a position other than the position of a select image when the scroll menu is not selected. Unselect images may not be set. In this case, the background image is filled at the positions that the unselect images might otherwise occupy, with a select image displayed.

Upon selection of the unselect image setting function in step 439, the computer controller selects N unselect images in steps 441 and 443. To select the unselect images, with the name of a title displayed, the user selects a desired image from an image list and the size and position of the selected image in a dialog box illustrated in FIG. 11C. The computer controller then displays the selected image of the selected size at the selected position for the title in the Preview window. N unselect images are registered. In the case where the unselect images are not set, steps 439 and 441 are not performed.

Regarding a procedure for setting select images, select images for up to N menu titles are set in steps 445 to 449. Specifically, the computer controller sets a select image for a menu title in step 447 and determines whether as many images as the number of frames have been set in step 449. By repeating steps 447 and 449, the image is set as many times as the number of frames per select image. In the presence of remaining menu titles in step 445, the computer controller sets select images for the menu titles, repeating steps 447 and 449. Upon completion of setting a select image for each menu title in step 445, the computer controller terminates the select image setting procedure.

Figure 11C:
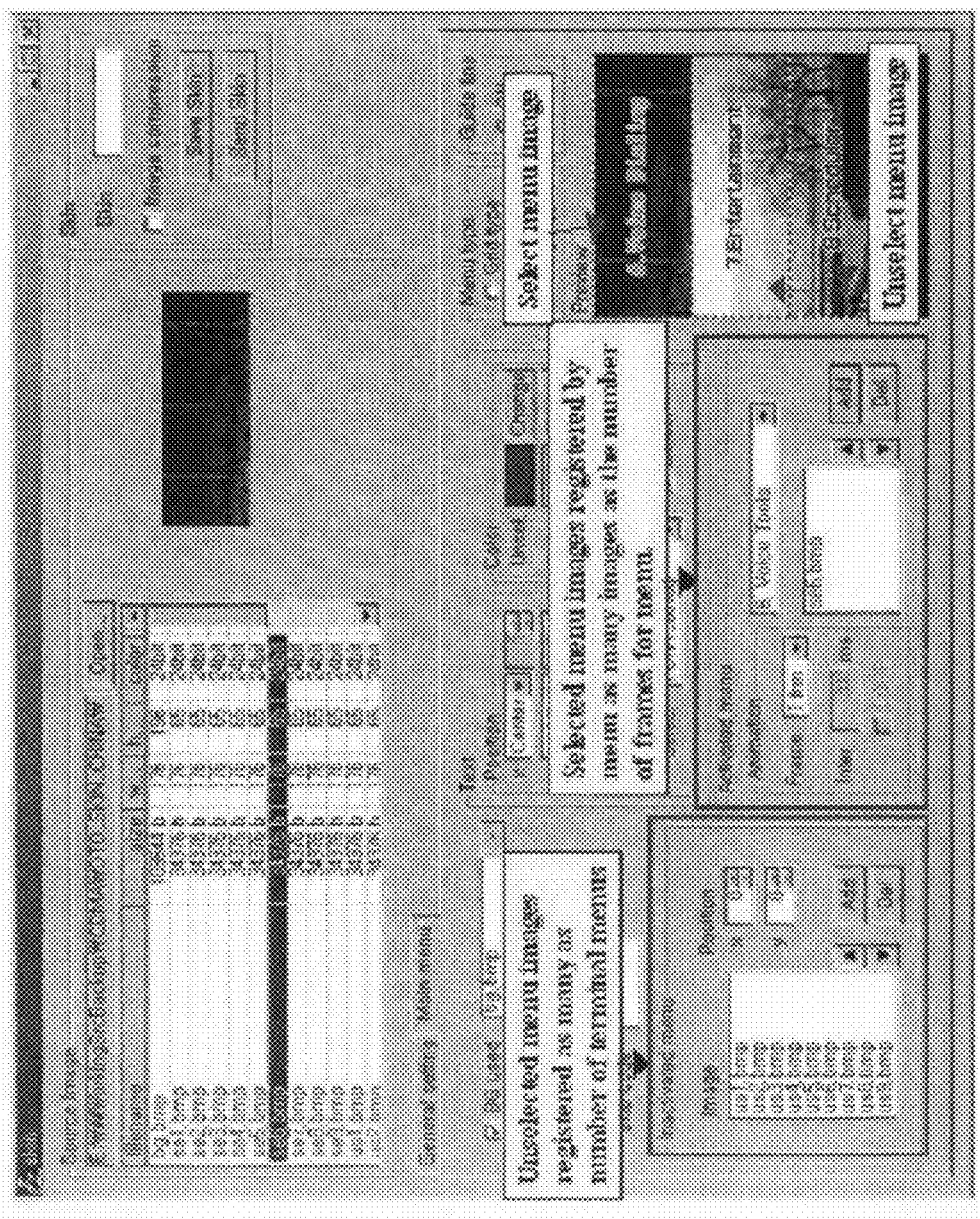

In the select image setting procedure, with the name of a title displayed, the user selects a desired image from an image list and the size and position of the selected image in the dialog box illustrated in FIG. 11C. The computer controller then displays the selected image of the selected size at the selected position for the title in the Preview window. As previously described, the select image may occupy one or more frames and it can comprise a still image, a moving picture, or multimedia data such as an animation shot.

As many select images as the number of menu titles are set. A select menu can comprise a main menu, submenus under the main menu, and sub-submenus under the submenus. When an image is selected for the select menu, the main menu is first selected and then submenus under the main menu are selected.

By compressing the select and unselect images, memory capacity taken for storing the menu images is saved considerably. Therefore, when the user clicks on Image Compression in step 451, the computer controller sets the image compression function in step 453. In this manner, the scroll menus are set completely and thus a skin generation procedure follows, for transmission to the mobile phone. When the user clicks on Save Skin in step 455, the computer controller determines whether there exists every necessary image for scroll menu generation in step 457. In case of a lack of images for the grid menus, the computer controller returns to step 411 and performs image setting. On the other hand, if every necessary image exists, the computer controller proceeds to step 241 of FIG. 3 for skin generation.

Figure 6A:
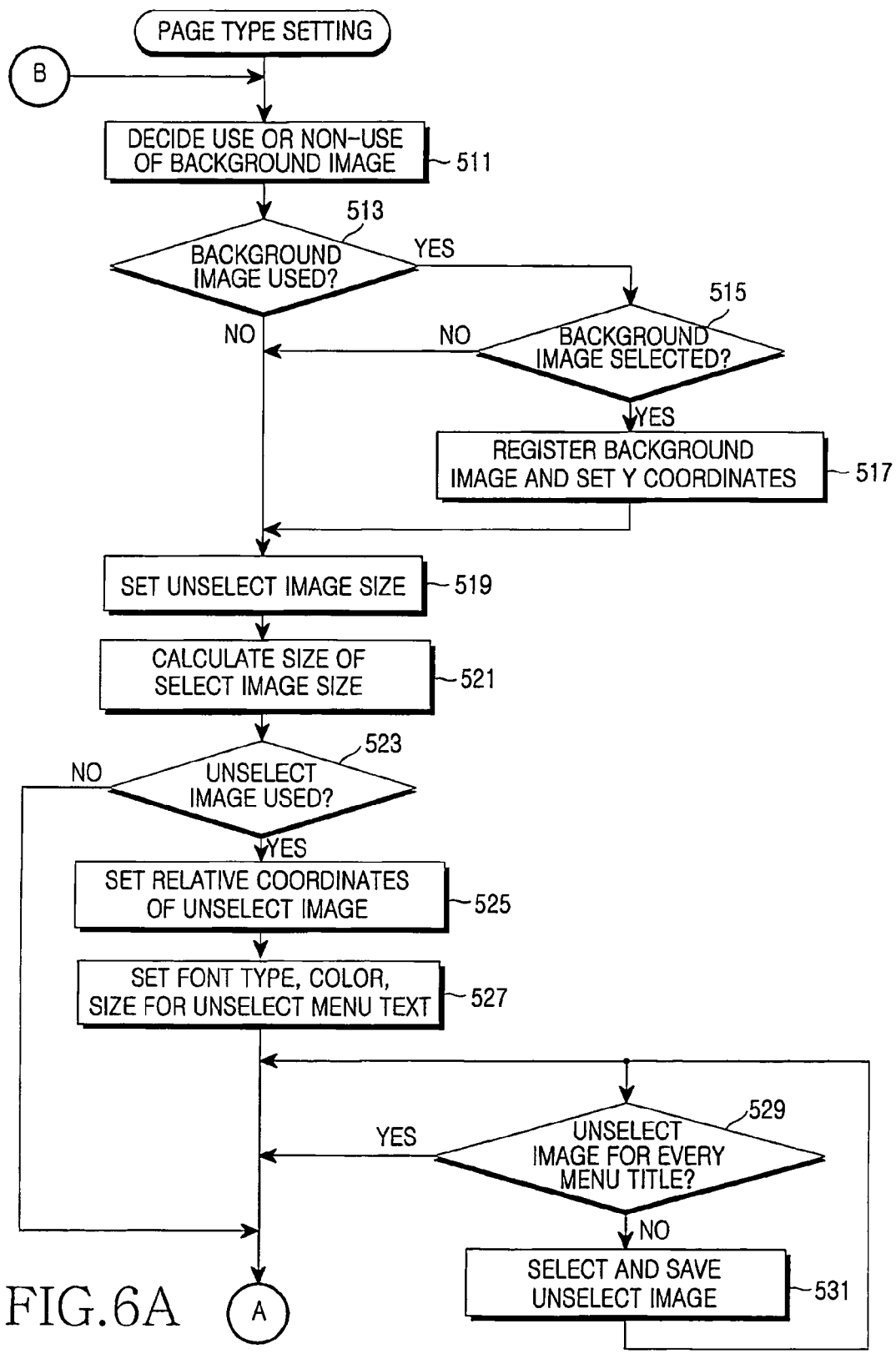
FIGS. 6A and 6B are flowcharts illustrating a page menu generating procedure according to an embodiment of the present invention.
Figure 6B:
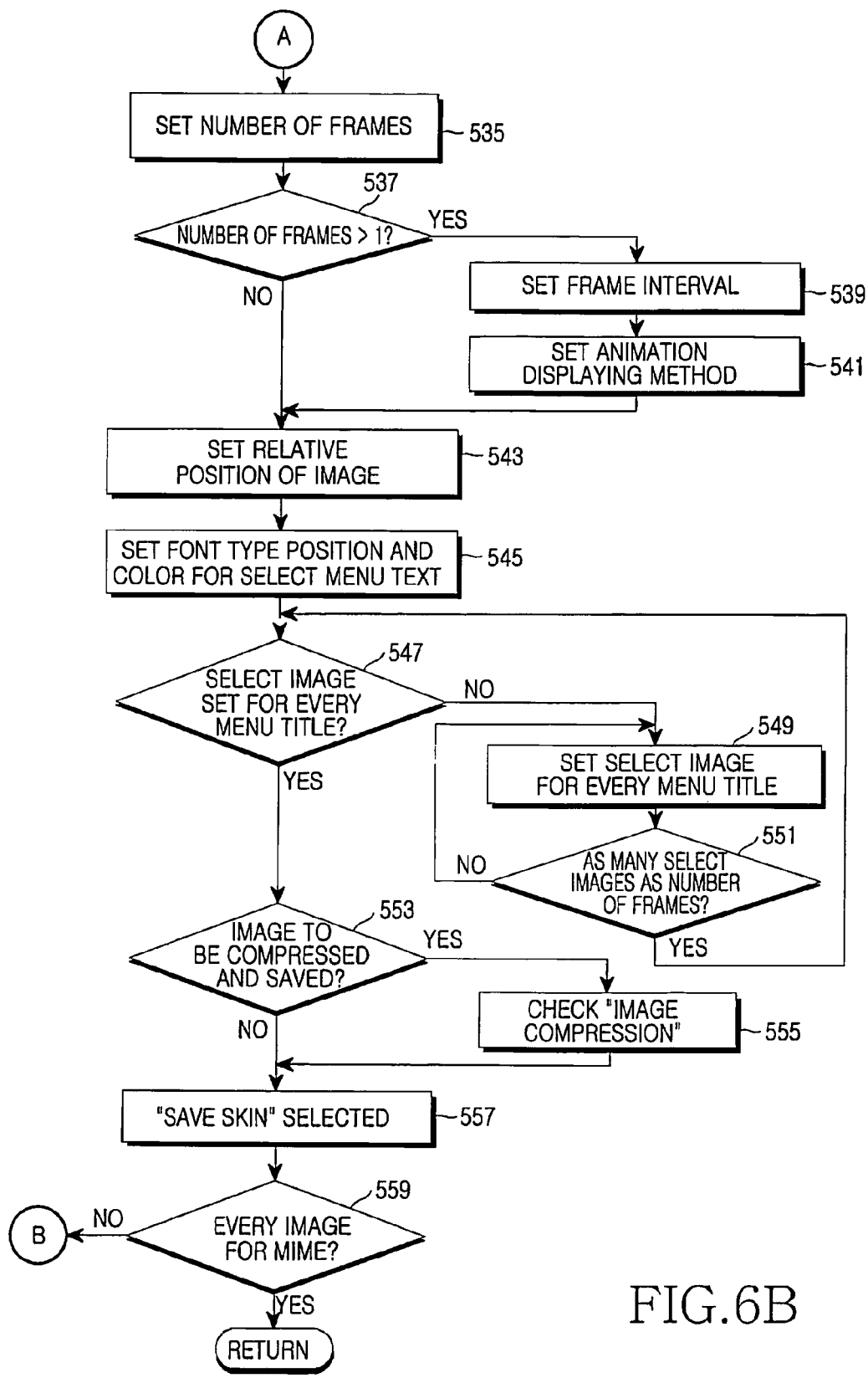

FIGS. 6A and 6B are flowcharts illustrating a page menu setting procedure in step 231 of FIG. 3, and FIGS. 12A to 12D illustrate dialog boxes displayed on the computer monitor in the process of the page menu setting.

Figure 9E:
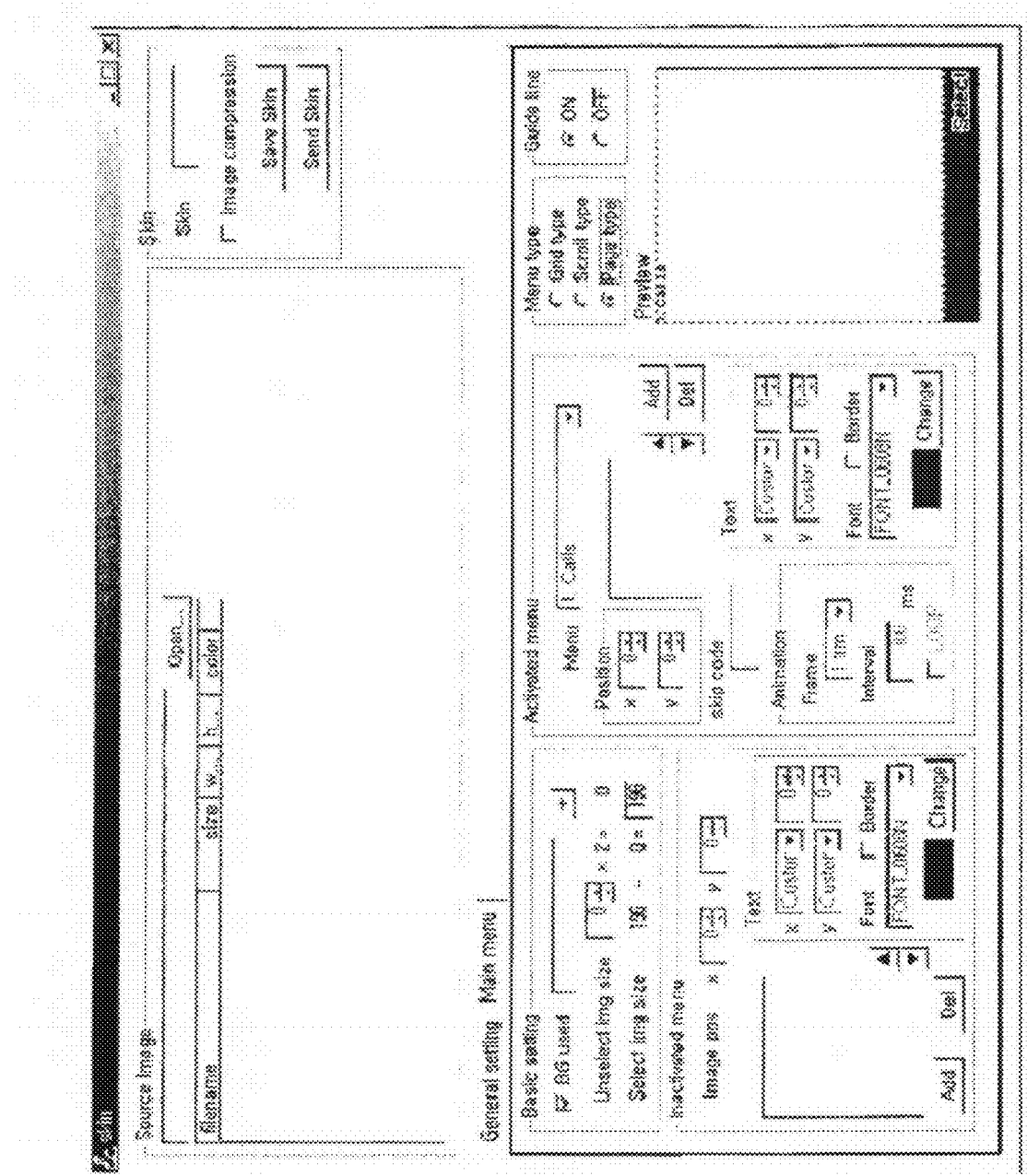
Figure 9F:
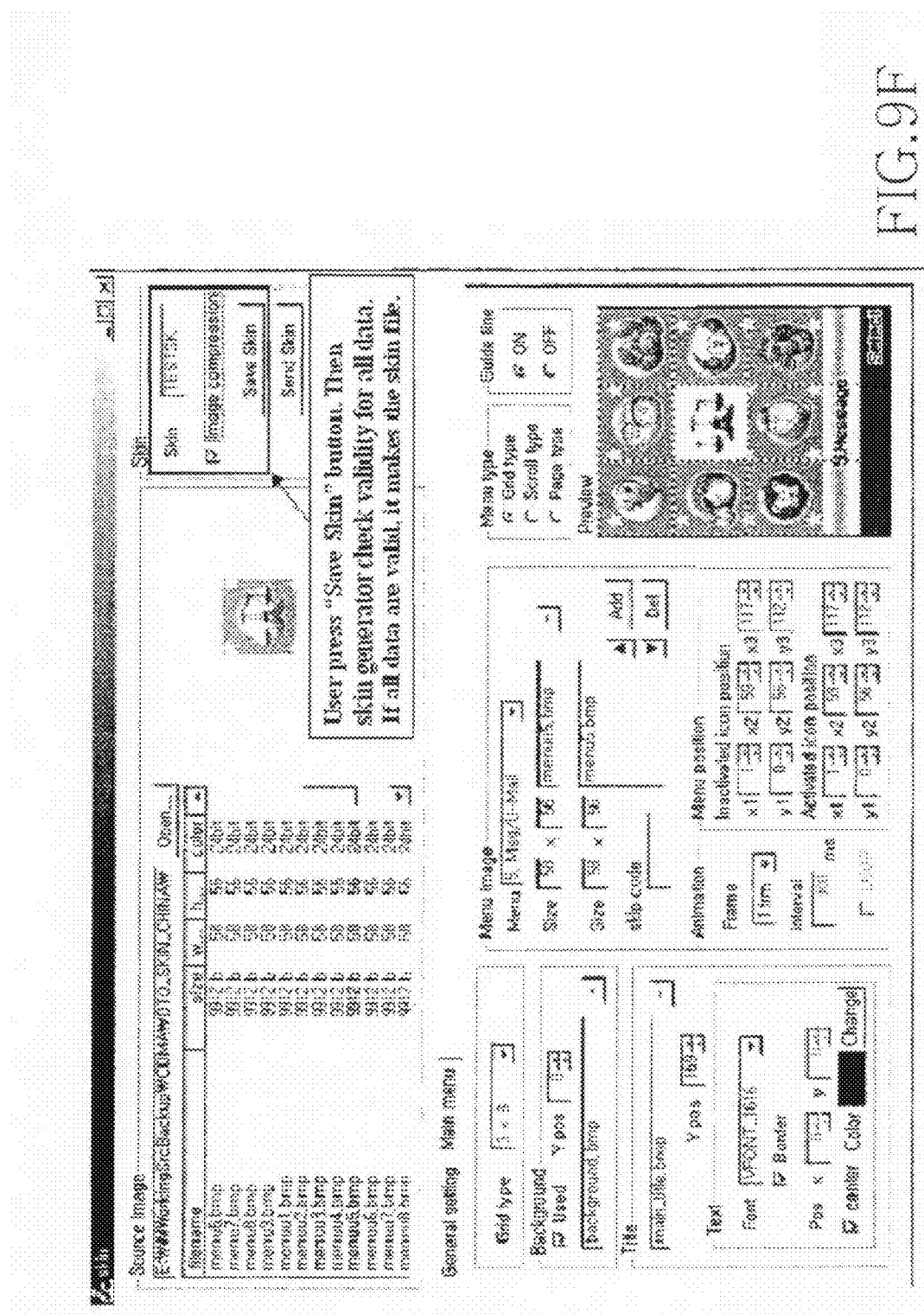
Figure 9G:
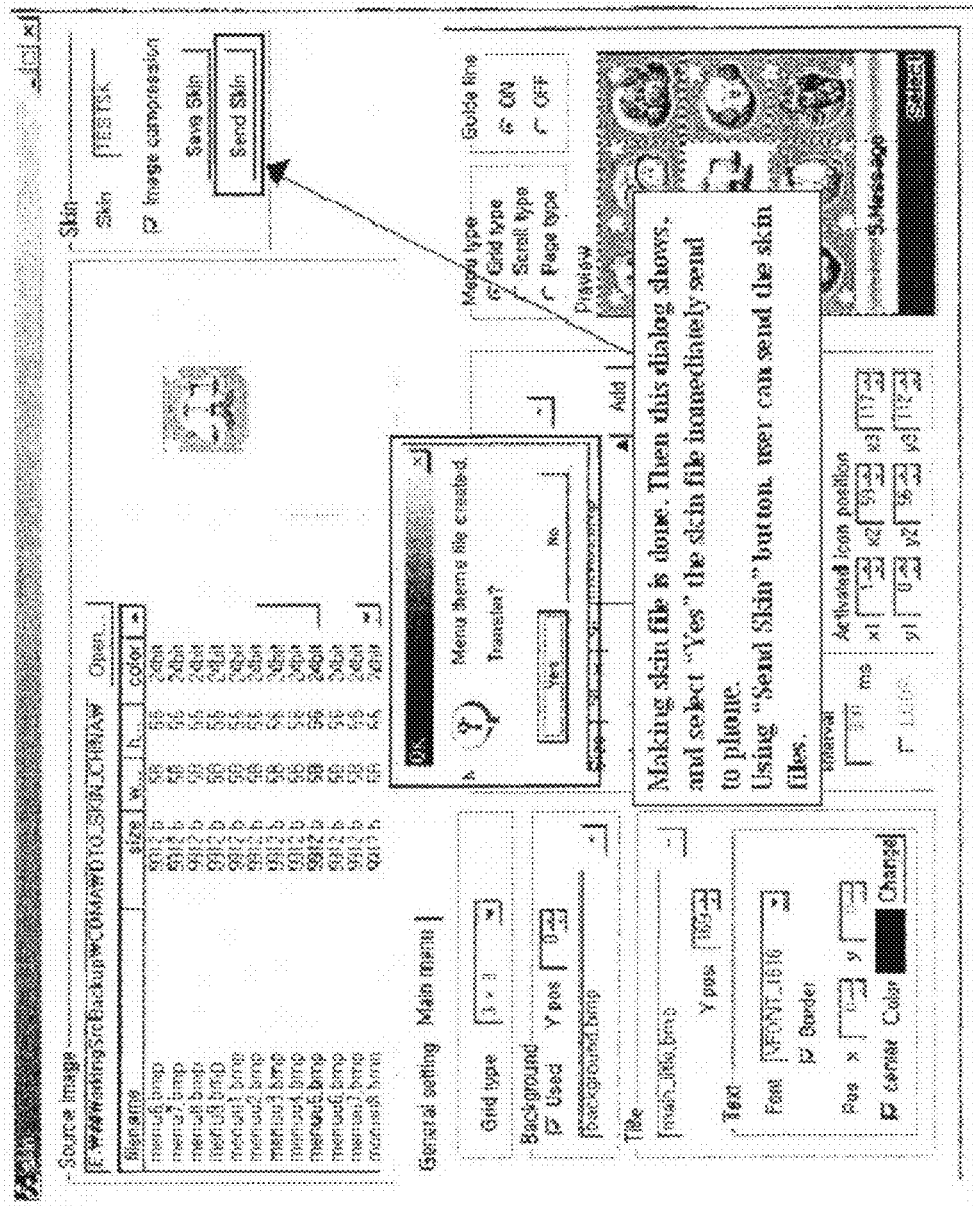
Figure 9H:
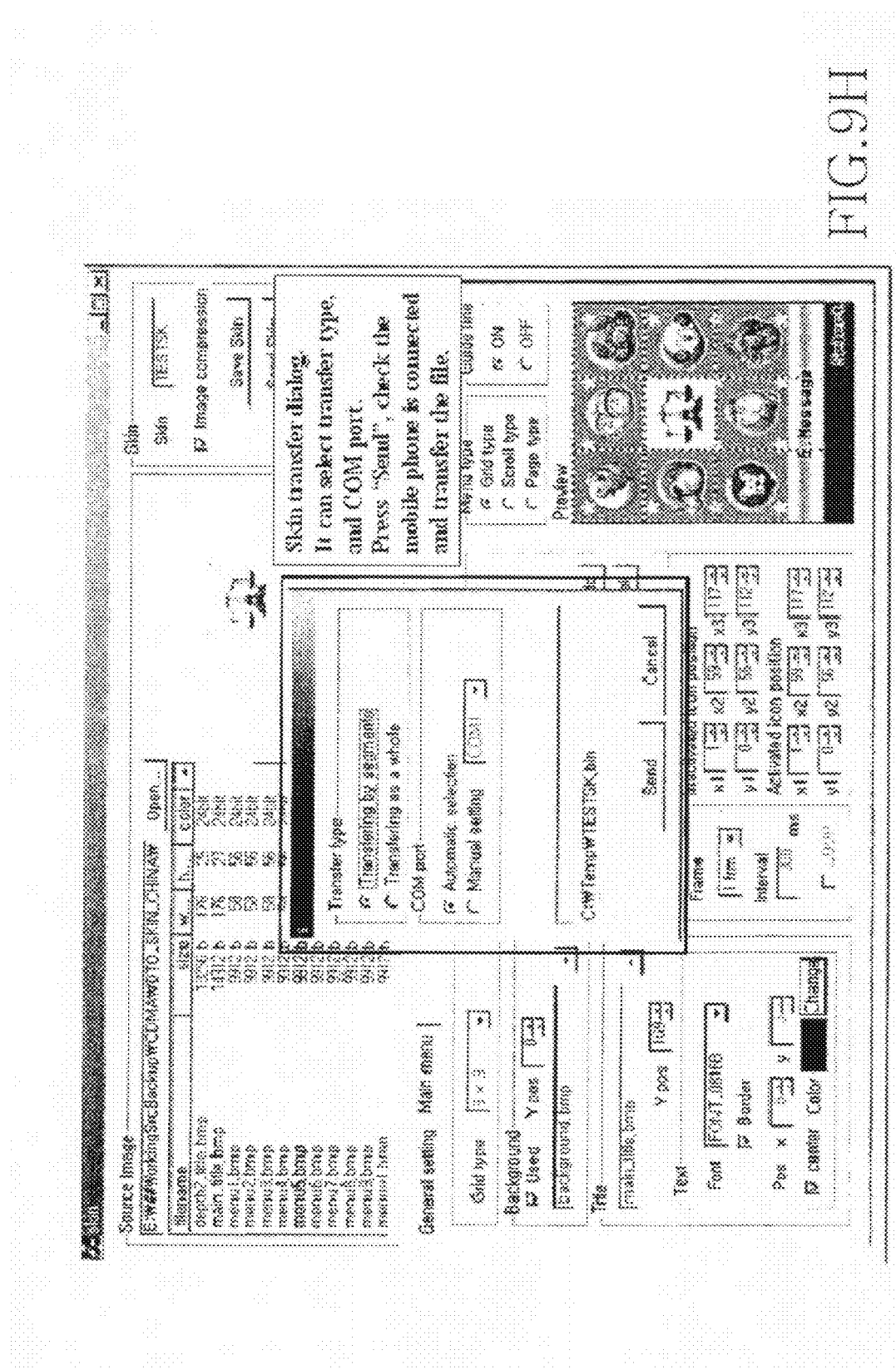
Figure 9I:
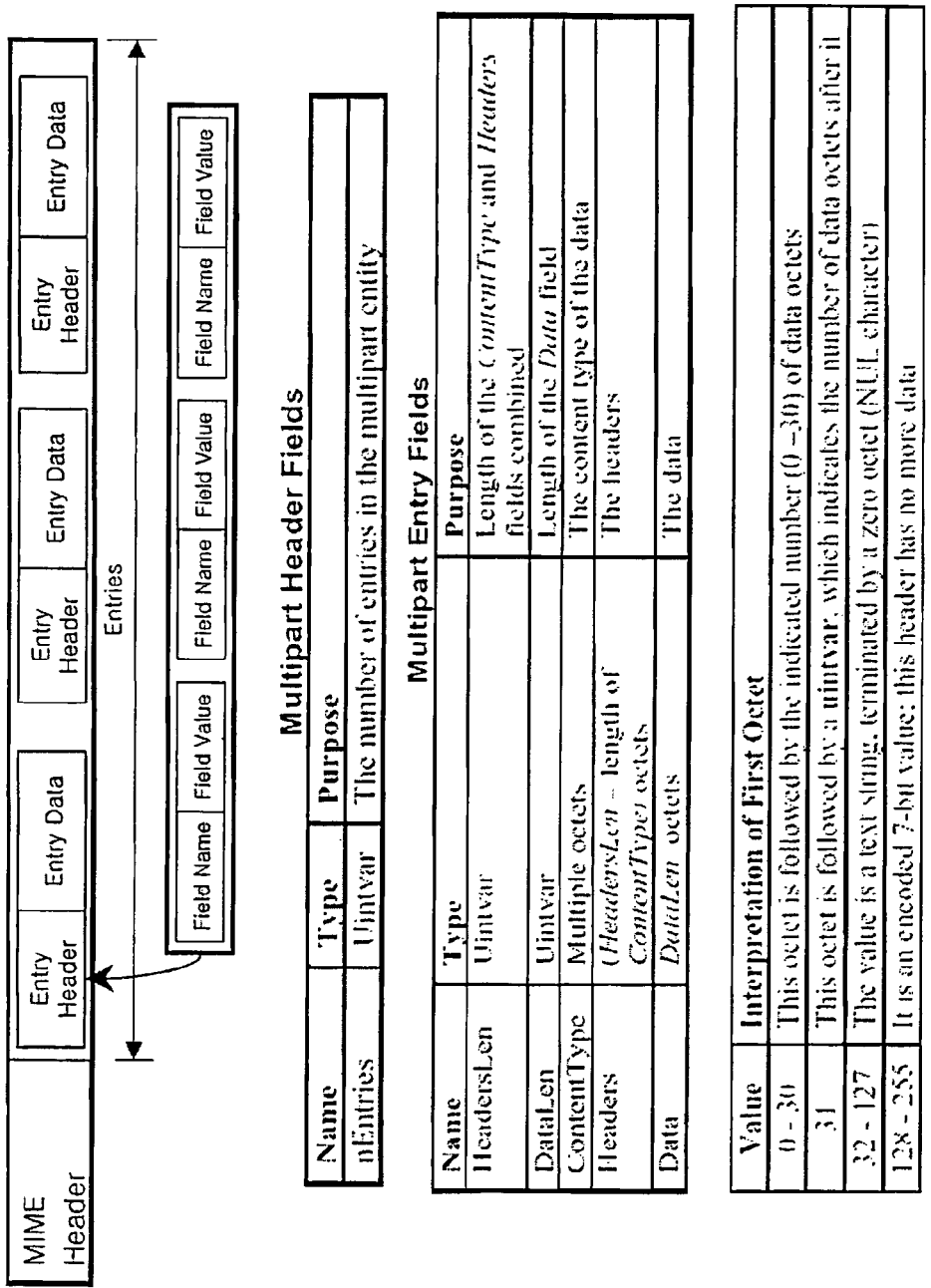

Referring to FIGS. 6A and 6B and FIGS. 12A to 12D, upon selection of Scroll type, the dialog box illustrated in FIG. 9E is displayed. If the user clicks on Background Use in the dialog box in step 511, the computer controller displays a list of background images in step 513. When an image is selected from the image list and its position is determined in step 515, the computer controller sets the selected background image and its position and saves them in step 517. The selected background image is displayed in the Preview window.

Figure 12A:
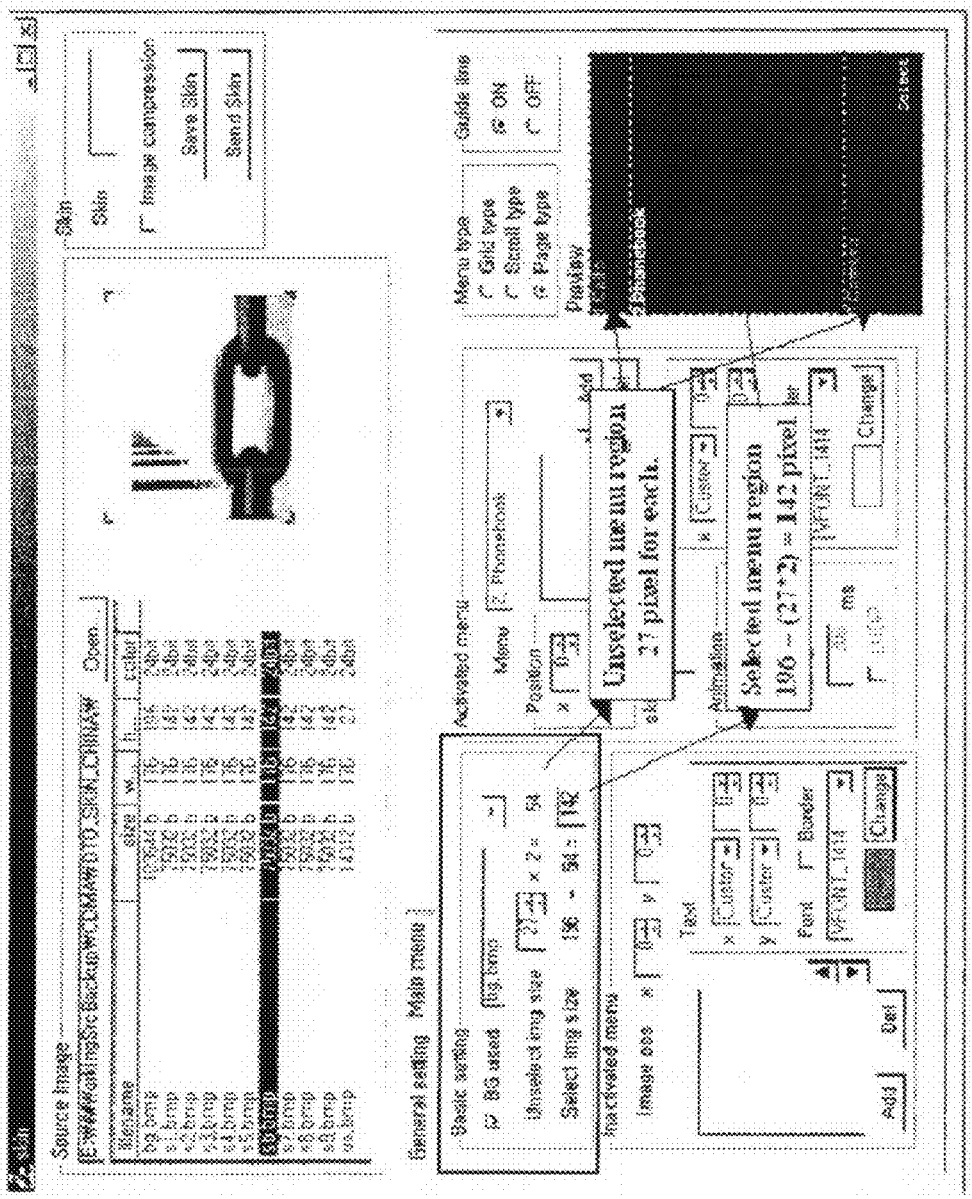
FIGS. 12A to 12D illustrate dialog boxes brought up for the page menu generating procedure according to an embodiment of the present invention.
Figure 12B:
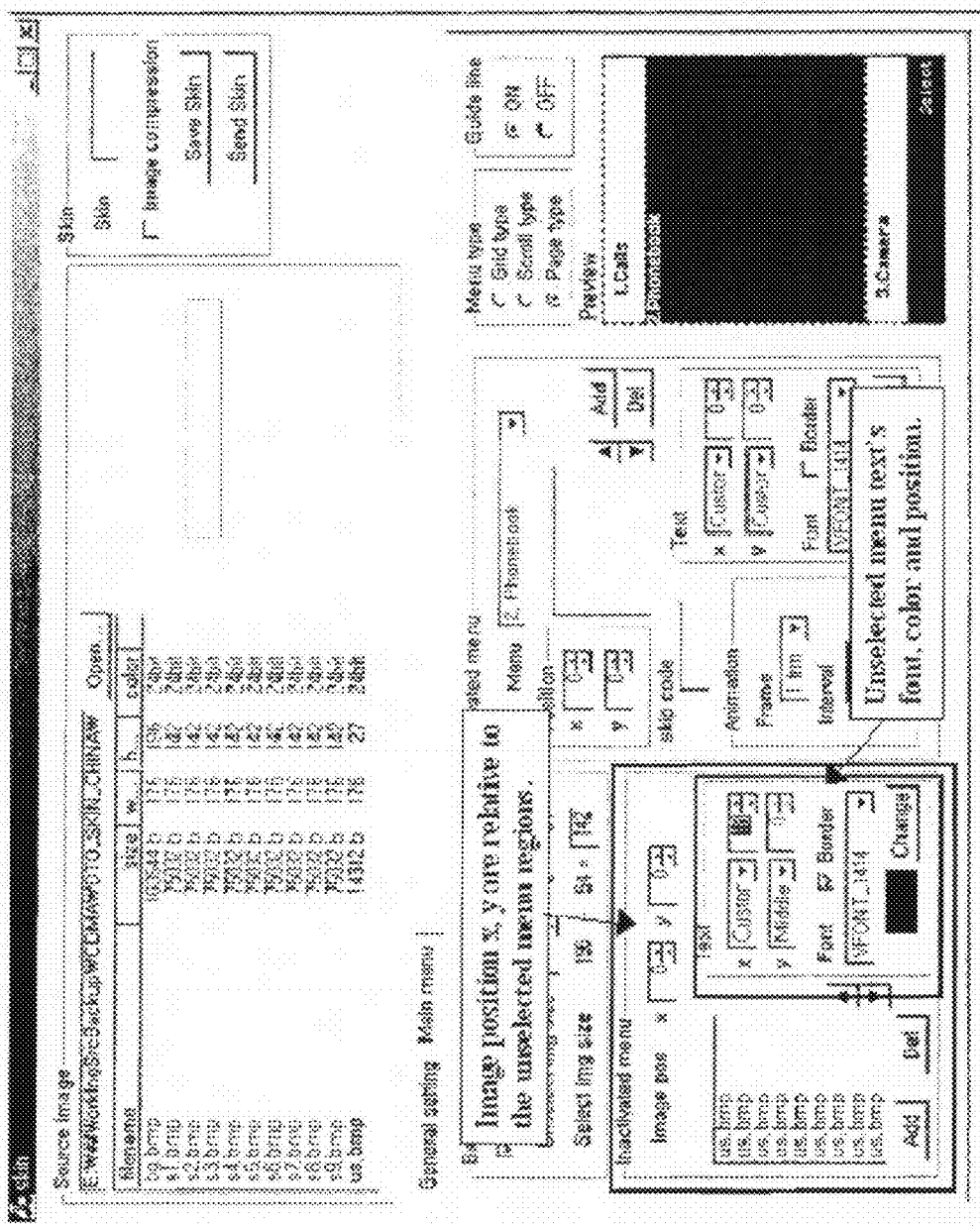

In step 519, the computer controller sets the size of unselect images according to user setting. The computer controller calculates the size of a select image displaying region according to the unselect image displaying region in step 521. Page menus are displayed on the display 130 in the manner illustrated in FIG. 2I. A select image is displayed at the center, with unselect images over and under the select image. The unselect images precede and follow the select image. The sizes of select and unselect images are set by the user. Since the display 130 is fixed in size, once the size of the select or unselect image is determined, that of the unselect or select image is automatically determined. In the illustrated case of FIGS. 6A and 6B, the unselect image size is first determined and thus the select image size is automatically determined. As illustrated in FIG. 12A, the computer controller calculates the areas of the unselect menus and the select menu and sets and save them.

Subsequently, the computer controller selects the number of page menus per page according to user selection. The number of page menus per page is N at maximum. Given 1 to 9 page menus per page, N is then 9. In the illustrated case of FIG. 11B, 4 page menu images are set in a page.

When it is determined that unselect images are to be used in step 523, the computer controller sets a relative position of an unselect image in the unselect menu display region in step 525, and sets the font type, color and size of the unselect menu title in step 527. Through steps 529 to 531, the computer controller sets unselect images for the menu titles. If unselect images are set for all menu titles in step 531, the unselect image setting is completed.

In step 535, the computer controller sets the number of frames per select image for each menu title. The select image can be a moving picture or an animation shot requiring a plurality of frames, or a single image requiring one frame like a still image. If the number of frames is larger than 1 in step 537, the computer controller sets a time interval between frames and a frame displaying method in steps 539 and 541. The menu image is repeatedly played or played once.

The computer controller sets menu images for page menus to be displayed on the display 130, as illustrated in FIG. 2I. The select images and unselect images have been described in the descriptions of the grid and scroll menus. As in the grid and scroll menus, unselect images may not be set. In this case, the background image is filled at the positions that the unselect images might otherwise occupy, with a select image displayed.

Regarding a procedure for setting select images, the computer controller sets the relative position of a select image in the select menu region in step 543 and sets a font type, size and color for a title text on the select image in step 545. By repeating steps 547 to 551, select images are set for up to N menu titles. Specifically, the computer controller sets a select image for each menu title in step 549 and determines whether the select image has been set as many times as the number of frames per select image in step 551. In the presence of remaining menu titles in step 547, the computer controller sets select images for the menu titles, repeating steps 549 and 551. Upon completion of setting a select image for each menu title in step 547, the computer controller terminates the select image setting procedure.

Figure 12C:
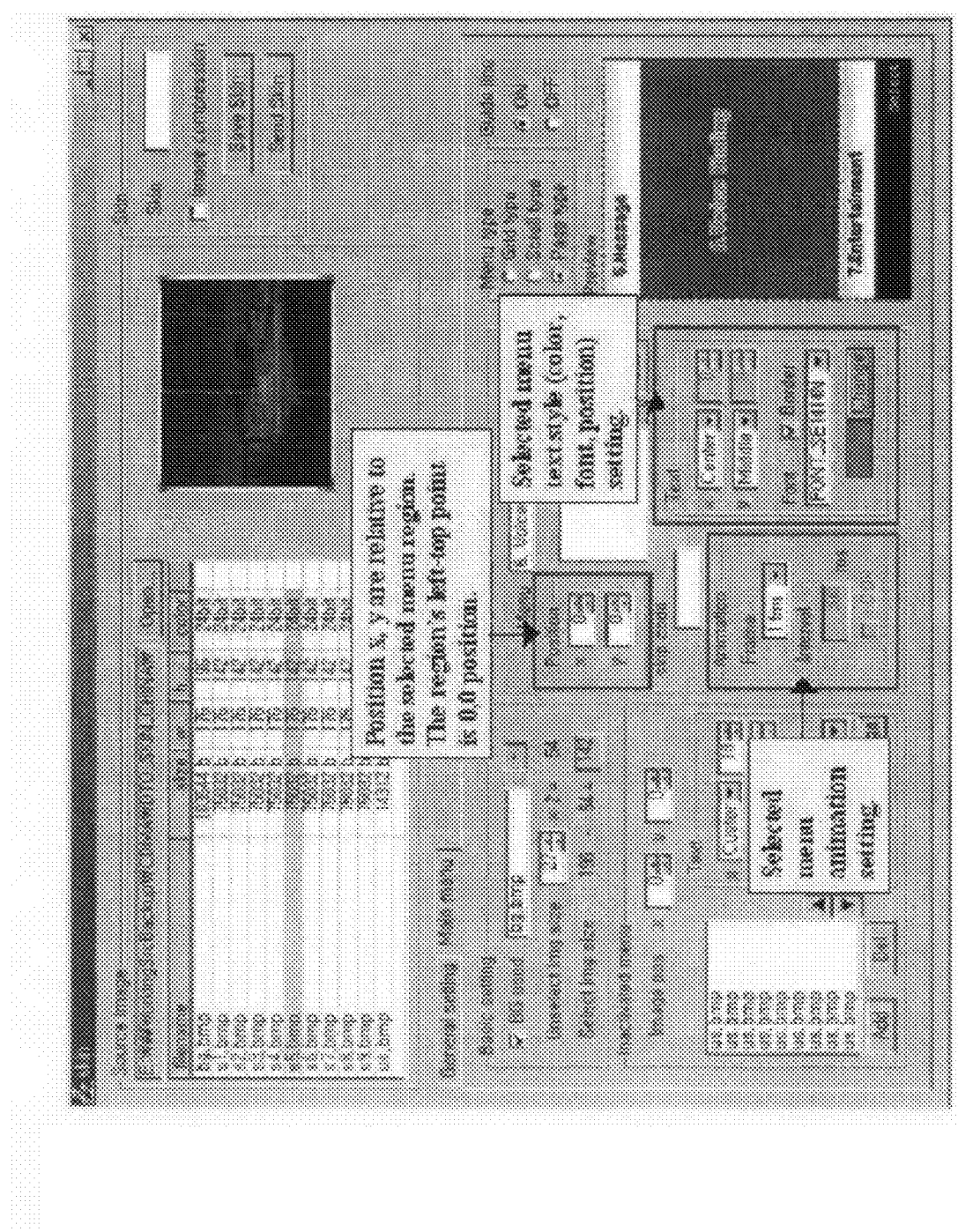
Figure 12D:
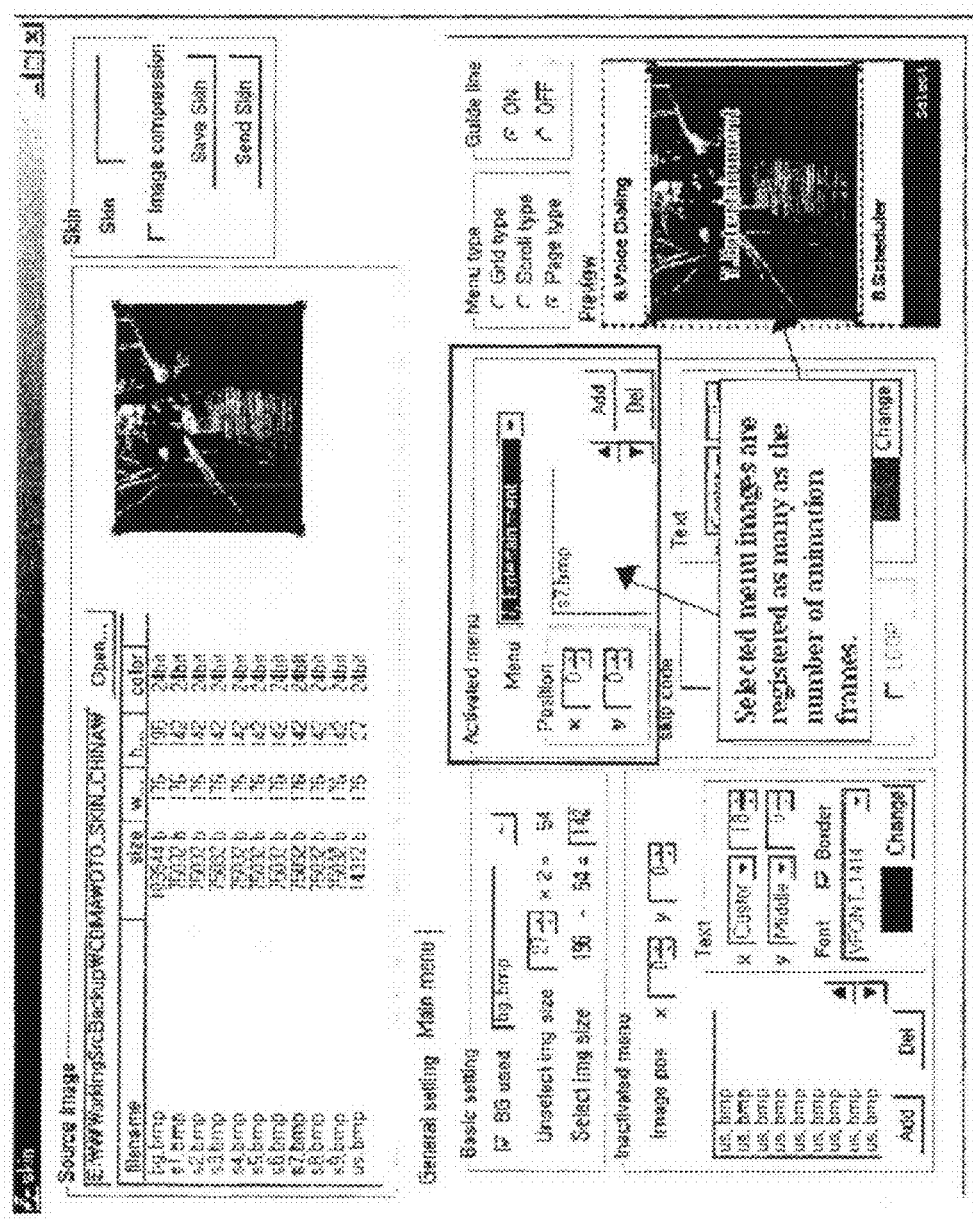

In the select image setting procedure, with the name of a title displayed, the user selects a desired image from an image list in the dialog box illustrated in FIGS. 12C and 12D. The computer controller then displays the selected image for the title in the Preview window. As described before, the select image may occupy one or more frames and it can be a still image, a moving picture, or multimedia data like an animation shot.

As many select images as the number of menu titles are set. A select menu can comprise a main menu, submenus under the main menu, and sub-submenus under the submenus. When an image is selected for the select menu, the main menu is first selected and then submenus under the main menu are selected.

By compressing the select and unselect images, memory capacity taken for storing the menu images is saved considerably. Therefore, when the user clicks on Image Compression in step 553, the computer controller sets the image compression function in step 555. In this manner, the scroll menus are set completely and thus a skin generation procedure follows, for transmission to the mobile phone. When the user clicks on Save Skin in step 557, the computer controller determines whether there exists every necessary image for scroll menu generation in step 559. In case of a lack of images for the grid menus, the computer controller returns to step 511 and performs image setting. On the other hand, if every necessary image exists, the computer controller proceeds to step 241 of FIG. 3 for skin generation.

Since a select image is different in size from an unselect image in the page menu type, select and unselect images are set in corresponding sizes. The select image is positioned at the center, with its preceding and following unselect images arranged over and under the select image. The positions of title texts can be set separately for the select and unselect images.

The mobile phone configured as illustrated in FIG. 1 stores downloaded menu file data in the data memory of the memory 120. The mobile phone is also provided with a menu select menu in a menu structure, for allowing the user to select a menu. The menu select menu refers to a menu displayed on the display 130 to prompt the user to select a menu type which is generated in the above-described procedures. Upon receipt of the menu file data generated in the procedure of FIG. 3, it is registered in the menu select menu. When the user selects a desired menu type, a file skin taking the form of a menu is parsed in procedures illustrated in FIG. 7, for use as a menu.

Figure 7:
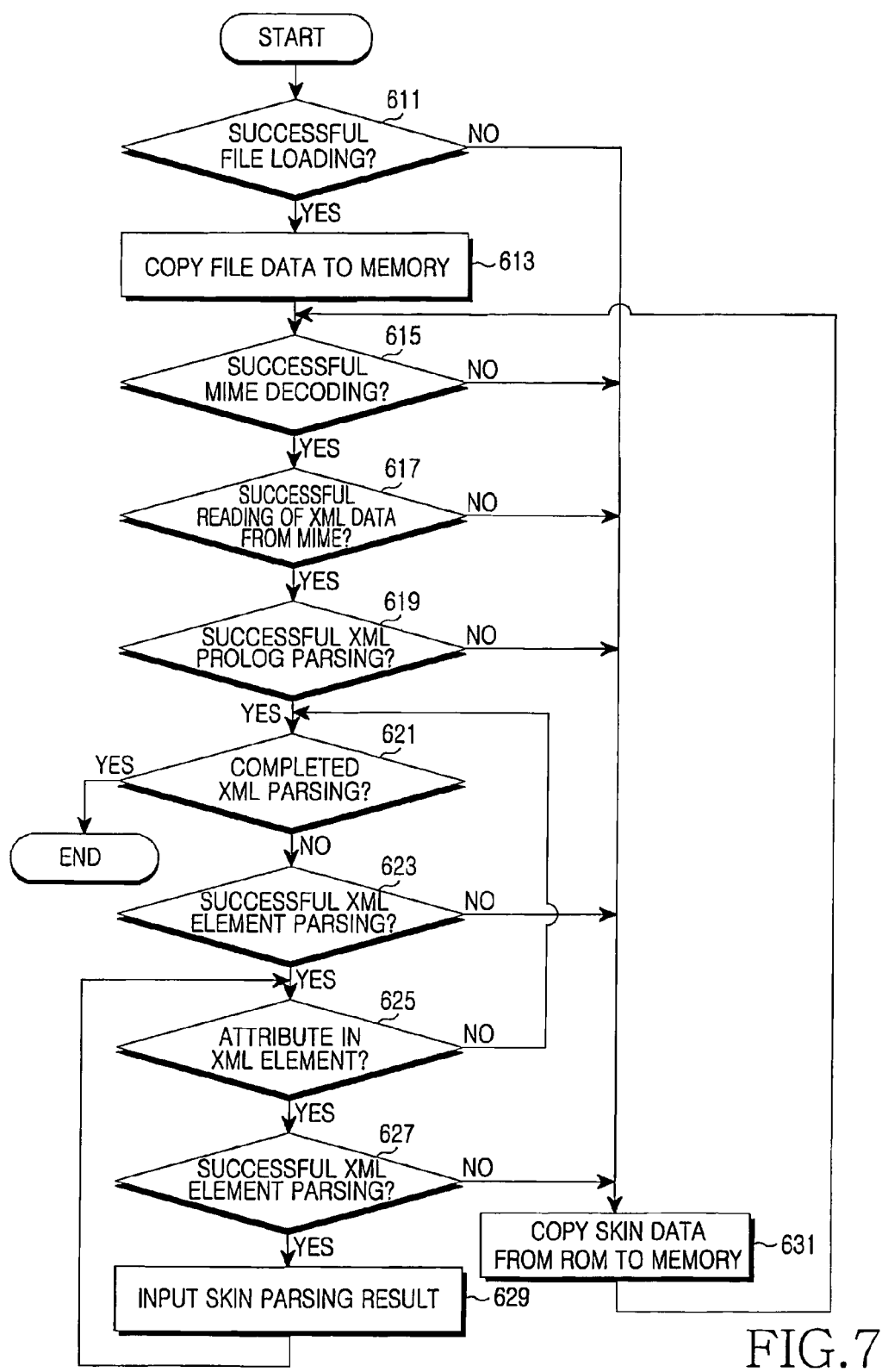
FIG. 7 is a flowchart illustrating a procedure for parsing generated menus according to an embodiment of the present invention.

Referring to FIG. 7, when the menu file data is downloaded in step 611, the controller 110 temporarily stores the menu file data in the memory 120 in step 613. The controller 110 decodes the MIME in step 615 and extracts XML data from the decoded MIME in step 617. In step 619, the controller 110 parses an XML prolog. In steps 621 to 629, the controller 110 parses XML elements, attributes of the parsed XML elements, and saves the parsed data in a skin structure. This operation is repeated until all XML elements are parsed. Upon generation of errors during the parsing, the controller 100 retrieves the menu file data from the ROM area of the memory 120 and copies the skin data onto the data memory of the memory 120 in step 631. Then, the controller 10 returns to step 615.

Table 1 below illustrates an example of the above-described menu skin parsing.

TABLE 1

File loading success
Copy file data to memory
Mime decoding success
XML Content reading success
Start XML parsing
XML Prolog parsing
XML Element parse [main]
XML Attribute parse Name[row] Value[3]
XML Attribute allocate value to skin structure
XML Attribute parse Name[col] Value[1]
XML Attribute allocate value to skin structure
XML Attribute parse Name[skin_type] Value[PAGE]
XML Attribute allocate value to skin structure
XML Element parse [layout]
XML Attribute parse Name[number] Value[3]
XML Attribute allocate value to skin structure
XML Element parse [region]
XML Attribute parse Name[x] Value[0]
XML Attribute allocate value to skin structure
XML Attribute parse Name[y] Value[0]
XML Attribute allocate value to skin structure
XML Element parse End tag [/>]
XML Element parse [region]
XML Attribute parse Name[x] Value[0]
XML Attribute allocate value to skin structure
XML Attribute parse Name[y] Value[27]
XML Attribute allocate value to skin structure
XML Element parse End tag [/>]
XML Element parse [region]
XML Attribute parse Name[x] Value[0]
XML Attribute allocate value to skin structure
XML Attribute parse Name[y] Value[169]
XML Attribute allocate value to skin structure
XML Element parse End tag [/>]
XML Element parse End tag [/layout]
XML Element parse [menu]
XML Attribute parse Name[sequence] Value[1]
XML Attribute allocate value to skin structure
XML Element parse [select]
XML Attribute parse Name[maxframe] Value[1]
XML Attribute allocate value to skin structure TABLE 1-continued

```
XML Attribute parse Name[x] Value[0]
XML Attribute allocate value to skin structure
XML Attribute parse Name[y] Value[0]
XML Attribute allocate value to skin structure
XML Element parse [img]
XML Attribute parse Name[width] Value[176]
XML Attribute allocate value to skin structure
XML Attribute parse Name[height] Value[142]
XML Attribute allocate value to skin structure
XML Attribute parse Name[size] Value[45378]
XML Attribute allocate value to skin structure
XML Attribute parse Name[compress] Value[ZIV]
XML Attribute allocate value to skin structure
XML Attribute parse Name[color] Value[65K]
XML Attribute allocate value to skin structure
XML Attribute parse Name[id] Value[sel1_1]
XML Attribute allocate value to skin structure
XML Element parse End tag [/>]
XML Example)
<main row="3" col="1" skin_type="PAGE">
  <layout number="3">
    <region x="0"y="0"/>
    <region x="0"y="27"/>
    <region x="0"y="169"/>
  <layout>
  <menu sequence="1">
  <select maxframe="1" x="0" y="0">
  <img width="176" height="142" size="45378"
      compress="ZIV" color="65K" id="sel1_1"/>
```

After the skin parsing, background images, title images, select images, and unselect images are stored in the memory 120. The mobile phone displays menus in a procedure illustrated in FIGS. 8A and 8B.

Figure 8A:
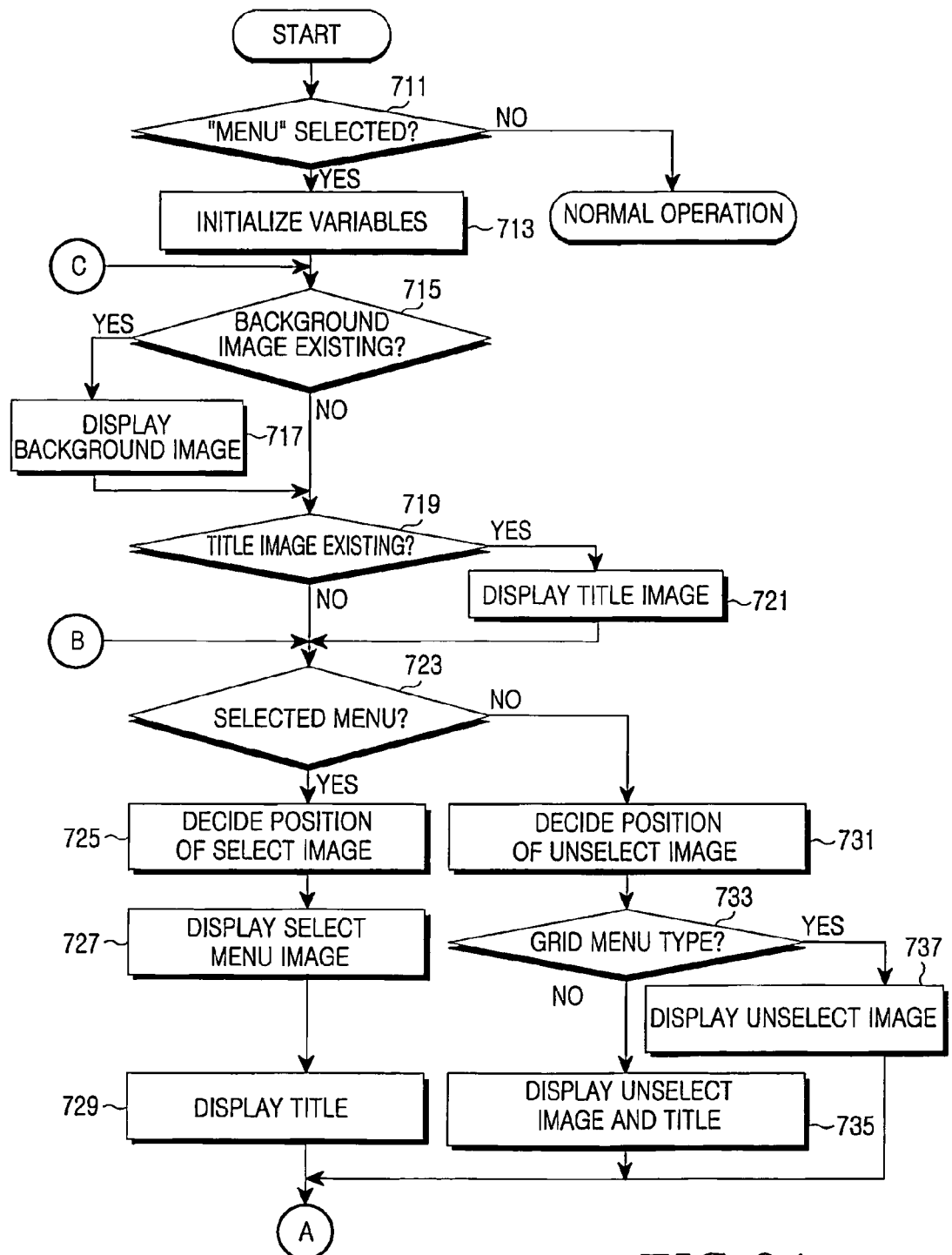
FIGS. 8A and 8B are flowcharts illustrating a menu displaying procedure in the mobile phone according to an embodiment of the present invention.
Figure 8B:
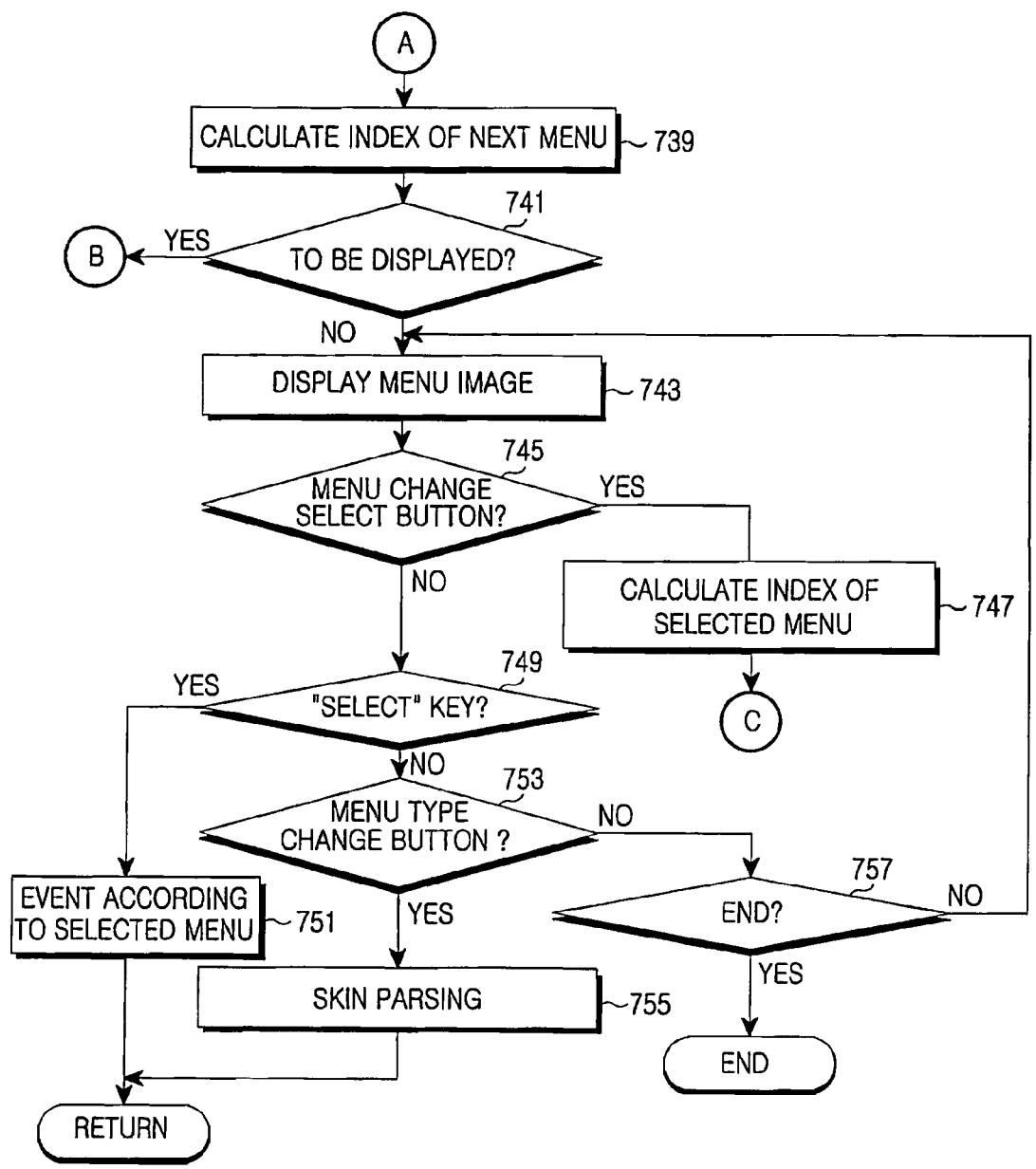

Referring to FIGS. 8A and 8B, when the user presses a "Menu" button on the keypad 142 in step 711, the controller 110 initializes variables such as the index of a selected menu, the index of the first menu to be displayed, and the number of menus to be displayed in step 713. That is, a selected menu, the memory index of an image for the selected menu, and the number of menu images to be displayed on the display 130 are determined. If unselect images have been set, for example, there are nine (3×3) menu images including 1 select image and 8 unselect images for a grid type, 4 menu images including 1 select image and 3 unselect images for a scroll type, and 3 menu images including 1 select image and 2 unselect images for a page type.

In step 715, the controller 110 determines whether a background image is to be used in step 715. If the background image has been registered, the controller 110 displays the background image in the menu display region of the display 130 in step 717. In step 719, the controller 110 determines whether a title image is to be used. If the color of a title image has been registered, the controller 110 displays the registered color in the title region of the display 130 in step 721.

To display select and unselect images on the display 130, the controller 110 determines whether a current menu to be displayed on the display 130 is a selected menu in step 723. In the case of a selected menu, the controller 110 searches layout information for the coordinates of a select image for the selected menu in step 725 and displays the select image at the coordinates in step 727. As stated earlier, the select image is an image registered in a setting procedure, such as a still image, a moving picture, an avatar, or an animation shot. The select image can also be highlighted on the display 130. The title of the selected menu is displayed at the registered start position in the registered font color and font size in the title region in step 729. For the grid menu type, the title region is independently allocated as illustrated in FIG. 2C, whereas for the scroll or page menu type, title regions are overlaid on image regions as illustrated in FIGS. 2F and 2I.

If the current image is an unselect image in step 723, the controller 110 searches the layout information for the coordinates of the unselect image in step 731. In step 733, the controller 110 determines whether the current menu type is a grid menu type. In the case of the grid menu type, only the title of the selected menu is displayed in the title region as illustrated in FIG. 2C. Hence, if the current menu type is the grid menu type, the controller 110 displays the unselect image at the searched coordinates in step 737. In the case of the scroll or page menu type, the controller 110 displays a title text in a registered font color and font size, while displaying the unselect image at the coordinates in step 735.

The controller 110 calculates the index of the next menu in step 739 and determines whether the next menu can be displayed on the display 130 in step 741. If the menu is displayable, the controller 110 returns to step 723. After repeating the above operation, the controller 110 finishes displaying all possible menu images on the display 130 in step 743.

In this state, upon input of a button designated for changing a menu in step 745, the controller 110 calculates the index of the selected menu and the index of the first menu to be displayed in step 747 and returns to step 715. The menu changing button can be a navigation key. There may exist up, down, left and right directional keys for navigation keys. Typically, the navigation keys are collective used as a "Menu" button and pressing a navigation key in an idle mode leads to a menu mode corresponding to the navigation key. Upon input of an up or down direction key during the menu mode operation, it brings the user to the upper or lower menu. Upon input of a left or right direction key during the menu mode operation, it brings the user to the left or right menu. Thus, upon selection of the up, down, left or right directional key in step 745, the controller 110 adjusts a menu index to shift to a menu corresponding to the directional key in step 747 and returns to step 715 to repeat the above-described operation.

When the user selects an OK key with the menus displayed on the display 130 in step 749, the controller 110 performs an event corresponding to the selected menu in step 751 and returns.

When the user selects a key designated for changing a menu type with the menus displayed on the display 130 in step 753, the controller 110 notifies the user of available menu types stored in the memory 120. If the user selects an intended menu type, the controller 110 parses a skin for the selected menu type in the procedure of FIG. 7 in step 755. If the user does not want to change the menu type, a determination is made at step 757 as to whether the user is finished. If the user is finished, the method ends. However, if the user is not finished the method returns to step 743.

Now a description will be made of a procedure for displaying menus on the display 130 of the mobile phone according to each menu type.

A menu type is selected in a menu mode. Upon generation of a menu type change command, the controller 110 notifies the user of available menu types for which menus are stored in the memory 120 on the display 130. The available menu types include a grid type, a scroll type, and a page type. Also, a ring type can be included. Upon selection of a menu type, the controller 110 parses the downloaded skin of the selected menu type stored in the memory 120. Storing the menus of each menu type in the form of a skin increases the storage efficiency of the memory 120. It can be further contemplated as another embodiment that the skin of each menu type is parsed and then stored in the memory 120.

After parsing the menu file data of each menu type, the memory 120 stores information about an image or color for the background region, a color for the title region, font color and font position, select and unselect images, and the positions of the images on the display. The background image or the unselect images may not be used.

A description will be made of a menu display procedure for each of the three menu types according to an embodiment of the present invention. FIGS. 13A to 13I illustrate exemplary views of menus displayed on the display of the mobile phone according to the embodiment of the present invention. The menu displaying procedure of FIGS. 8A and 8B will be described with reference to FIGS. 13A to 13I.

In the grid menu type, the display is divided into the guide region, the title region, and the menu region, as illustrated in FIG. 2C. A predetermined number of menus are displayed in grids in the menu region. In relation to the grid menu type, the memory 120 has a back-scenery buffer for storing a background image or color, a title buffer for storing a title image, and a title font color and position, a select memory for storing select images and their positions as illustrated in FIG. 2A, and an unselect memory for storing unselect images and their positions as illustrated in FIG. 2B. The background image or the unselect images may not be used. Upon selection of the "Menu" button, the controller 110 determines the index of a select image for the selected menu in the select memory, the index of the first menu image to be displayed on the display 130, and the number of menu images to be displayed. The number of menu images to be displayed on the display 130 is determined during menu setting, as illustrated in FIG. 2C. In FIG. 2C, nine menus are displayed in grids.

The controller 110 then displays a preset color in the guide region. In the case of using a background image, the controller 110 accesses the image stored in the background buffer and displays the background image in the menu region of the display 130. In the case of using a title image, the controller 110 accesses the image stored in the title buffer and displays the title image in the title region of the display 130.

The menu images are sequentially accessed according to their indexes and displayed in grids on the display 130, as illustrated in FIG. 2C. When nine menu images are displayed on a screen as in the case of FIG. 2C, an image corresponding to a select menu index is accessed in the select memory and displayed in a corresponding grid. The select image can be highlighted distinguishably from unselect images. In the title region, the title of the selected menu is displayed in a font color set in the title buffer at a start position set in the title buffer. In the remaining positions except for the position of the select image, unselect images at corresponding indexes of the unselect memory are retrieved and displayed. For example, if a fifth menu at $(x_2, y_2)$ is selected in the grid menu type, the controller 110 accesses a select image at the fifth index in the select memory and unselect images at first to fourth indexes and at sixth to ninth indexes in the unselect memory, and displays them in the menu region.

A grid menu displaying procedure will be described with reference to FIGS. 8A and 8B and FIGS. 13A, 13B and 13C.

Figure 13A:
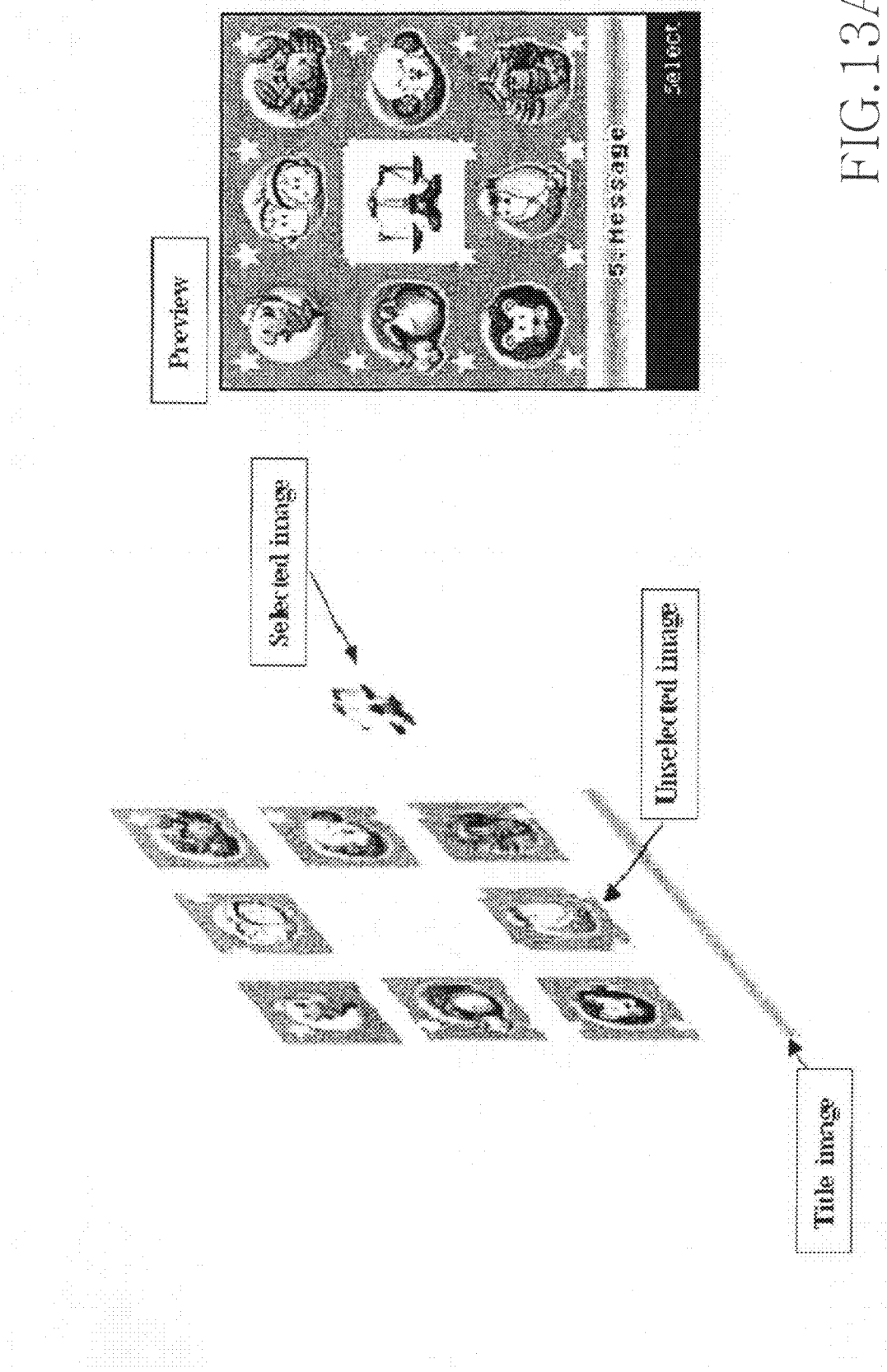
FIGS. 13A to 13I are views of menus displayed on the display of the mobile phone in the menu displaying procedure of FIGS. 8A and 8B.

In the case where menus are displayed using a select image and unselect images without a background image, the controller 110 determines that no background image is used in step 715 and displays a title image on the display in steps 719 and 721. In steps 723 through 735, the controller 110 displays a select image and unselect images. When displaying the menu images, the controller 110 accesses information about the title of the selected menu, the positions of the menu images, the select and unselect images, and the title image as shown in the left of FIG. 13A and displays them on the display 130 as shown in the right of FIG. 13A. When determining that the grid menu type has been selected in step 733, the controller 110 displays the unselect images at corresponding positions of the display 130 without their titles in step 737. Hence, the select image and the unselect images are displayed in the menu region, and the title of the selected menu is displayed in preset font type, color and size in the menu region, as illustrated in FIG. 13A.

Figure 13B:
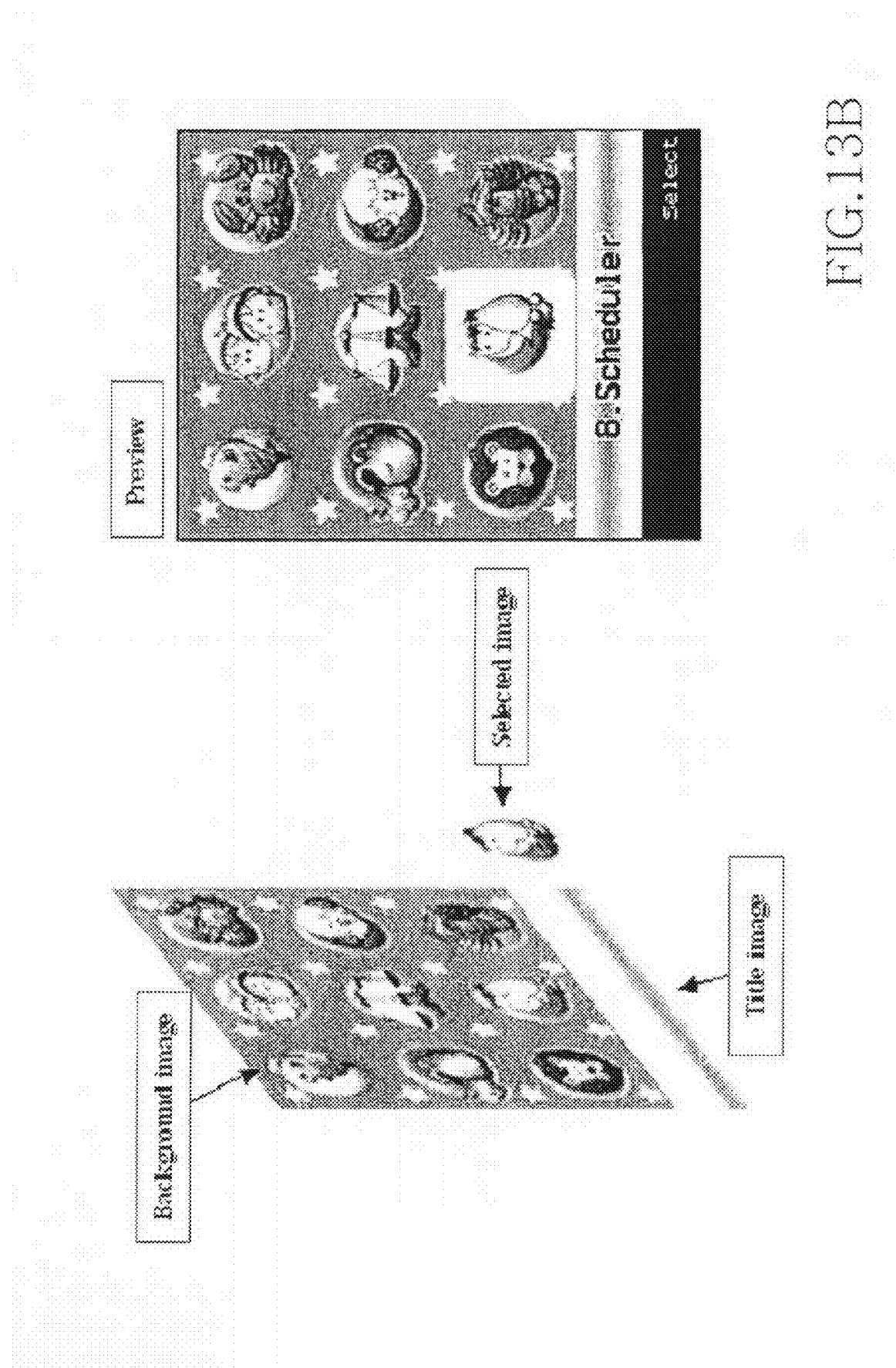

In the case where menus are displayed using a background image and a select image without using unselect images, the controller 110 perceives the existence of a background image in step 715 and displays it as illustrated in FIG. 13B in step 717. In steps 719 and 721, the controller 110 displays a title image on the display 130. The controller 110 then displays a select image for a selected menu on the display 130 in step 723 to 729. To display the menu image, the controller 110 accesses information about the title of the selected menu, the positions of the menu images, and the menu images as illustrated in FIG. 13B and displays the menu images on the display 130 as illustrated in the right of FIG. 13B. A title is displayed only for a select image. The controller 110 displays the title in the title region as illustrated in FIG. 13A in step 729. Therefore, the background image and the select image are displayed in the menu region of the display 130, while the title of the selected menu is displayed in preset font type, size and color, as illustrated in FIG. 13A.

Figure 13C:
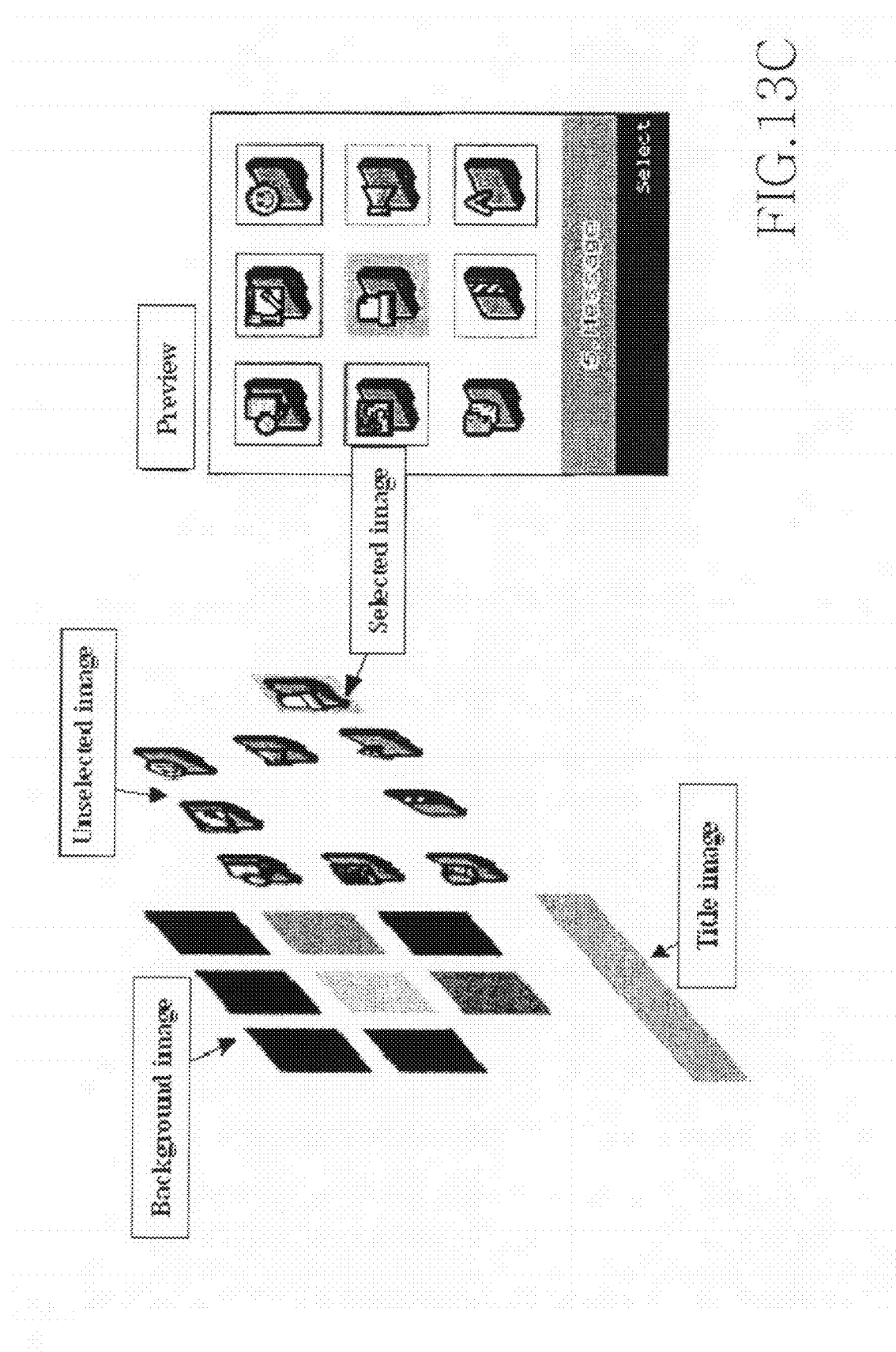

In the case where menus are displayed using a background image, a select image and unselect images, the controller 110 displays them as illustrated in FIG. 13C. Specifically, the controller 110 displays the background image in steps 715 and 717, a title image in steps 719 and 721, and a select image for a selected menu and unselect images for unselected menus in step 725 to 735. The background image, the select image and the unselect images are displayed as illustrated in FIG. 13C.

For the scroll menu type, the display 130 is divided into a guide region and a menu region, as illustrated in FIG. 2F. Select and unselect images are displayed in the menu region. Also, the titles of menus are overlaid on their menu images. In relation to the scroll menu type, the memory 120 is provided with a back-scenery buffer for storing a background image or color, a select memory for storing select images for menus to be displayed when they are selected, the start positions of the select images, the font colors and start positions of the titles of the menus, as illustrated in FIG. 2D, and an unselect memory for storing unselect images for menus to be displayed when they are not selected, the start positions of the unselect images, the font colors and start positions of the titles of the menus, as illustrated in FIG. 2E. The background image or the unselect images do not have to be used. Upon pressing of the "Menu" button, the controller 110 determines the index of a select image for a selected menu in the select memory, the index of the first menu to be displayed, and the number of menu images to be displayed on the display 130. The number of menu images to be displayed is set during menu setting as illustrated in FIG. 2F. In the illustrated case of FIG. 2F, four scroll menus are displayed.

The controller 110 then displays a predetermined color in the guide region. When a background image is used, the controller 110 accesses the background image stored in the back-scenery buffer and displays it in the menu region of the display 130.

The controller 110 sequentially accesses menu images according to preset indexes and displays them on the display 130, as illustrated in FIG. 2F. To display four menu images on the screen as illustrated in FIG. 2C, the controller 110 accesses a select image for a selected menu in the select memory, displays the select image at a predetermined position of the menu region, and displays the title of the selected menu in a predetermined color and font size at a predetermined start position. The select image can be highlighted distinguishably from unselect images. In the remaining positions except for the position of the select image, unselect images at predetermined indexes are retrieved from the unselect memory and displayed. For example, if a second menu is selected among four scroll menus displayed, the controller 110 accesses a select image at the second index in the select memory and unselect images at first, third and fourth indexes in the unselect memory, and displays them in the menu region of the display 130.

A scroll menu displaying procedure will be described with reference to FIGS. 8A and 8B and FIGS. 13D, 13E and 13F.

Figure 13D:
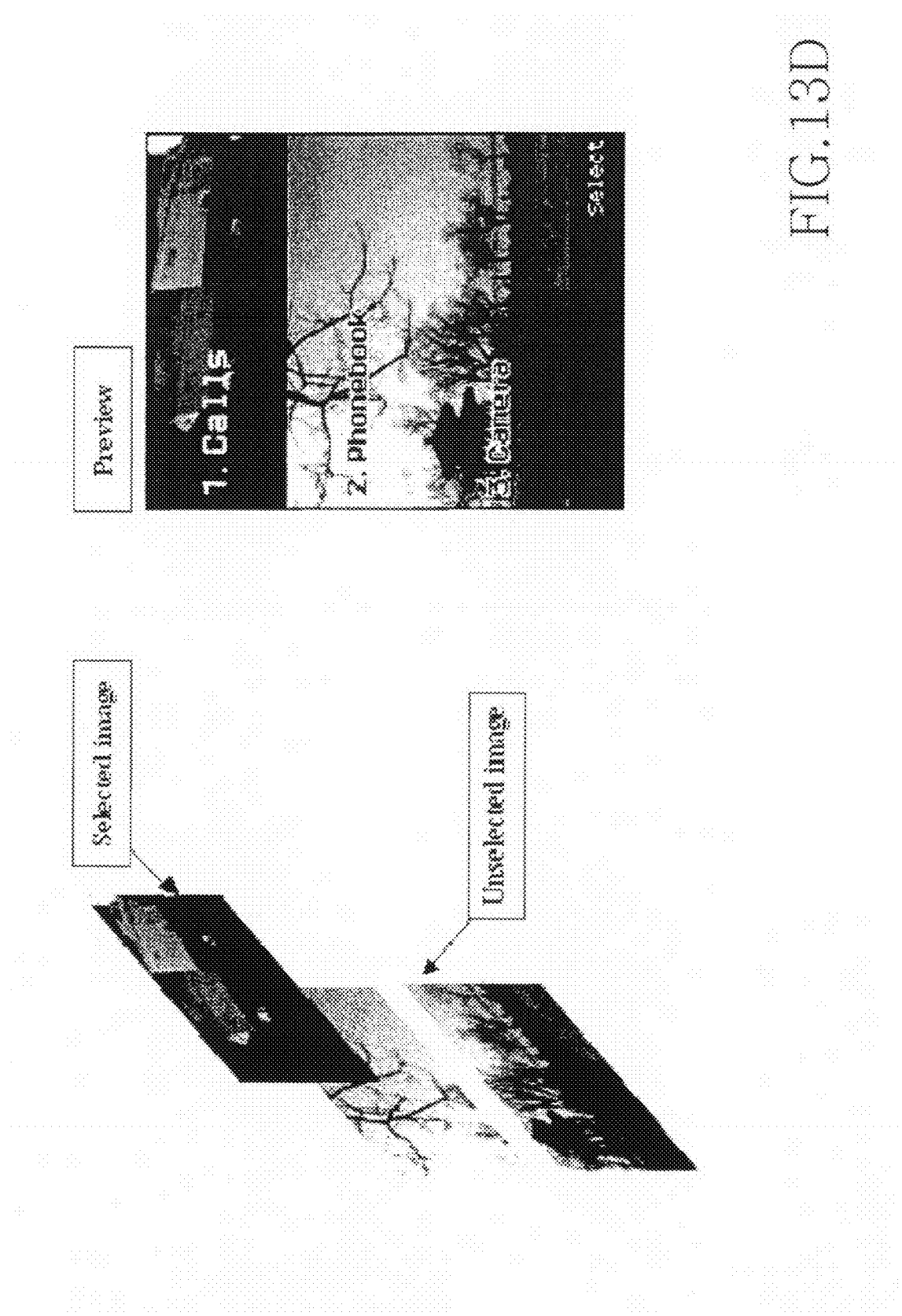

In the case where menus are displayed using a select image and unselect images without a background image, the controller 110 determines that no background image is used in step 715 and displays title images on the display in steps 719 and 721. In steps 723 through 735, the controller 110 displays a select image and unselect images. When displaying the menu images, the controller 110 accesses information about the titles of the selected menu and unselected menus, the positions of the menu images, and the select and unselect images, as illustrated in FIG. 13D and displays them on the display 130 as illustrated in the right of FIG. 13D. When determining that the scroll menu type has been selected in step 733, the controller 110 displays the unselect images and the titles of the unselected menus in a predetermined font type, font color and font size at predetermined positions of the display 130 in step 737. Also, the controller 110 displays the select image and the title of the selected menu in a predetermined font type, font color and font size at a predetermined position of the display 130. Hence, the select image, the unselect images, and their menu titles are displayed in the menu region, as illustrated in FIG. 13D.

Figure 13E:
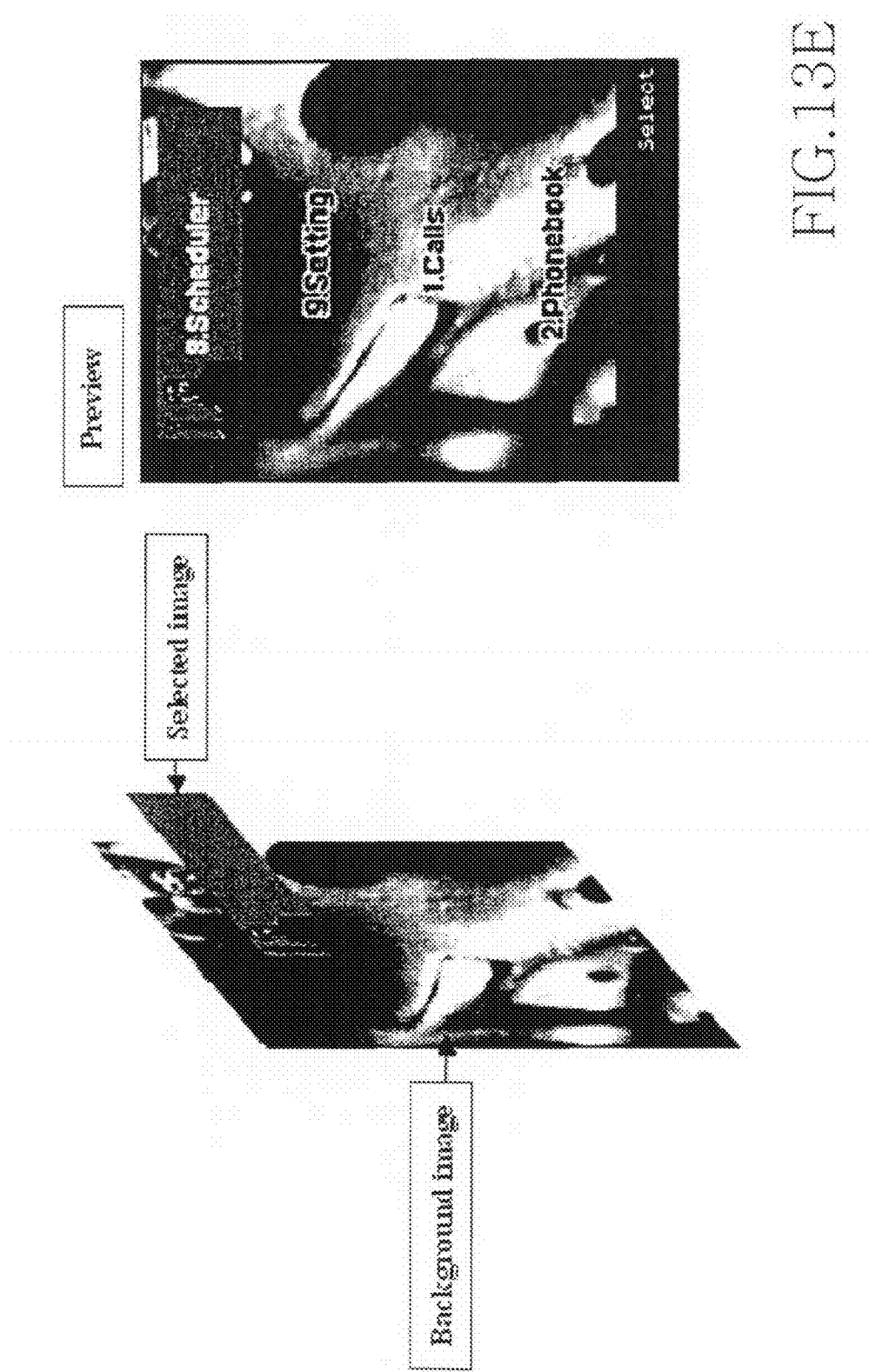

In the case where menus are displayed using a background image and a select image without using unselect images, the controller 110 perceives the existence of a background image in step 715 and displays it as illustrated in FIG. 13E in step 717. In steps 719 and 721, the controller 110 displays title images on the display 130. The controller 110 then displays a select image for a selected menu on the display 130 in step 723 to 729. To display the menu image, the controller 110 accesses information about the title of the selected menu, the position of the select image, and the select image as illustrated in FIG. 13E and displays the select image on the display 130 as illustrated in the right of FIG. 13E. The titles of menus are displayed at predetermined positions in the menu region in a font type, font size, and font color set during menu setting. Therefore, the background image and the select image are displayed in the menu region of the display 130, while the titles of the menus are displayed at the predetermined positions in the font type, size and color, as illustrated in FIG. 13E.

Figure 13F:
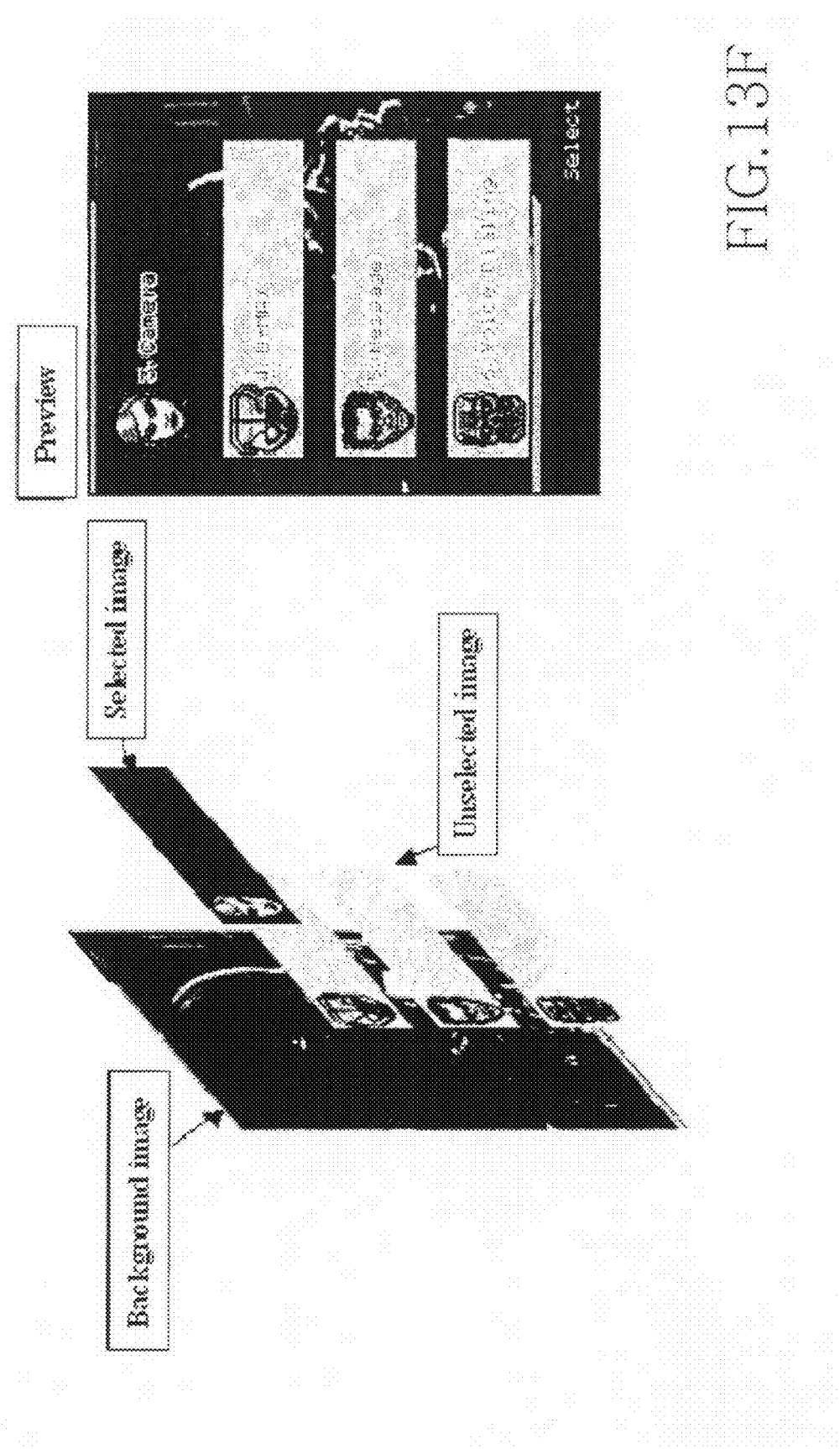

In the case where menus are displayed using a background image, a select image and unselect images, the controller 110 displays them as illustrated in FIG. 13F. Specifically, the controller 110 displays the background image in steps 715 and 717, title images in steps 719 and 721, and a select image for a selected menu and unselect images for unselected menus in step 725 to 735. The background image, the select image and the unselect images are displayed as illustrated in FIG. 13F.

For the page menu type, the display 130 is divided into a guide region and a menu region, as illustrated in FIG. 2I. A select image for a selected menu is displayed at the center of the menu region, while unselect images for unselected menus before and after the selected menu are displayed above and under the select image. Also, the titles of the menus are overlaid on their menu images. The select image is different in size from the unselect images. In relation to the page menu type, the memory 120 is provided with a back-scenery buffer for storing a background image or color, a select memory for storing select images for menus to be displayed when they are selected, the start positions of the select images, the font colors and start positions of the titles of the menus, as illustrated in FIG. 2G, and an unselect memory for storing unselect images for menus to be displayed when they are not selected, the start positions of the unselect images, the font colors and start positions of the titles of the menus, as illustrated in FIG. 2E. The background image or the unselect images may not be used. Upon pressing of the "Menu" button, the controller 110 determines the index of a select image for a selected menu in the select memory, the index of the first menu to be displayed, and the number of menu images to be displayed on the display 130. The number of menu images to be displayed is 3 herein.

The controller 110 then displays a predetermined color in the guide region. When a background image is used, the controller 110 accesses the background image stored in the back-scenery buffer and displays it in the menu region of the display 130.

The controller 110 sequentially accesses menu images according to preset indexes and displays them on the display 130, as illustrated in FIG. 2I. To display three menu images on the screen as illustrated in FIG. 2I, the controller 110 accesses a select image for a selected menu in the select memory, displays the select image at a predetermined position of the menu region, and displays the title of the selected menu in a predetermined color and font size at a predetermined start position. The select image can be highlighted distinguishably from unselect images. In the remaining positions except for the position of the select image, unselect images at predetermined indexes are retrieved from the unselect memory and displayed. For example, if a second menu is selected among three page menus displayed, the controller 110 accesses a select image at the second index in the select memory, displays the select image at the center of the menu region, accesses unselect images at first and third indexes in the unselect memory, and displays them in the menu region of the display 130.

A page menu displaying procedure will be described with reference to FIGS. 8A and 8B and FIGS. 13G, 13H and 13I.

Figure 13G:
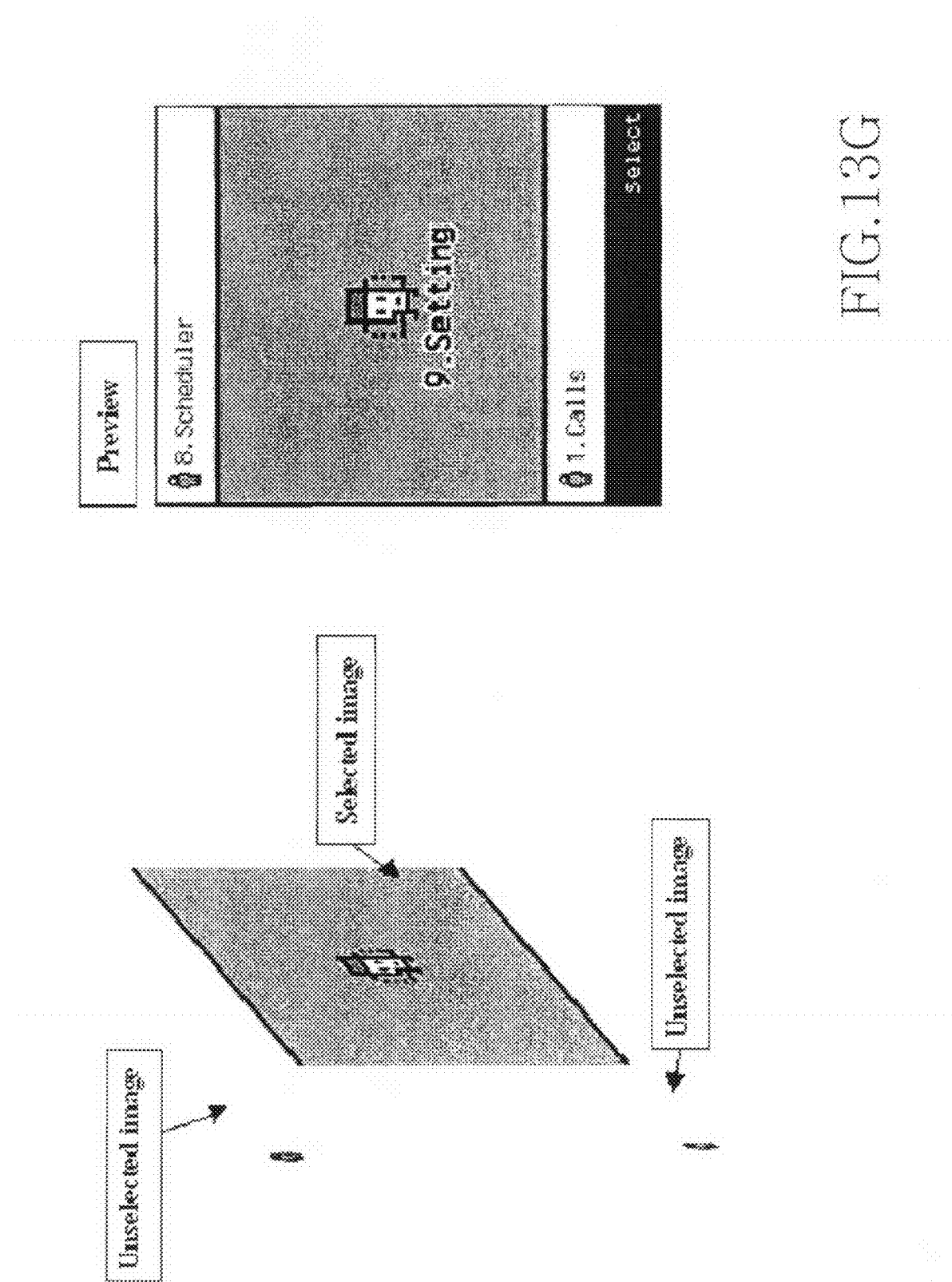

In the case where menus are displayed using a select image and unselect images without a background image, the controller 110 determines that no background image is used in step 715 and displays title images on the display in steps 719 and 721. In steps 723 through 735, the controller 110 displays a select image and unselect images. When displaying the menu images, the controller 110 accesses the select and unselect images as illustrated in FIGS. 2G and 2H in the select and unselect memories as illustrated in FIG. 13G and displays them on the display 130 as illustrated in the right of FIG. 13G. When determining that the page menu type has been selected in step 733, the controller 110 displays the unselect images and the titles of the unselected menus in predetermined font types, font colors and font sizes at predetermined positions of the display 130 in step 737. Also, the controller 110 displays the select image and the title of the selected menu in a predetermined font type, font color and font size at a predetermined position of the display 130. Hence, the select image, the unselect images, and their menu titles are displayed in the menu region, as illustrated in FIG. 13G.

Figure 13H:
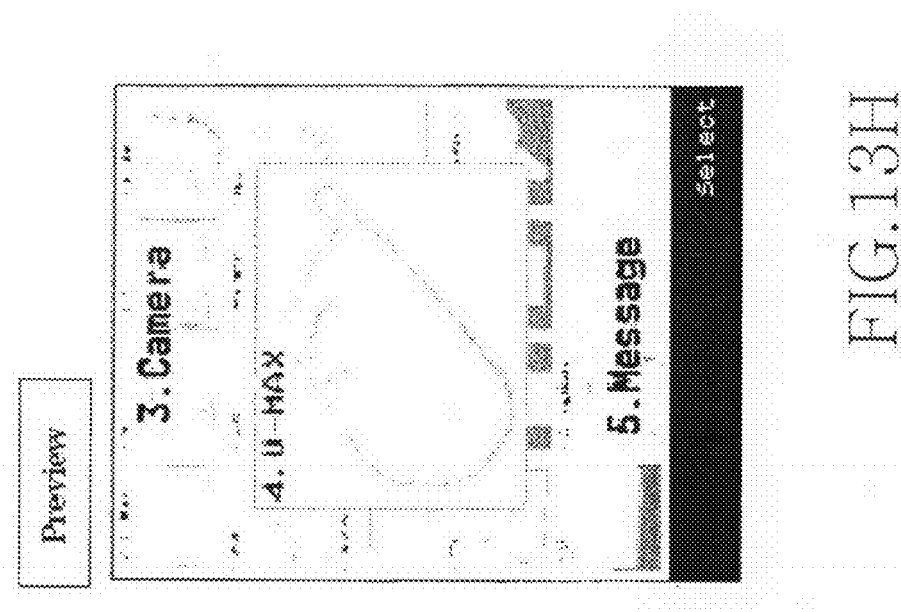
Figure 13H:
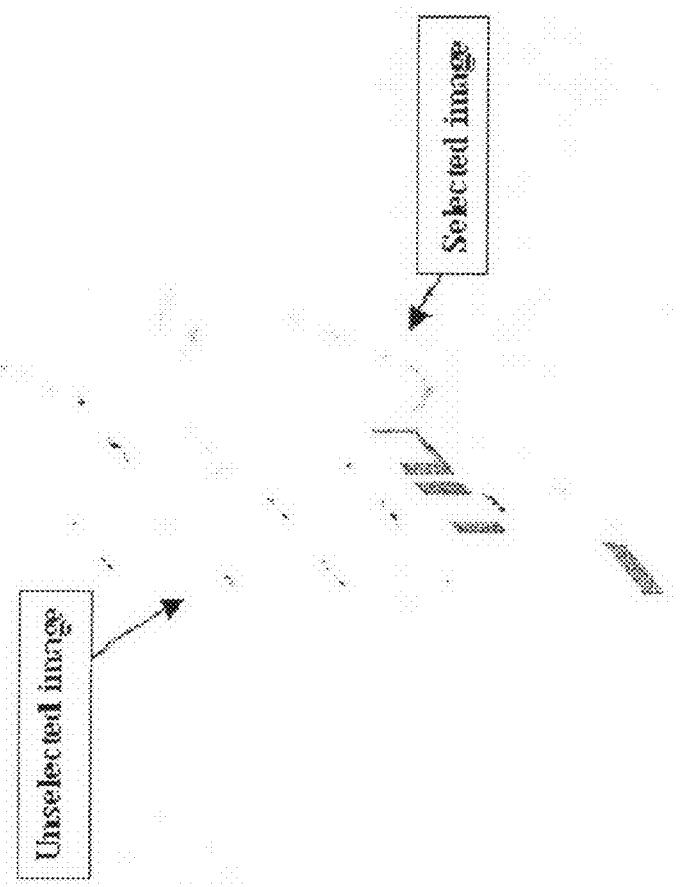

In the case where menus are displayed using a background image and a select image without using unselect images, the controller 110 perceives the existence of a background image in step 715 and displays it as illustrated in FIG. 13H in step 717. In steps 719 and 721, the controller 110 displays title images on the display 130. The controller 110 then displays a select image for a selected menu on the display 130 in step 723 to 729. To display the menu image, the controller 110 accesses information about the title of the selected menu, the position of the select image, and the select image as illustrated in FIG. 13H and displays the select image on the display 130 as illustrated in the right of FIG. 13H. The titles of menus are displayed at predetermined positions in the menu region in font types, font sizes, and font colors set during menu setting. Therefore, the background image and the select image are displayed in the menu region of the display 130, while the titles of the menus are displayed at the predetermined positions in the font types, sizes and colors, as illustrated in FIG. 13H.

Figure 13I:
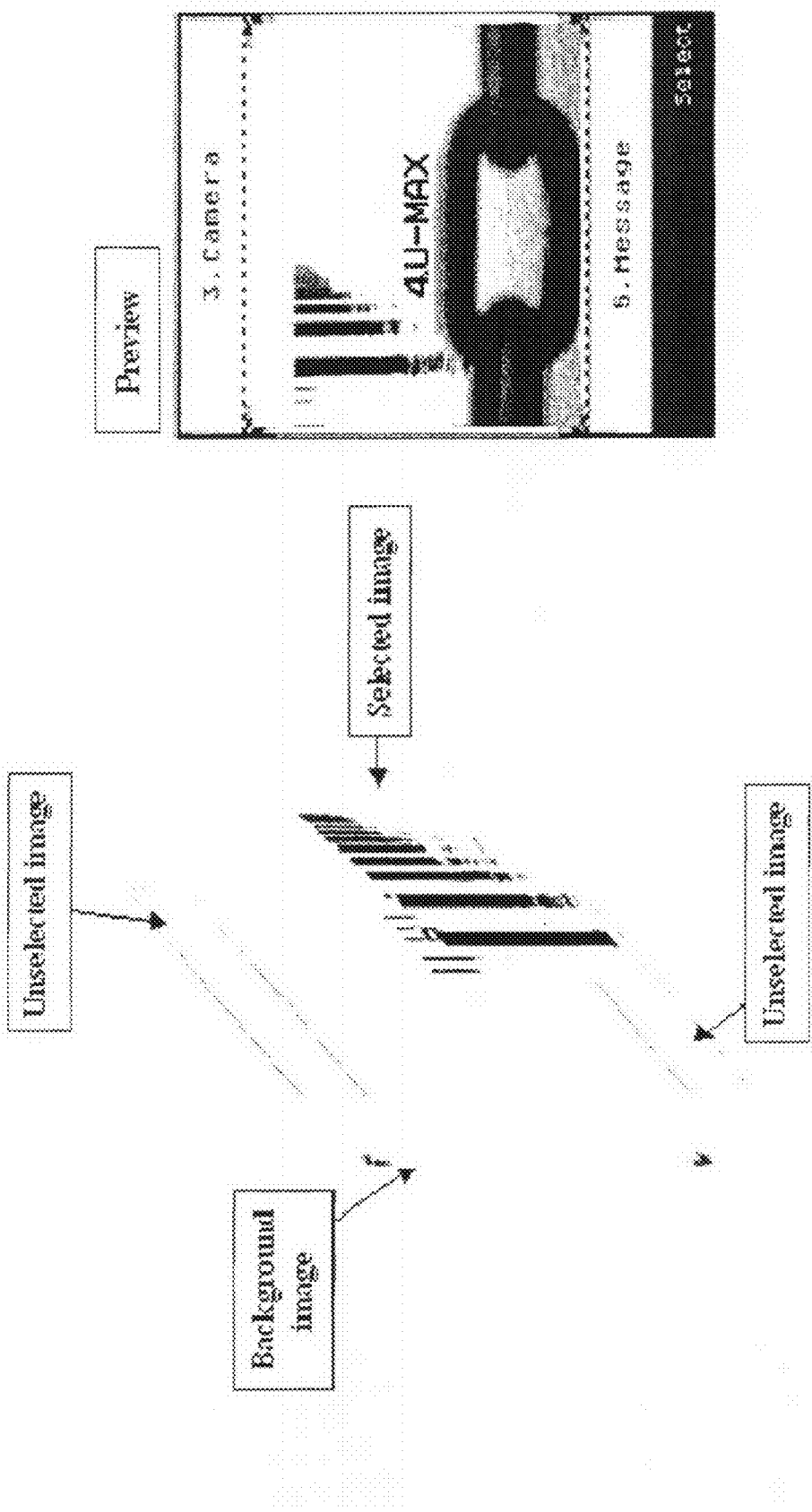

In the case where menus are displayed using a background image, a select image and unselect images, the controller 110 displays them as illustrated in FIG. 13I. Specifically, the controller 110 displays the background image in steps 715 and 717, title images in steps 719 and 721, and a select image for a selected menu and unselect images for unselected menus in step 725 to 735. The background image, the select image and the unselect images are displayed as illustrated in FIG. 13I.

Figure 15A:
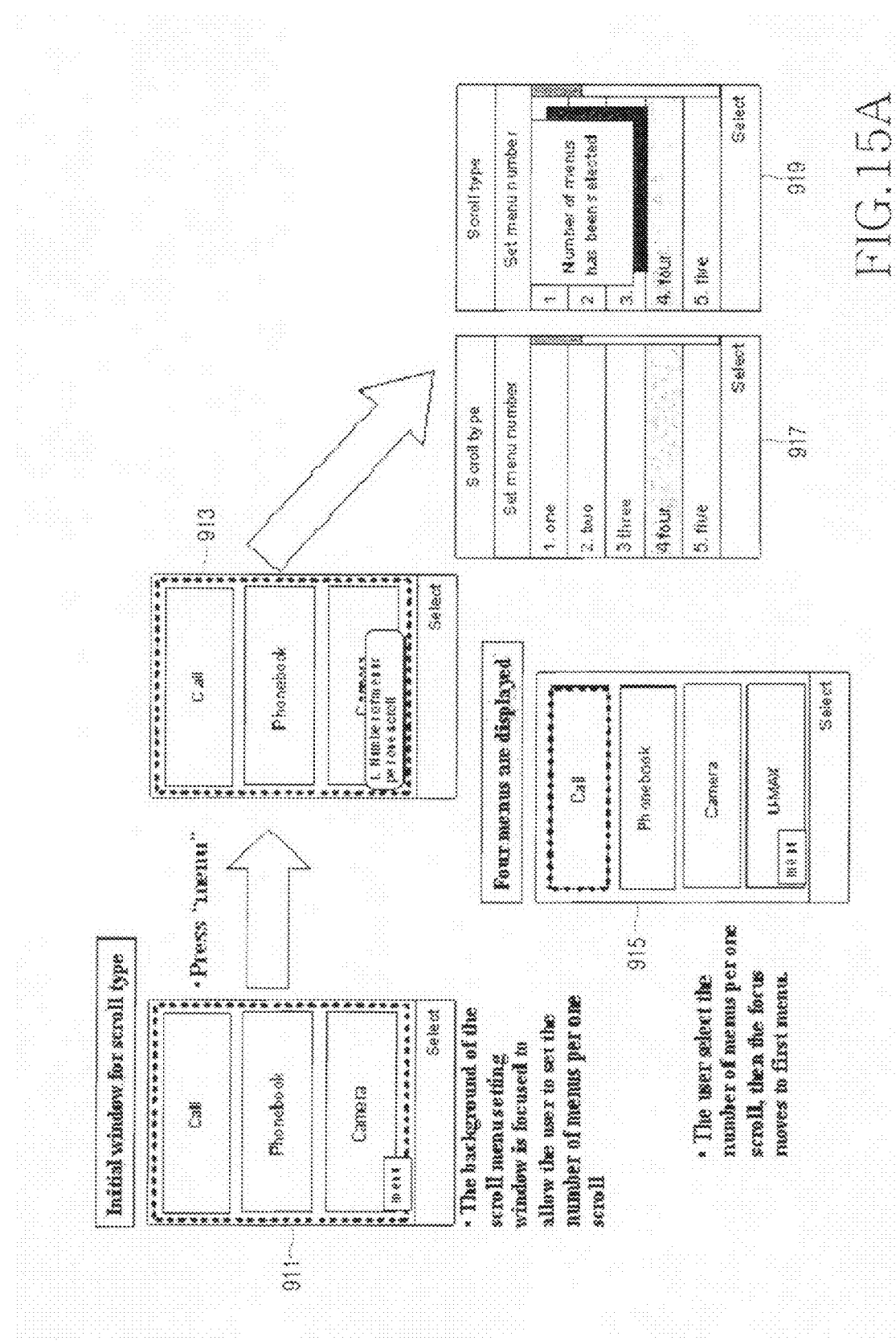
FIGS. 15A, 15B and 15C illustrate a scroll menu setting procedure in the mobile phone according to the second embodiment of the present invention.
Figure 15B:
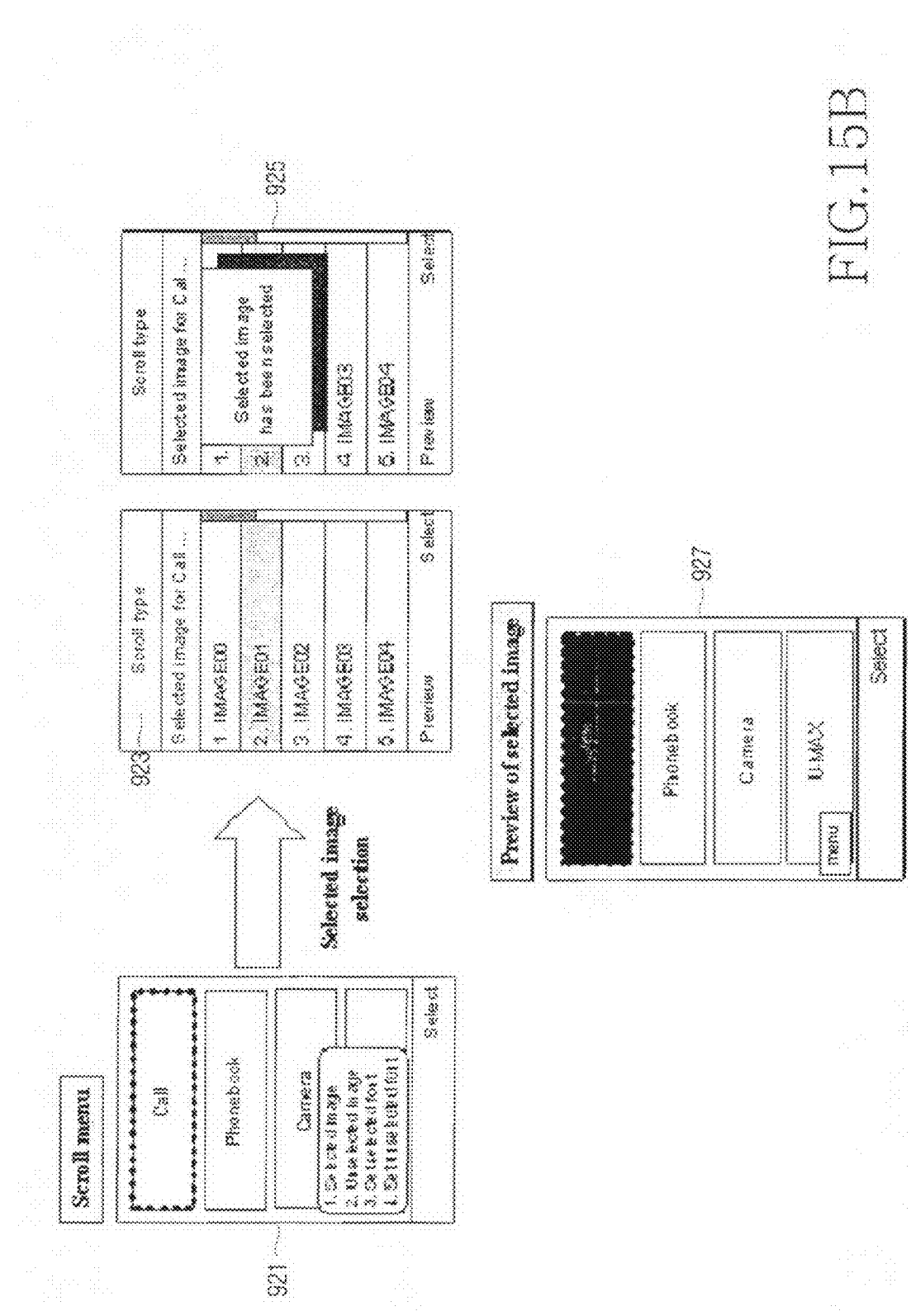
Figure 15C:
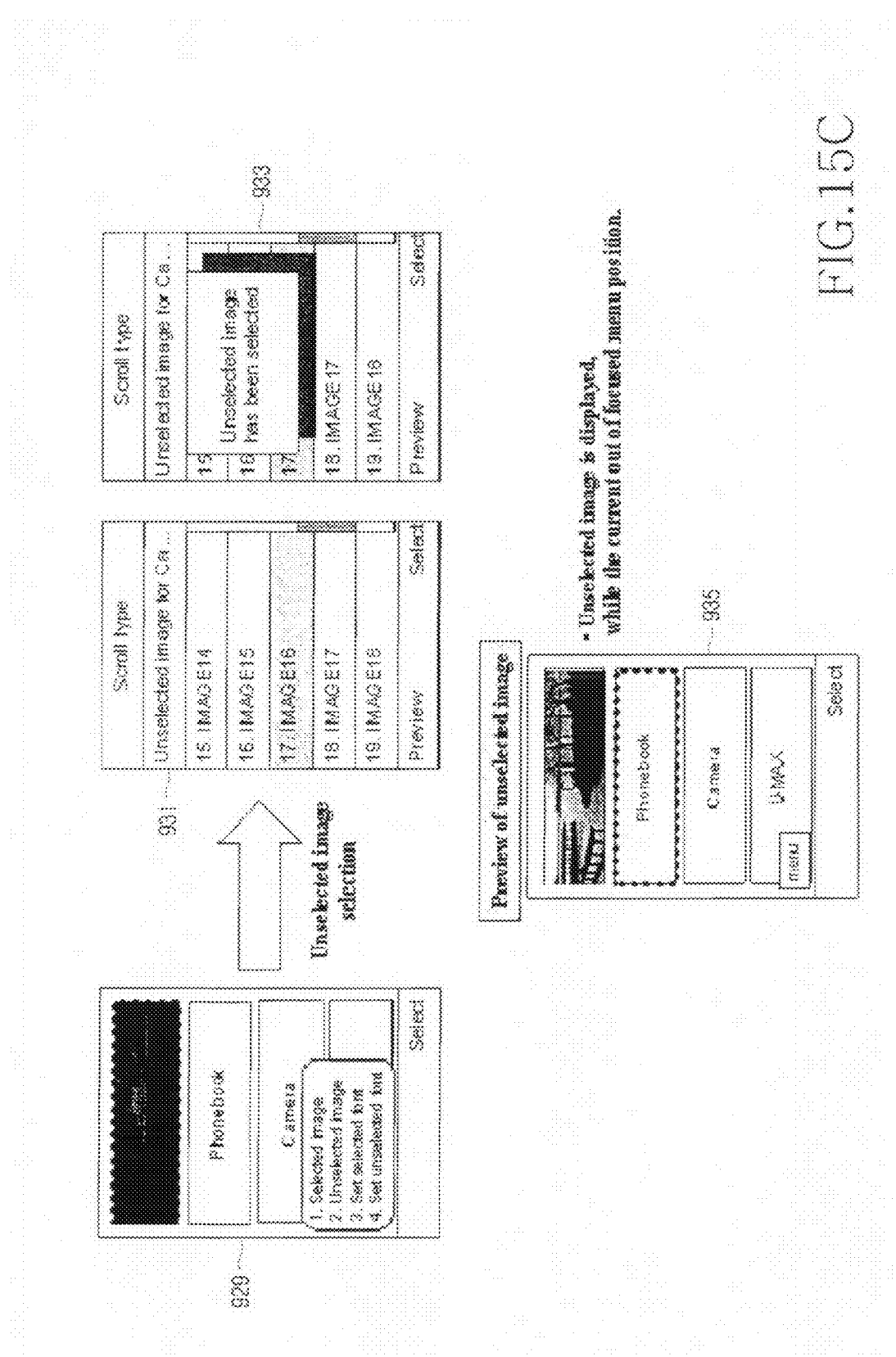
Figure 16A:
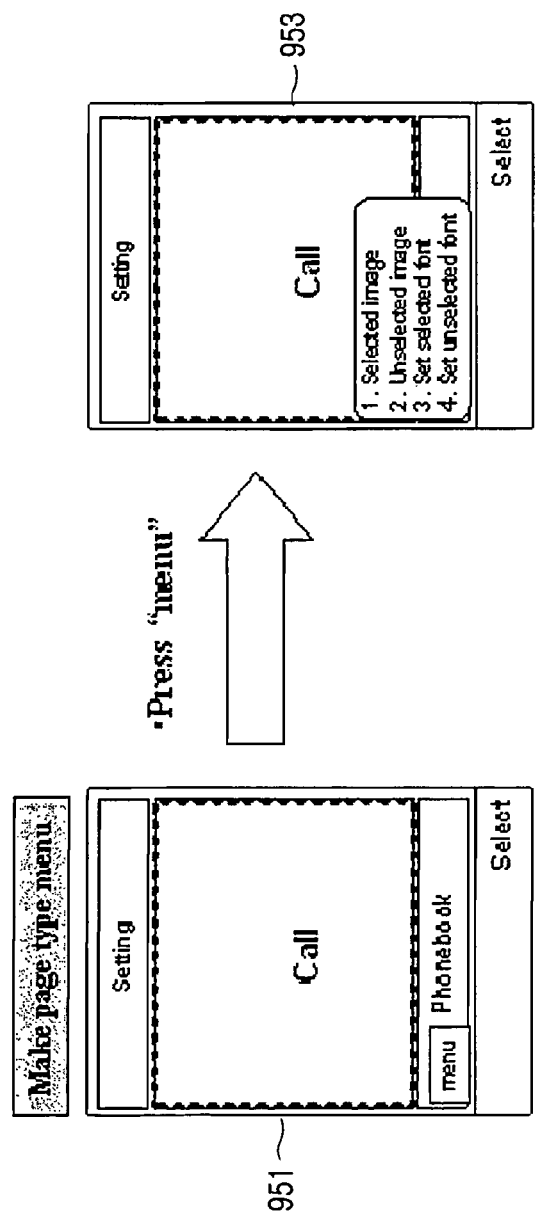
FIGS. 16A, 16B and 16C illustrate a page menu setting procedure in the mobile phone according to the second embodiment of the present invention.
Figure 16B:
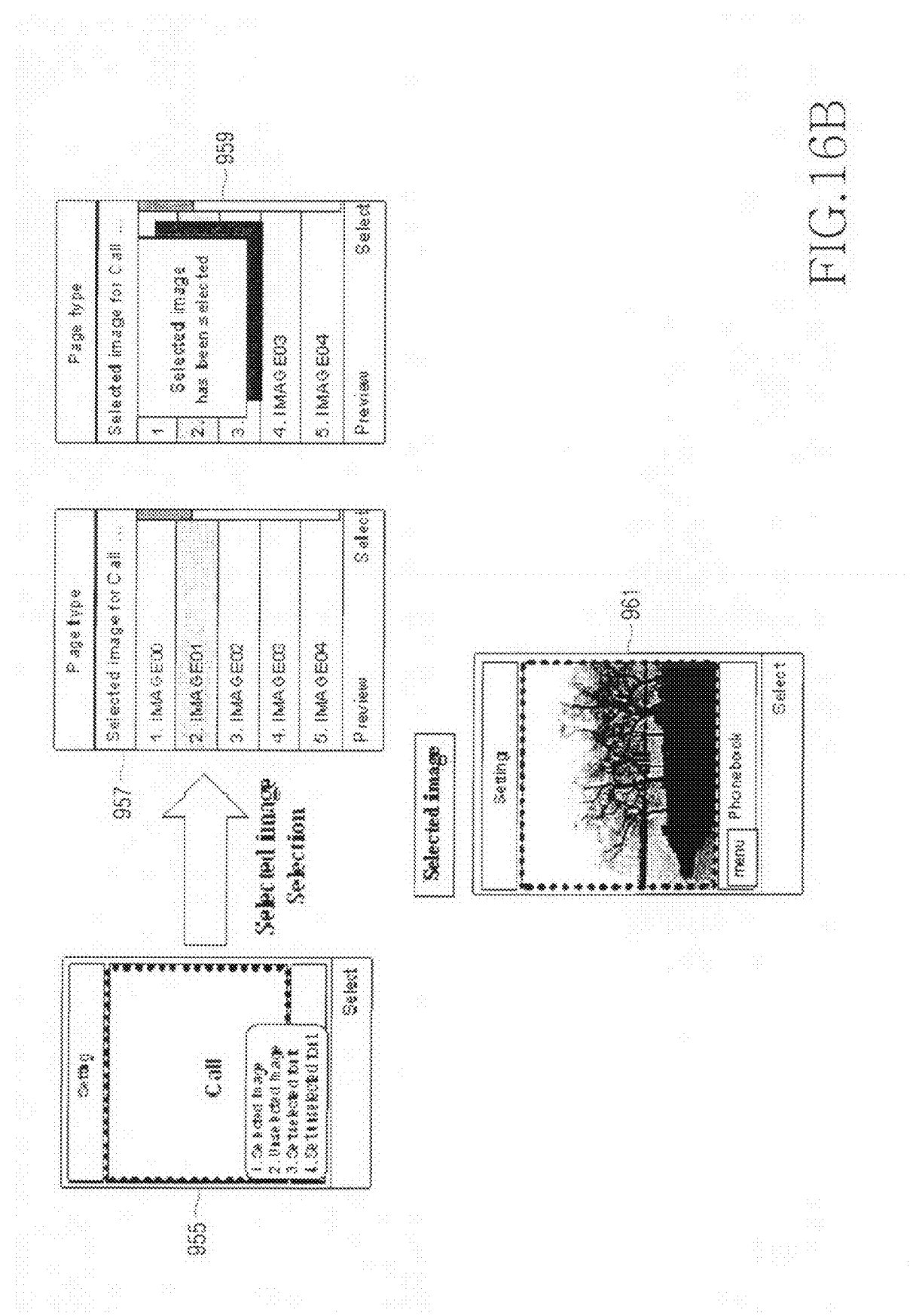
Figure 16C:
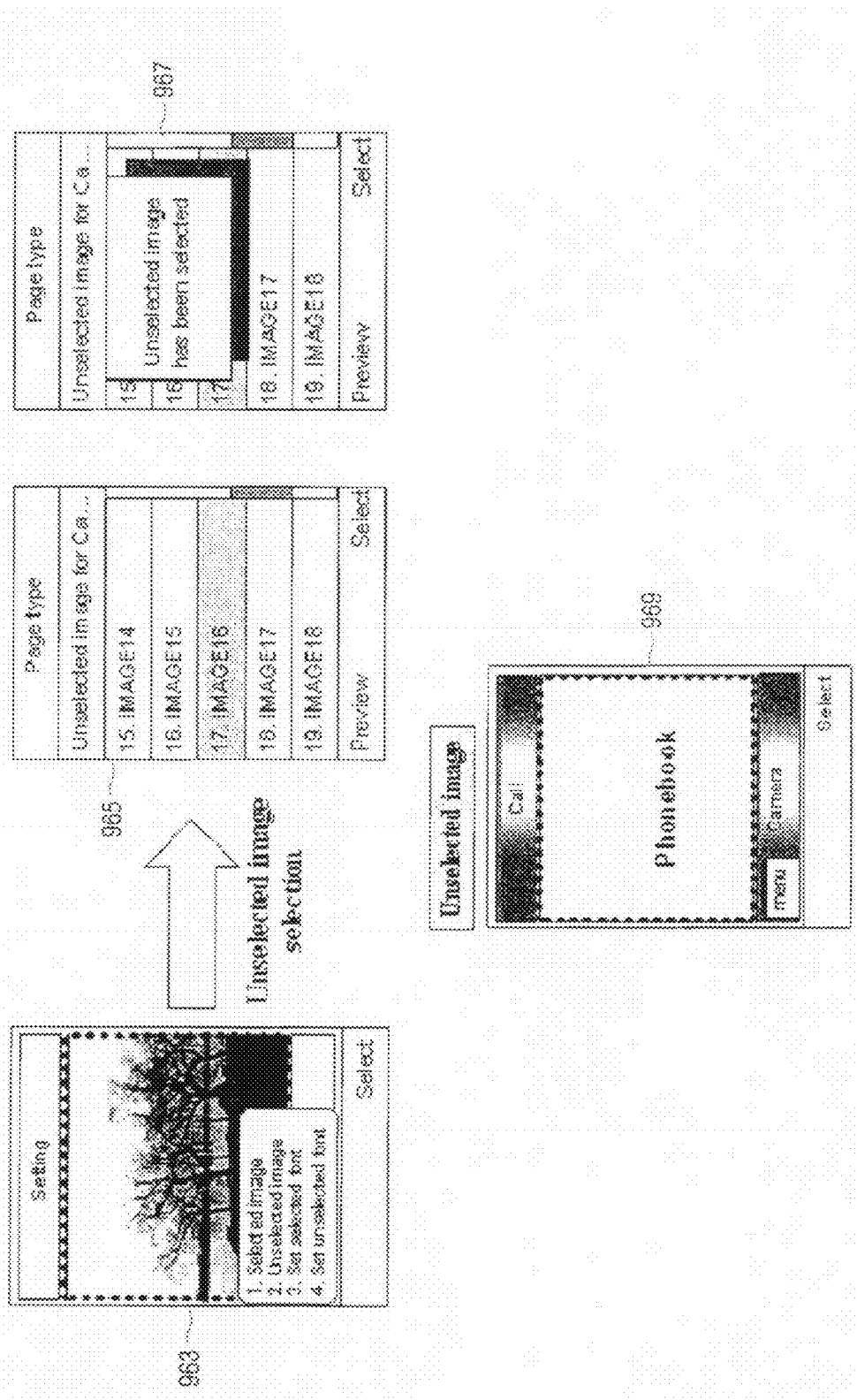

The above-described menu setting and displaying procedures are about menu setting in an external device like a computer, downloading of menus to a mobile phone, and displaying them in the mobile phone. The menu setting can be performed in the mobile phone instead of the computer. FIGS. 14A to 14F illustrate a grid menu setting procedure in the mobile phone according to another embodiment of the present invention, FIGS. 15A, 15B and 15C illustrate a scroll menu setting procedure in the mobile phone according to the second embodiment of the present invention, FIGS. 16A, 16B and 16C illustrate a page menu setting procedure in the mobile phone according to the second embodiment of the present invention, and FIGS. 17A to 17D illustrate a procedure for setting font types, font colors and font sizes for menu images set in the mobile phone according to the second embodiment of the present invention.

With reference to FIGS. 14A to 14F and FIGS. 17A to 17D, the grid menu setting procedure in the mobile phone will be described.

Referring to FIG. 14A, upon selection of "1. Make Menu Theme", the controller 110 transitions to a menu setting mode and performs a menu setting procedure, as indicated by reference numeral 811. While as illustrated in FIG. 3A, the controller 110 can perform the procedure for a color and a font for the guide region, this procedure is omitted in this embodiment of the present invention. The controller 110 then notifies the user of available menu types in making menu themes, as indicated by reference numeral 813. As described before, the available menu types are assumed herein to be the grid type, the scroll type and the page type. When the user selects "1. Grid type", the controller 110 prompts the user to set the number of grid menus to be displayed on the display 130, as indicated by reference numeral 815. Upon selection of a particular menu number by the user, the controller 110 saves the selected menu number.

Figure 14B:
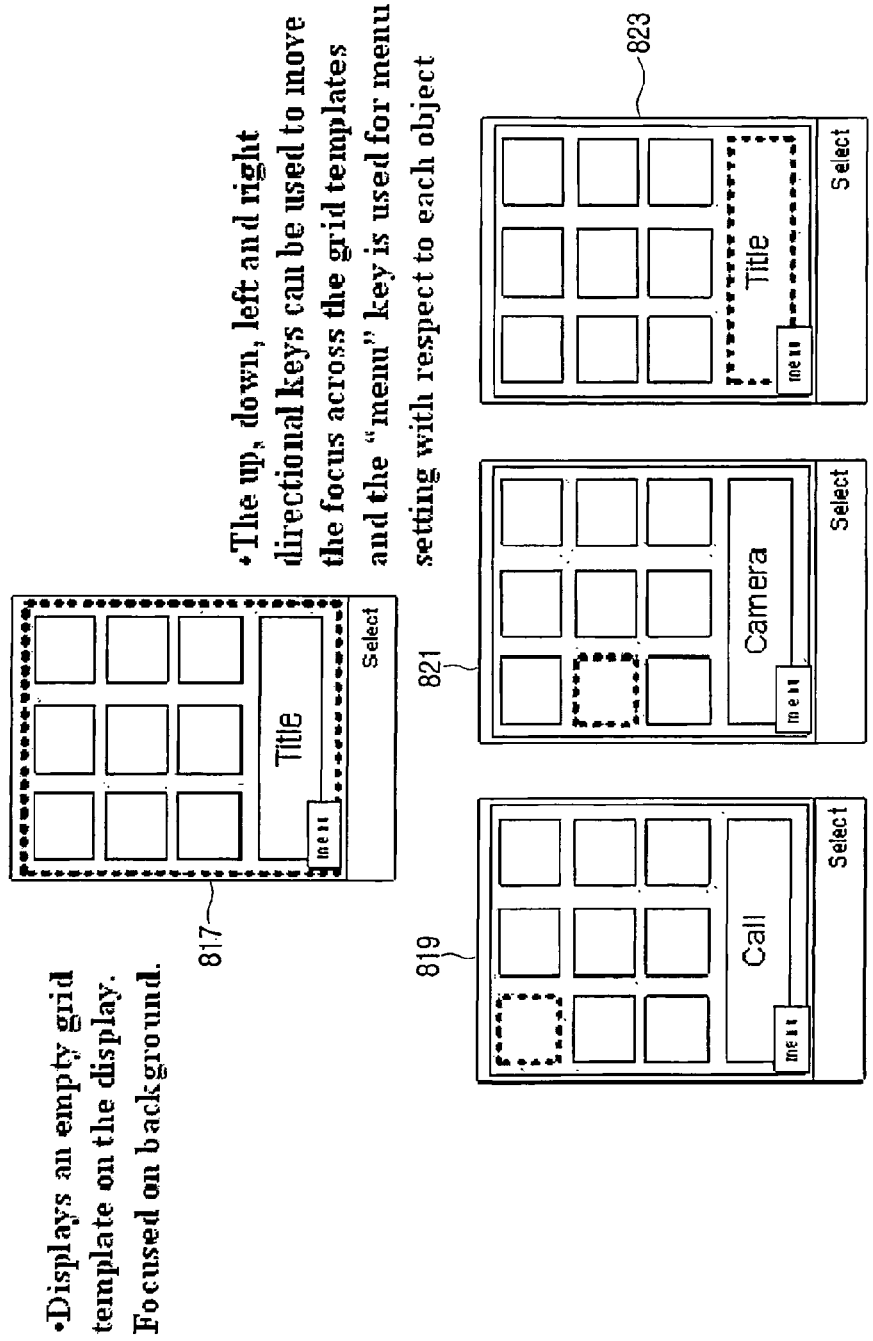

As to a focus moving procedure in grid menus, referring to FIG. 14B, after the number of grid menus is determined, the controller 110 displays an empty grid template on the display 130, while displaying a predetermined background image, as indicated by reference numeral 817. The up, down, left and right directional keys can be used to move the focus across the grid templates and the "Menu" key is used for menu setting with respect to each object. When the focus is moved, the focused menu grid is marked, while the title of a focused menu is displayed in the title region, as indicated by reference numerals 819, 821 and 823.

Figure 14C:
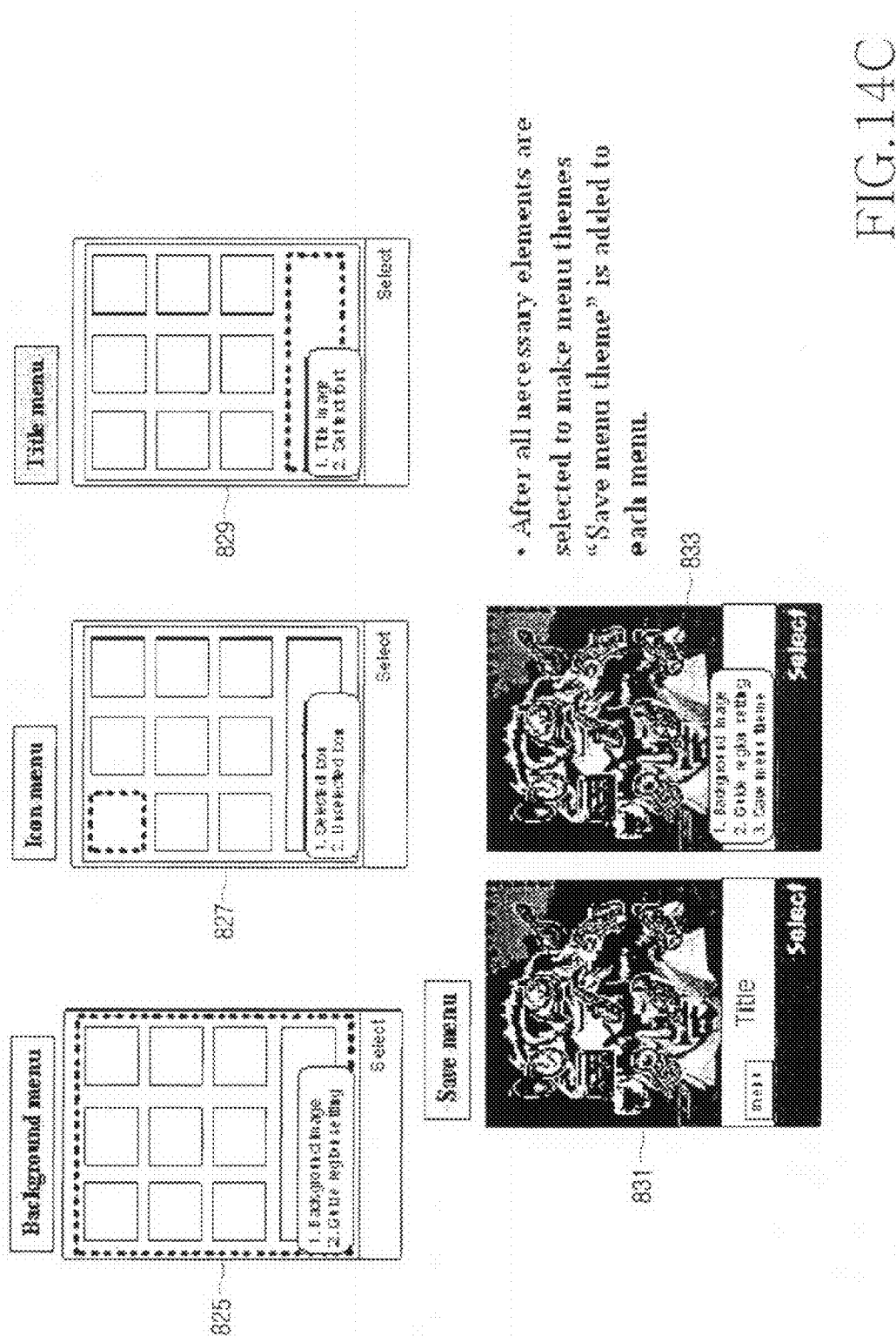

Referring to FIG. 14C, upon selection of a background menu, the controller 110 notifies the user that he can select a background image, as indicated by reference numeral 825. When the user selects an icon menu, the controller 110 notifies the user that select and unselect images are available for a corresponding icon area in the menu region, as indicated by reference numeral 827. When the user selects a title menu, the controller 110 notifies the user that an image and a font can be set for the title region, as indicated by reference numeral 829. After all necessary elements are selected to make menu themes, "Save Menu Theme" is added to each menu, as indicated by reference numerals 831 and 833.

Figure 14D:
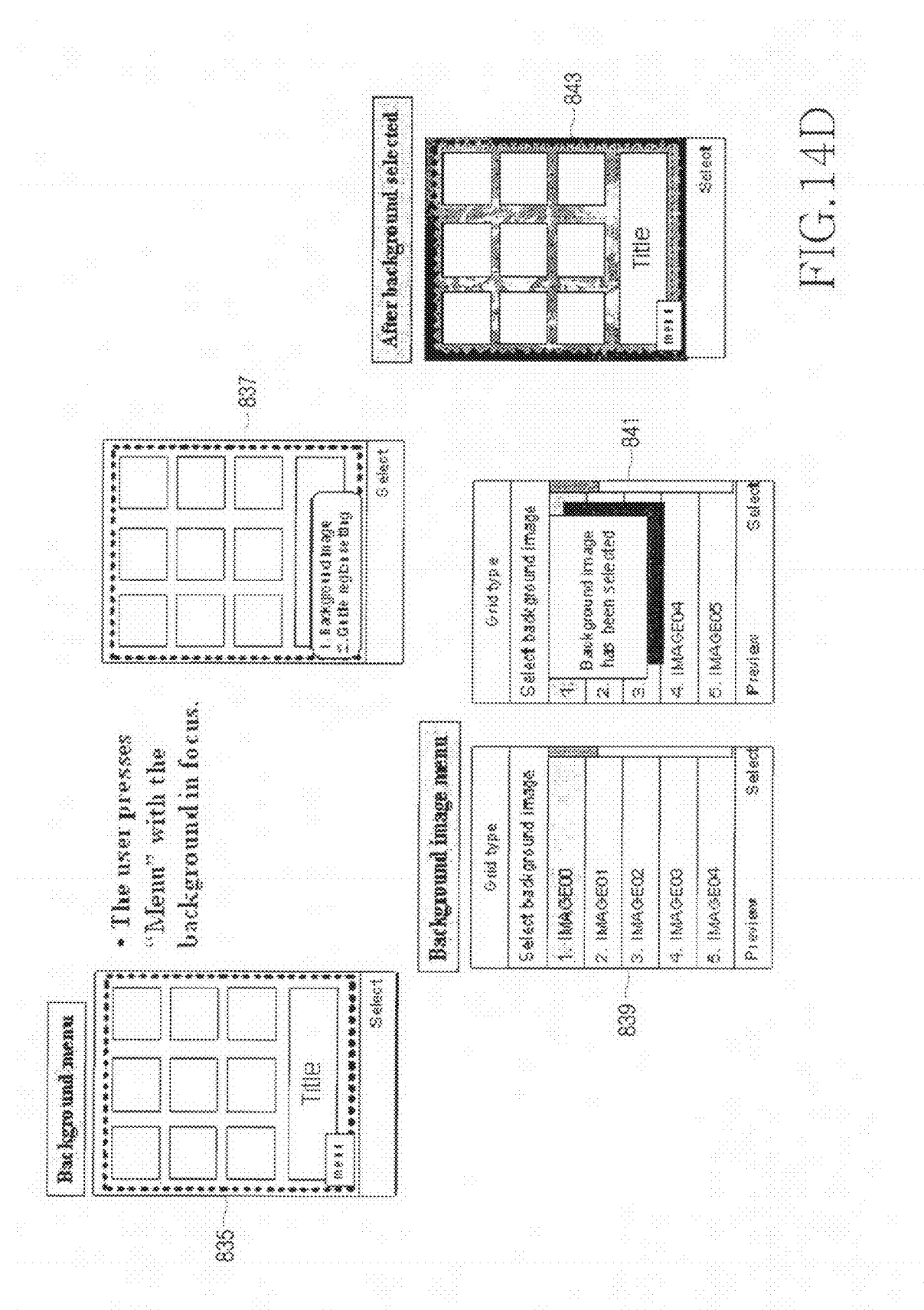

Referring to FIG. 14D, to select the background menu, the user presses "Menu" with the background in focus, as indicated by reference numeral 835. The controller 110 thus notifies the user that a background image can be selected, as indicated by reference numeral 837. Upon selection of "1. Select Background Image" by the user, the controller 110 displays a list of available background images on the display 130, as indicated by reference numeral 839. When the user selects a particular image and selects "View", the controller 110 displays the selected image on the display 130. If the user selects "Select" with the images displayed as indicated by reference numeral 839, the controller 110 notifies the user that the selected image is set as the background image, as indicated by reference numeral 841 and displays the background image on the display 130, as indicated by reference numeral 843.

Figure 14E:
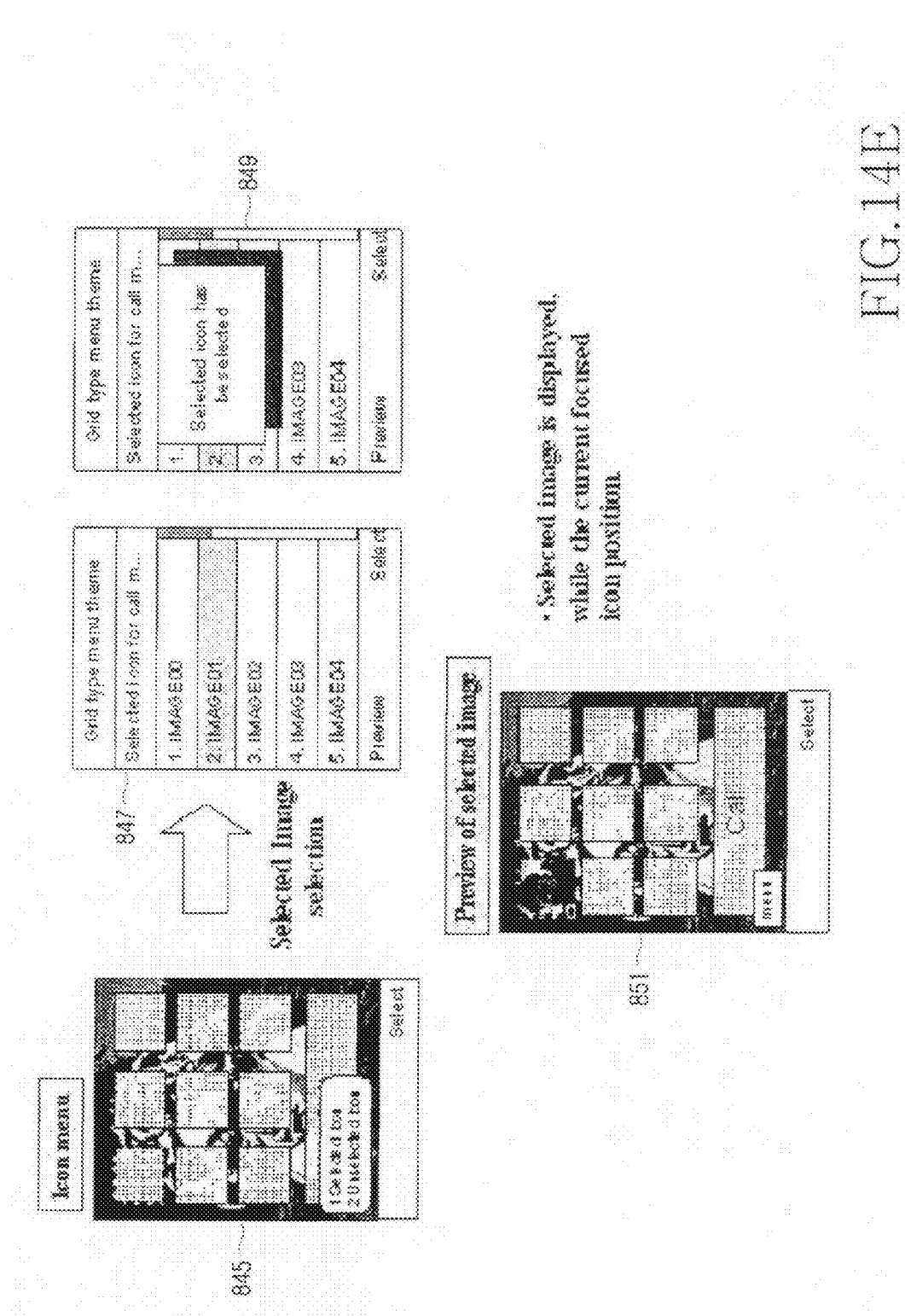

With reference to FIG. 14E, a procedure for selecting menu icons and setting a select image will be described below. Referring to FIG. 14E, upon selection of a menu icon, the controller 110 guides the user to selection of a select or unselect image, as indicated by reference numeral 845. If the user selects "1. Select Image", the controller 110 displays a list of available images as a select image for a grid menu, as indicated by reference numeral 847. When the user selects a particular image and selects "View", the selected image is displayed. If "Select" is selected while the image is displayed, the controller 110 notifies the user that the image has been selected as indicated by reference numeral 849 and sets the selected image as the select image, while displaying it at the current focused icon position, as indicated by reference numeral 851. Select images are set by repeating the above procedure. The positions of select images are set, while icon focusing is done in the procedure of FIG. 14B.

For the grid menu type, a title region is provided. In the title region, the title text of a selected menu is displayed. While not shown in FIG. 14E, the fonts of the title texts of the select images can be set as illustrated in FIGS. 17A to 17D. Therefore, setting of the font of the title text of each select image in the grid menu type will be described later with reference to FIGS. 17A to 17D.

Figure 14F:
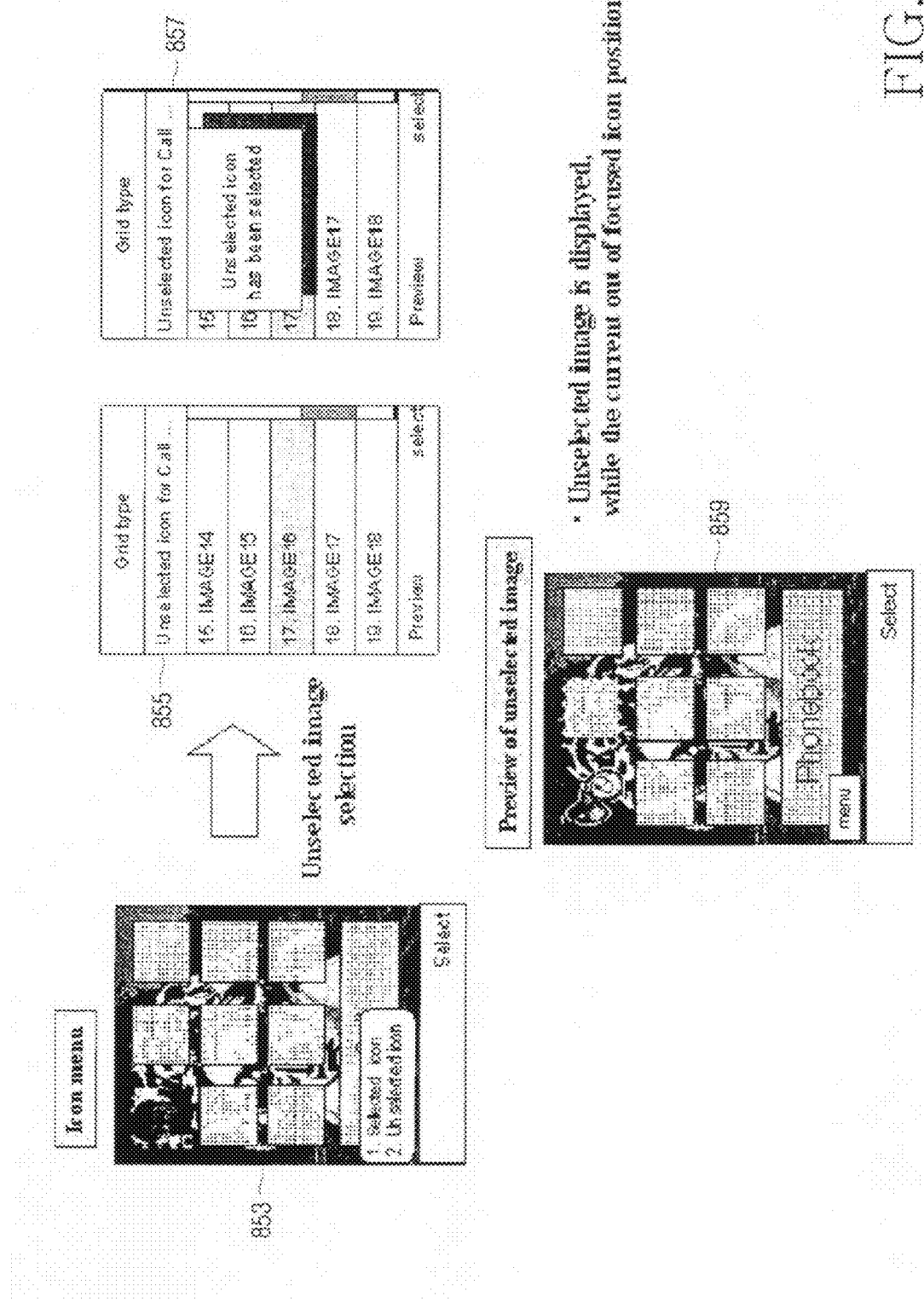

With reference to FIG. 14F, a procedure for selecting an icon menu and setting an unselect image will be described below.

Referring to FIG. 14F, upon selection of the icon menu, the controller sets unselect images according to user setting, as indicated by reference numerals 853 to 859. The unselect image selection is performed in the same manner as the select image selection of FIG. 14E and thus its description is not provided here.

With reference to FIGS. 15A, 15B and 15C and FIGS. 17A to 17D, the scroll menu setting procedure in the mobile phone will be described.

Referring to FIG. 15A, upon selection of "1. Make Menu Theme", the controller 110 transitions to a menu setting mode and performs a menu setting procedure, as indicated by reference numeral 811 of FIG. 14A. While as illustrated in FIG. 3A, the controller 110 can perform the procedure for a color and a font for the guide region, this procedure is omitted in this embodiment of the present invention. The controller 110 then notifies the user of available menu types in making menu themes, as indicated by reference numeral 813 of FIG. 14A. When the user selects "2. Scroll type", the controller 110 displays an initial window for setting scroll menus on the display 130. The background of the scroll menu setting window is focused to allow the user to set the number of menus per one scroll. Referring now to FIG. 15A, when the user selects "Menu" as indicated by reference numeral 911, the controller 110 guides the user to setting the number of menus displayed per pager, as indicated by reference numeral 913. When the user selects "1. Set Menu Number", the controller 110 displays available numbers of scroll menus, such as one menu, two menus, three menus, four menus or five menus as indicated by reference numeral 917. If the user selects a particular menu number and then "Select", the controller 110 notifies the user that the selected number of menus per page has been set, as indicated by reference numeral 919. Then the controller 110 displays as many menus as set in the above procedure on the display 130. In the illustrated case, four menus are displayed, as indicated by reference numeral 915.

In a procedure illustrated in FIGS. 15B and 15C, select images and unselect images for the scroll menus are selected. If the number of scroll menus to be displayed is determined and then a menu icon is set, the controller 110 displays a menu for guiding the user to setting select images, unselect images, a font for the select images, and a font for the unselect images, while displaying the scroll menus in the menu region, as indicated by reference numeral 921. When the user selects "1. Select Image", the controller 110 displays a list of scroll-type images as indicated by reference numeral 923. When the user selects a particular image and selects "View", the controller 110 displays the selected image on the display 130. If "Select" is selected while the image is displayed, the controller 110 notifies the user that the image has been selected as indicated by reference numeral 925 and sets the selected image as the select image. The selected image is displayed as indicated by reference numeral 927. Select images are set for the respective scroll menus, by selecting images, sequentially moving the focus to the menu icons. The controller 110 displays the set select images as indicated by reference numeral 927.

Referring to FIG. 15C, when the user selects "2. Unselect Image" in a display state indicated by reference numeral 929, the controller 110 selects and registers user-selected unselect images, controlling the display 130, as indicated by reference numerals 929 to 935. The unselect image registration is performed in the same manner as in FIG. 15B, as illustrated in FIG. 15C.

If the user selects "2. Set Select Font" or "3. Set Unselect Font" in the display state 921 of FIG. 15B or 929 of FIG. 15C, the controller 110 sets fonts for the titles of selected and unselected menus in the procedure illustrated in FIGS. 17A to 17D.

With reference to FIGS. 16A, 16B and 16C and FIGS. 17A to 17D, the page menu setting procedure in the mobile phone will be described below.

Referring to FIG. 16A, upon selection of "1. Make Menu Theme", the controller 110 transitions to the menu setting mode and performs the menu setting procedure, as indicated by reference numeral 811 of FIG. 14A. While as illustrated in FIG. 3A, the controller 110 can perform the procedure for a color and a font for the guide region, this procedure is omitted in the embodiment of the present invention. The controller 110 then notifies the user of available menu types in making menu themes, as indicated by reference numeral 813 of FIG. 14A. When the user selects "3. Page type", the controller 110 displays an initial window for setting page menus on the display 130. A select image for a selected menu is disposed at the center of the menu region, while unselect images for unselected menus before and after the selected menu are displayed above and under the select image, as indicated by reference numeral 951. For the page menu type, one select image and two unselect images are fixedly displayed. Therefore, there is no need for setting the number of menus to be displayed. Also, the select image is different in size from the unselect images. When "Menu" is selected in the display state 951, the controller 110 performs an image setting procedure for the page menu type through the display 130, as indicated by reference numeral 953.

FIGS. 16B and 16C illustrate an operation of selecting select menu and unselect images for the page menu type. In the state where the page type is selected, if a menu icon is set, the controller 110 displays menu areas set in the menu region and displays a menu for guiding the user to setting of select images, unselect images, the font of the select images, and the font of the unselect images, as indicated by reference numeral 955. Upon selection of "1. Select Image" by the user as indicated by reference numeral 957, the controller 110 notifies the user that the selected image has been set and saves the selected image as a select image for a menu at a corresponding display position, as indicated by reference numeral 959. The selected image is displayed as indicated by reference numeral 961 as a preview. In this manner, select images are registered for the respective menu areas by selecting images, sequentially moving to the icons in the menu region. The controller 110 displays the selected images as indicated by a reference numeral 961.

Referring to FIG. 16C, when the user selects "2. Unselect Image" in a display state indicated by reference numeral 963, the controller 110 selects and registers user-selected unselect images, controlling the display 130, as indicated by reference numerals 963 to 969. The unselect image registration is performed in the same manner as in FIG. 16B, as illustrated in FIG. 16C.

If the user selects "2. Set Select Font" or "3. Set Unselect Font" in the display state 955 of FIG. 16B or 963 of FIG. 16C (845 of FIG. 14E, 921 of FIG. 15B, or 929 of FIG. 15C), the controller 110 sets fonts for the titles of selected and unselected menus in the procedure illustrated in FIGS. 17A to 17D.

Figure 17A:
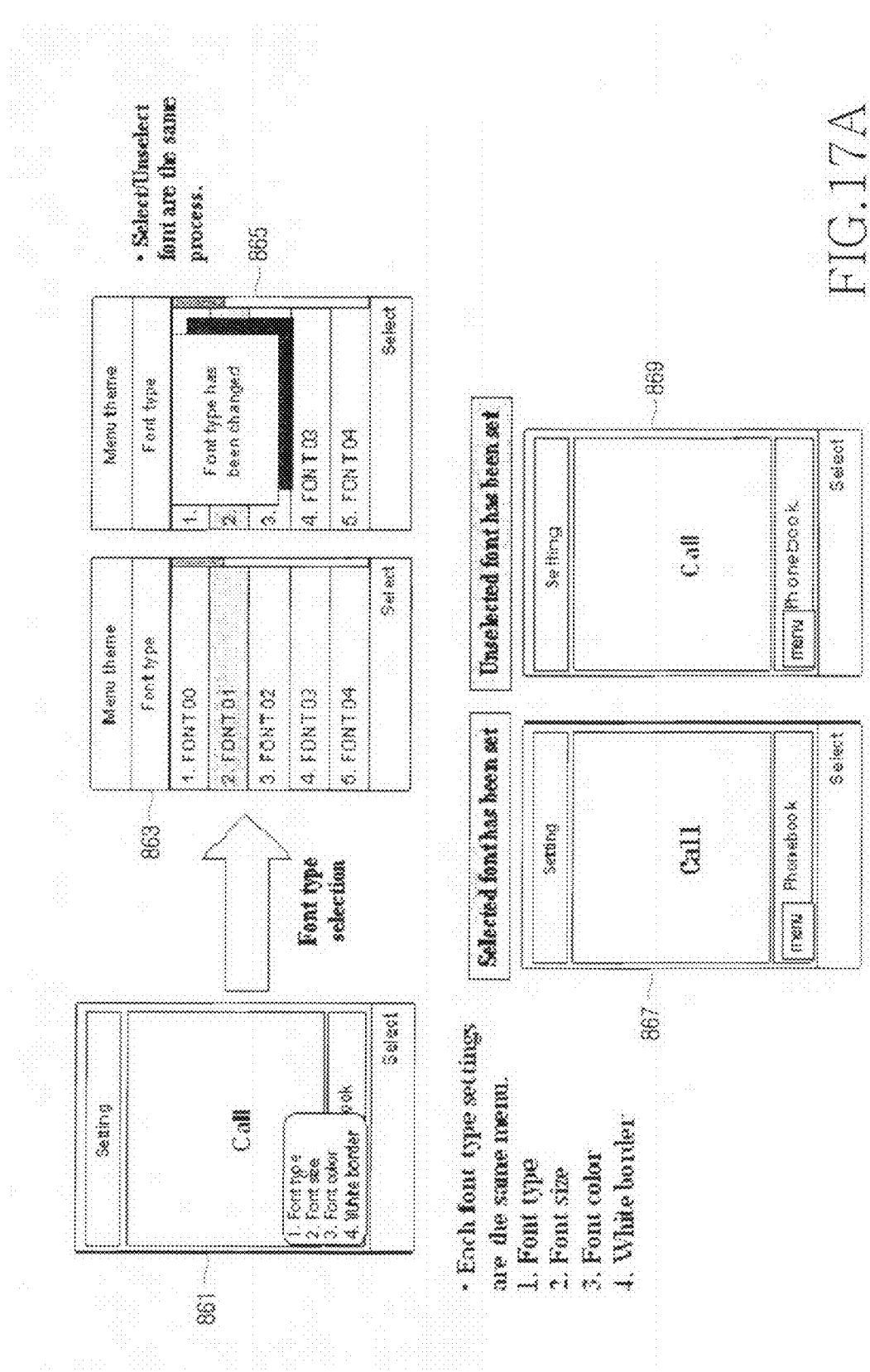
FIGS. 17A to 17D illustrate a font attributes setting procedure for menus in the mobile phone according to the second embodiment of the present invention.
Figure 17B:
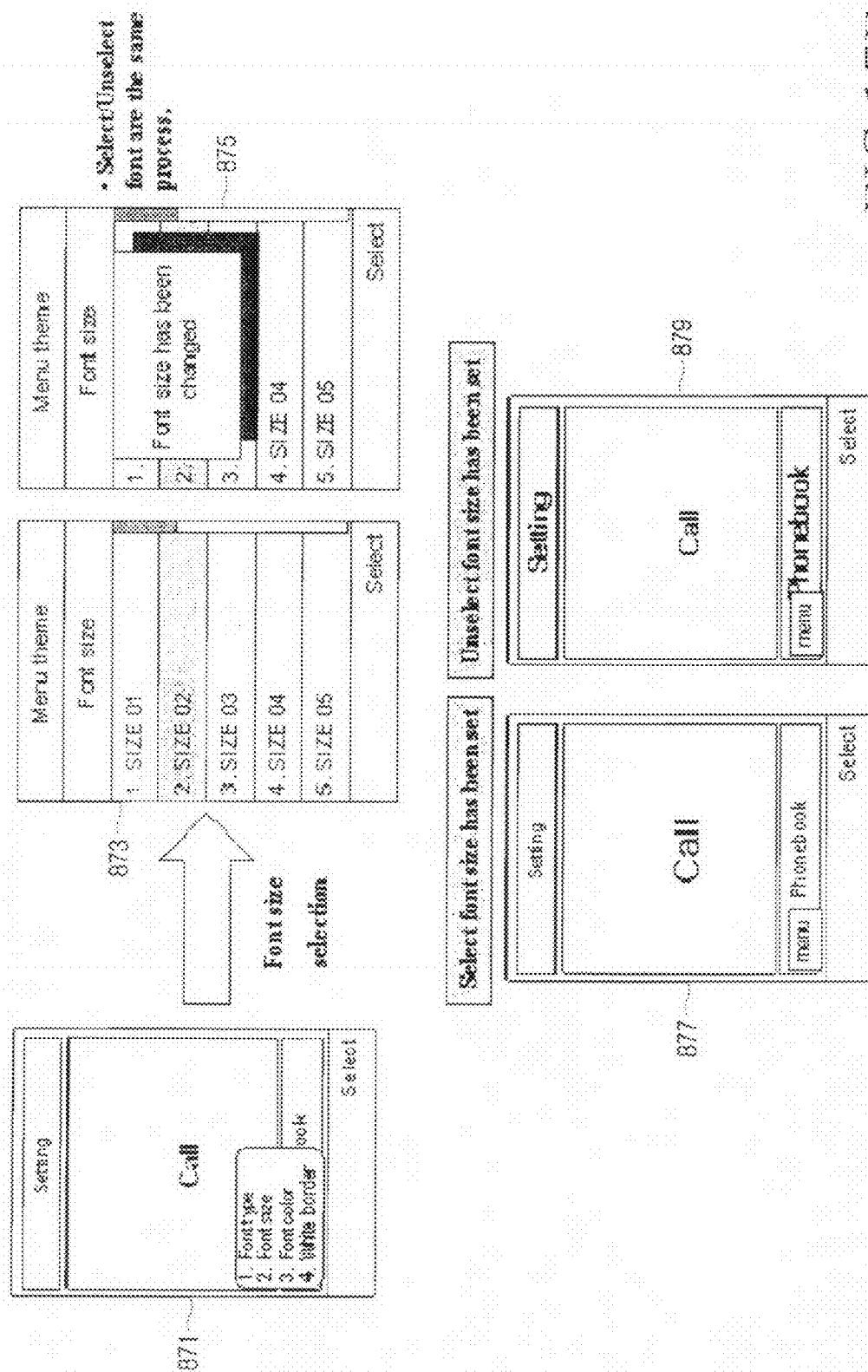
Figure 17C:
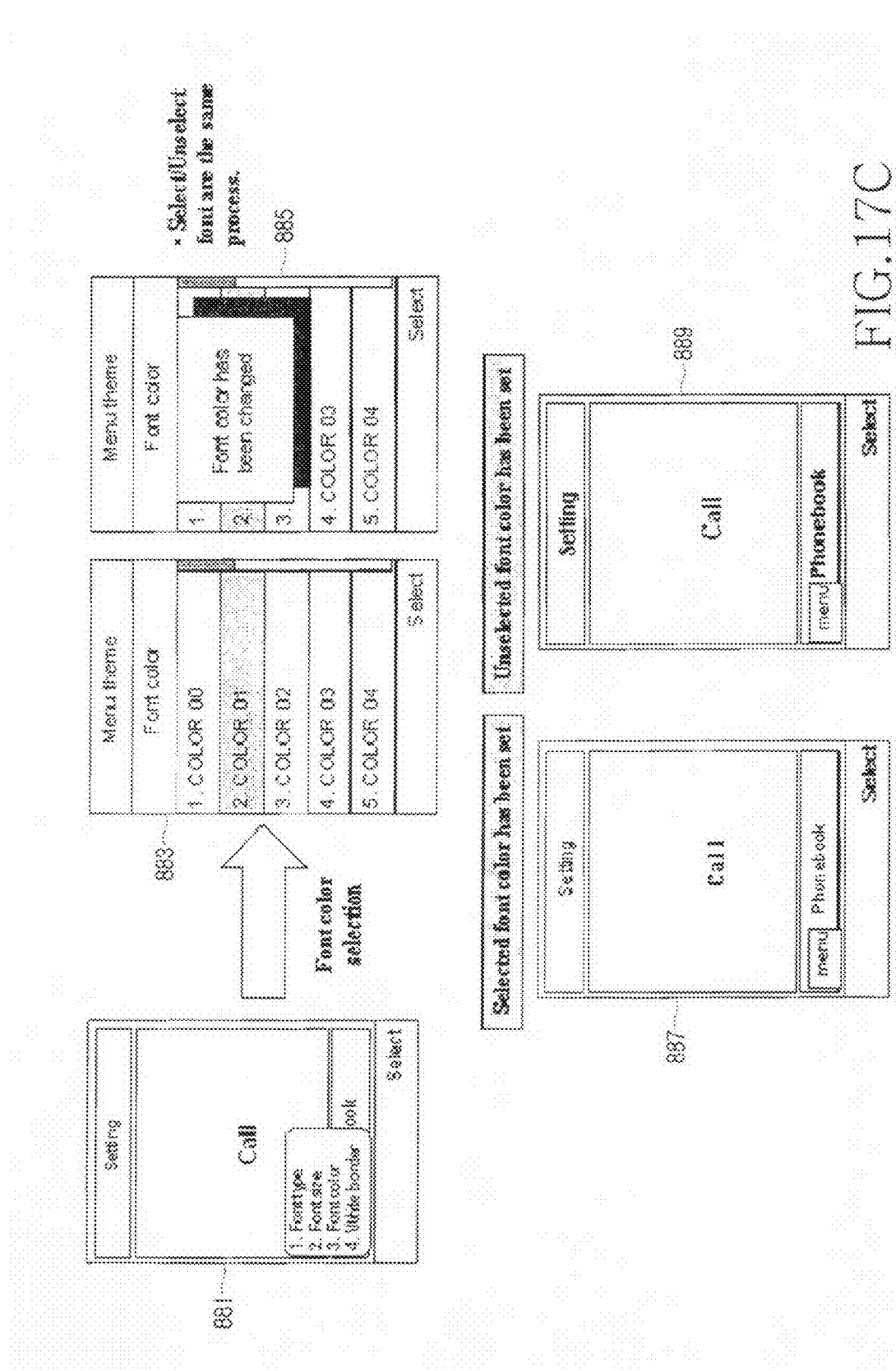
Figure 17D:
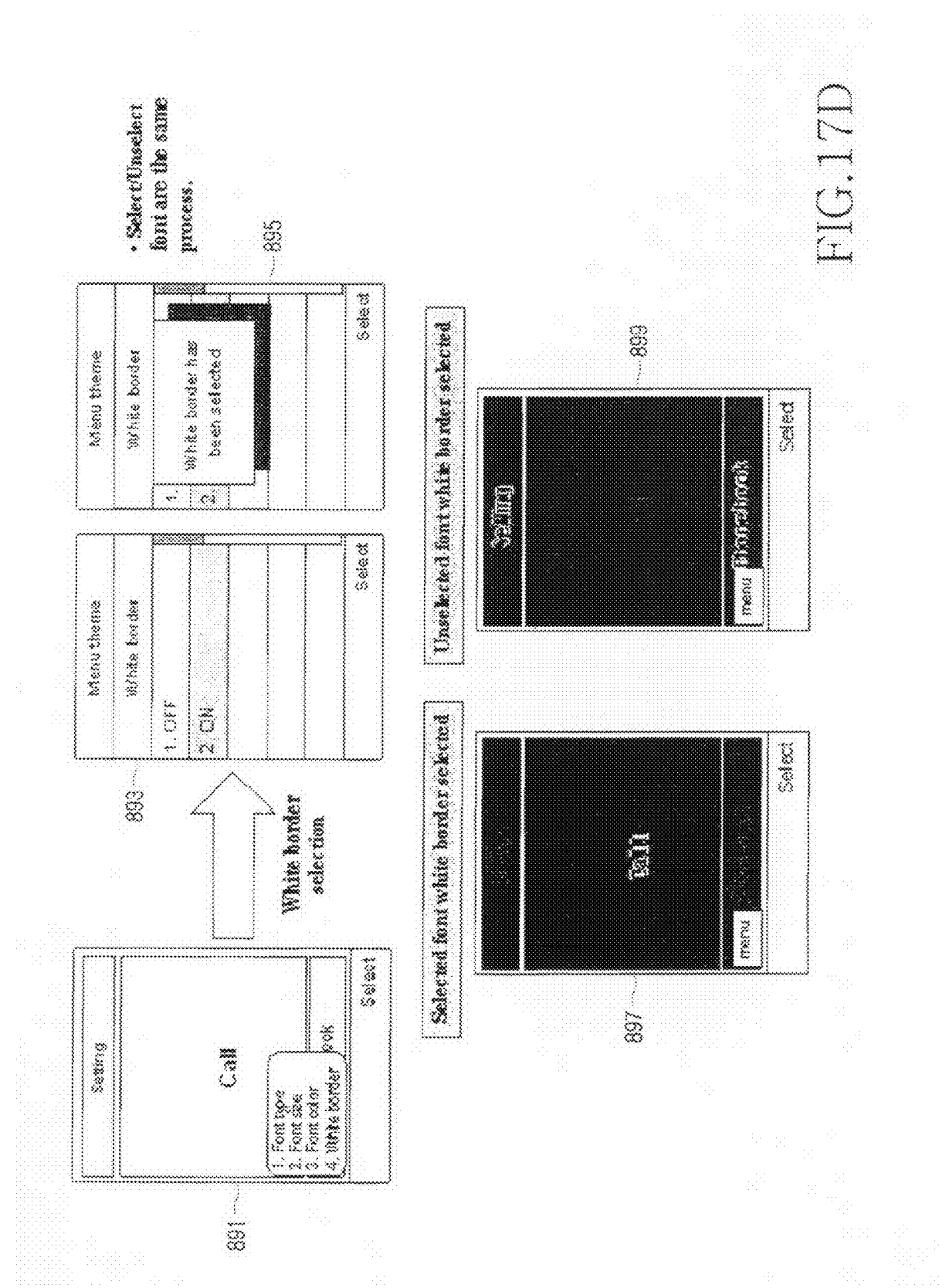

Referring to FIG. 17A, if the user selects "2. Set Select Font" or "3. Set Unselect Font", the controller 110 guides the user of setting font type, font size, font color, and whiter border, as indicated by reference numeral 861. When the user selects "1. Set Font Type", the controller 110 displays a list of available font types as indicated by reference numeral 863. Upon selection of one of the font types, the controller 110 notifies the user that the selected font type has been set, as indicated by reference numeral 865 and displays the font type as indicated by reference numerals 867 and 869.

When "2. Set Font Size" is selected in a font guide state 871 of FIG. 17B, the controller 110 displays a list of available font sizes. Upon selection of one of the font sizes as indicated by reference numeral 873, the controller 110 notifies the user that the selected font size has been set, as indicated by reference numeral 875 and displays the font type as indicated by reference numerals 877 and 879.

When "3. Set Font Color" is selected in a font guide state 881 of FIG. 17C, the controller 110 displays a list of available font colors as indicated by reference numeral 883. Upon selection of one of the font colors, the controller 110 notifies the user that the selected font color has been set, as indicated by reference numeral 885 and displays the font type as indicated by reference numerals 887 and 889.

When "4. Set White Border" is selected in a font guide state 891 of FIG. 17D, the controller 110 prompts the user to select the on or off function of white border as indicated by reference numeral 893. Upon selection of "2. ON", the controller 110 notifies the user that the white border function has been set, as indicated by reference numeral 895 and applies the white border to the selected or unselected menu area, as indicated by reference numerals 897 and 899.

As illustrated in FIGS. 17A to 17D, the fonts of title texts are set for the select and unselect images. In the grid menu type, the title region is set independently on the display 130, and a font to be displayed in the title region is the title text of the select image. On the other hand, in the scroll and page menu types, title texts are overlaid on the select and unselect images displayed in the menu region. The title texts can be set in different fonts for the select and unselect images. In setting the font of a title text, a font type, a font color, and a font size can be set together, and the white border function can be set or released when the fonts of the select and unselected menu images are displayed.

As described above, menu setting can be performed in the mobile phone in the same manner as in the external device such as a computer. That is, the mobile phone guides the user to the setting of menus by use of the display 130 and allows the user to set a guide image (or color), unselect images (or colors for them), unselect images (or colors for them), and a background image (or color), for each menu type. Also, the user can set the font of the title text of each menu image.

In accordance with embodiments of the present invention, a user can select a desired menu type, set menu images according to the menu type, and display menus in a mobile phone. Different menu images, that is, a select image and an unselect image and different titles can be set for a menu depending on whether the menu is selected or unselected. The mobile phone can be provided with at least two menu types so that the menu type can be selectively changed according to use selection.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method of setting grid menus in a portable terminal, comprising the steps of:
   determining the number of menus to be displayed on a display in a grid menu setting mode;
   prompting to set a background image and registering an image selected during background image setting as the background image;
   guiding to set a title image and registering an image selected during title image setting as the title image; and
   prompting to set select and unselect images, repeatedly registering a user-selected image as a select image at a focused menu position when a select image setting mode is selected, and repeatedly registering a user-selected image as an unselect image at a focused menu position when an unselect image setting mode is selected.

2. A method of setting scroll menus in a portable terminal, comprising the steps of:
   determining the number of menus to be displayed on a display in a scroll menu setting mode;
   prompting to set a background image and registering an image selected during background image setting as the background image;
   prompting to set select and unselect images;
   setting a font for a title text of a selected menu and repeatedly registering a user-selected image as a select image at a focused menu position, if a select image setting mode is selected; and
   setting a font for title texts of unselected menus and repeatedly registering a user-selected image as an unselect image at a focused menu position, if an unselect image setting mode is selected.

3. A method of setting page menus in a portable terminal, comprising the steps of:
   prompting to set a background image and registering an image selected during background image setting as the background image;
   prompting to set select and unselect images;
   setting a font for a title text of a selected menu and repeatedly registering a user-selected image as a select image at a focused menu position, if a select image setting mode is selected; and
   setting a font for title texts of unselected menus and repeatedly registering a user-selected image as an unselect image at a focused menu position, if an unselect image setting mode is selected.

* * * * *